United States Patent
Katoh et al.

(10) Patent No.: US 9,605,883 B2
(45) Date of Patent: Mar. 28, 2017

(54) HEAT PUMP CYCLE

(71) Applicant: DENSO CORPORATION, Kariya, Aichi-pref. (JP)

(72) Inventors: Yoshiki Katoh, Kariya (JP); Kota Sakamoto, Kariya (JP); Yuuichi Kami, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 138 days.

(21) Appl. No.: 14/362,310

(22) PCT Filed: Dec. 3, 2012

(86) PCT No.: PCT/JP2012/007736
§ 371 (c)(1),
(2) Date: Jun. 2, 2014

(87) PCT Pub. No.: WO2013/084463
PCT Pub. Date: Jun. 13, 2013

(65) Prior Publication Data
US 2014/0318170 A1    Oct. 30, 2014

(30) Foreign Application Priority Data

Dec. 5, 2011 (JP) .................. 2011-266140
Nov. 14, 2012 (JP) .................. 2012-250453

(51) Int. Cl.
*F25B 30/02* (2006.01)
*F28F 9/26* (2006.01)
(Continued)

(52) U.S. Cl.
CPC ......... *F25B 30/02* (2013.01); *B60H 1/00921* (2013.01); *F25B 5/04* (2013.01);
(Continued)

(58) Field of Classification Search
CPC .......... F25B 30/02; F25B 6/00; F25B 47/025; F25B 47/006; F25B 25/005; F25B 6/04;
(Continued)

(56) References Cited

U.S. PATENT DOCUMENTS 6,427,472 B1    8/2002  Nakagawa et al.
6,986,385 B1    1/2006  Gilles et al.
(Continued)

FOREIGN PATENT DOCUMENTS

EP    1108575 A1    6/2001
JP    S63154967 U   10/1988
(Continued)

OTHER PUBLICATIONS

Office Action mailed on Sep. 8, 2015 in the corresponding JP Application No. 2012-250453 with English translation.
(Continued)

*Primary Examiner* — Emmanuel Duke
(74) *Attorney, Agent, or Firm* — Harness, Dickey & Pierce, P.L.C.

(57) ABSTRACT

A heat pump cycle includes a refrigerant circuit and a coolant circuit. A first heat exchanger and a second heat exchanger are disposed between the refrigerant circuit and the coolant circuit. The first heat exchanger includes an exterior heat exchanger that functions as an evaporator in a heating operation, and a radiator for radiating heat of a coolant. The second heat exchanger transmits a heat of high-pressure refrigerant to the coolant in the heating operation. A temperature of refrigerant within the second heat exchanger is higher than a temperature of refrigerant within the first heat exchanger. The heat obtained from the second heat exchanger is supplied to the first heat exchanger through the coolant. Further, the heat obtained from the second heat exchanger is stored in the coolant. In defrosting
(Continued)

operation, the coolant that has stored the heat therein is supplied to the first heat exchanger.

17 Claims, 43 Drawing Sheets

(51) Int. Cl.
|  |  |
|---|---|
| *F25B 5/04* | (2006.01) |
| *F25B 6/04* | (2006.01) |
| *F25B 25/00* | (2006.01) |
| *B60H 1/00* | (2006.01) |
| *F28F 27/02* | (2006.01) |
| *F28D 1/04* | (2006.01) |
| *F28D 1/053* | (2006.01) |
| *F28D 7/00* | (2006.01) |
| *F28D 7/10* | (2006.01) |
| *F25B 6/00* | (2006.01) |
| *F25B 47/00* | (2006.01) |
| *F25B 47/02* | (2006.01) |
| *F28F 9/02* | (2006.01) |
| *F28D 21/00* | (2006.01) |
| *F28F 1/12* | (2006.01) |

(52) U.S. Cl.
CPC .................. *F25B 6/00* (2013.01); *F25B 6/04* (2013.01); *F25B 25/005* (2013.01); *F25B 47/006* (2013.01); *F25B 47/025* (2013.01); *F28D 1/0408* (2013.01); *F28D 1/05391* (2013.01); *F28D 7/0025* (2013.01); *F28D 7/106* (2013.01); *F28F 9/26* (2013.01); *F28F 27/02* (2013.01); *B60H 2001/00949* (2013.01); *F25B 2339/047* (2013.01); *F25B 2400/0409* (2013.01); *F25B 2600/2501* (2013.01); *F28D 2021/008* (2013.01); *F28F 1/128* (2013.01); *F28F 9/0278* (2013.01); *F28F 2215/02* (2013.01); *Y02B 30/52* (2013.01)

(58) Field of Classification Search
CPC ........ F25B 2339/047; F25B 2600/2501; F25B 2400/0409; F28D 1/053; F28D 7/106; F28D 1/0408; F28D 1/05391; F28F 9/02; F28F 27/02; F28F 9/26; F28F 2215/02; F28F 1/128; F28F 9/0278; B60H 1/00921; B60H 2001/00949
USPC ...................................... 62/515; 165/58, 164
See application file for complete search history.

(56) References Cited

U.S. PATENT DOCUMENTS

| 2004/0060316 A1* | 4/2004 | Ito ...................... B60H 1/00328 62/324.1 |
|---|---|---|
| 2008/0041071 A1* | 2/2008 | Itoh .................... B60H 1/00342 62/79 |
| 2008/0041074 A1* | 2/2008 | Tarutani ................. H05G 2/003 62/132 |
| 2013/0081419 A1 | 4/2013 | Katoh et al. |

FOREIGN PATENT DOCUMENTS

| JP | H06337186 A | | 12/1994 |
|---|---|---|---|
| JP | H11157326 A | | 6/1999 |
| JP | 2000062446 A | * | 2/2000 |
| JP | 2000062446 A | | 2/2000 |
| JP | 2001055036 A | | 2/2001 |
| JP | 2005289095 A | | 10/2005 |
| JP | 2008151396 A | | 7/2008 |
| JP | 2008221997 A | | 9/2008 |
| JP | 4311115 B2 | | 8/2009 |
| JP | 2011031876 A | | 2/2011 |
| JP | 2012017092 A | | 1/2012 |
| WO | WO-9815420 A1 | | 4/1998 |

OTHER PUBLICATIONS

U.S. Appl. No. 14/009,262, filed Oct. 1, 2013, Denso Corporation.
International Search Report and Written Opinion (in Japanese with English Translation) for PCT/JP2012/007736, mailed Jan. 15, 2013; ISA/JP.

* cited by examiner

HEAT PUMP CYCLE

CROSS REFERENCE TO RELATED APPLICATION APPLICATIONS

This application is a U.S. National Phase Application under 35 U.S.C. 371 of International Application No. PCT/JP2012/007736 filed on Dec. 3, 2012 and published in Japanese as WO/2013/084463 A1 on Jun. 13, 2013. This application is based on Japanese Patent Applications No. 2011-266140 filed on Dec. 5, 2011, and No. 2012-250453 filed on Nov. 14, 2012. The disclosures of all of the above applications are incorporated herein by reference.

TECHNICAL FIELD

The present disclosure relates to a heat pump cycle.

BACKGROUND ART

Patent Literature 1 discloses a heat pump cycle and a defrosting control of an evaporator. Patent Literatures 2 to 5 disclose heat exchangers that allow multiple media to flow.

In a technique of Patent Literature 1, the defrosting is executed with the use of a waste heat of an internal combustion engine. However, in recent years, the waste heat of the internal combustion engine has a tendency to decrease. For that reason, there is a risk that a sufficient amount of heat is not obtained for defrosting. Also, in electric vehicles such as hybrid vehicles or electric automobiles, not only the waste heat of the internal combustion engine may be small, but also the waste heat from electric devices such as an electric motor may be also small. For that reason, there is a risk that the sufficient amount of heat is not obtained for the defrosting.

Also, in view of another aspect, the technique of Patent Literature 1 may not pay sufficient attention to that the more necessity of the defrosting, the more suppression of adhesion and growth of frost before the adhesion of frost, in other words, Patent Literature 1 may not pay sufficient attention to the suppression of frost formation. Therefore, an improvement may be required in a stage where frost formation is suppressed.

The heat exchangers disclosed in Patent Literatures 2 to 5 can be used for the defrosting. However, Patent Literatures 2 to 5 each disclose a structure of the heat exchanger, but may not conduct defrosting with the use of an appropriate heat source for defrosting.

PRIOR ART DOCUMENT

Patent Document

Patent Document 1: JP-A-2008-221997
Patent Document 2: JP-UM-A-63-154967
Patent Document 3: JP-A-11-157326
Patent Document 4: JP-A-2001-55036
Patent Document 5: Japanese Patent No. 4311115

SUMMARY OF THE INVENTION

An object of the present disclosure is to provide a heat pump cycle in which suppression of frost formation and/or a performance of defrosting are improved.

Another object of the present disclosure is to provide a heat pump cycle in which the suppression of frost formation and/or the performance of defrosting are improved without depending only on an external heat source.

Another object of the present disclosure is to provide a heat pump cycle suitable for use in a heat exchanger proposed by the present inventors in Japanese Patent Application No. 2011-123199 or Japanese Patent Application No. 2011-82759.

According to a first example of the present disclosure, a heat pump cycle includes a compressor that sucks and compresses a low-pressure refrigerant to supply a high-pressure refrigerant, a use-side heat exchanger to which the high-pressure refrigerant is supplied and a heat is supplied from the high-pressure refrigerant in a heating use, a decompressor that decompresses the high-pressure refrigerant to supply the low-pressure refrigerant in the heating use, an exterior heat exchanger that conducts a heat exchange between air and the low-pressure refrigerant and allows the low-pressure refrigerant to absorb a heat in the heating use, and an auxiliary heat exchanger that is arranged adjacent to the exterior heat exchanger and supplies a heat to the exterior heat exchanger in the heating use. The heat supplied from the auxiliary heat exchanger to the exterior heat exchanger is obtained from the high-temperature refrigerant which has been compressed by the compressor and is higher in temperature than the low-pressure refrigerant.

In this case, the heat pump cycle can configure a cycle that compresses the low-pressure refrigerant by the compressor, and supplies the high-pressure refrigerant. The heat pump cycle can supply the heat absorbed by the absorption heat exchanger to the use-side heat exchanger. Further, the heat pump cycle includes the auxiliary heat exchanger that supplies the heat to the absorption heat exchanger. The auxiliary heat exchanger supplies a heat to the absorption heat exchanger. The heat supplied from the auxiliary heat exchanger to the absorption heat exchanger is obtained from the high-temperature refrigerant that has been compressed by the compressor and is higher in temperature than the low-pressure refrigerant subjected to heat exchange in the absorption heat exchanger. As a result, the absorption heat exchanger can be heated by the heat obtained from the high-temperature refrigerant. Hence, the absorption heat exchanger can be heated by the heat of the heat pump cycle without depending only on the external heat source. Accordingly, limiting of frosting, and/or defrosting are made possible.

According to a second example of the present disclosure, the exterior heat exchanger may include an air passage to allow the air to flow therein, and the auxiliary heat exchanger may include an air passage to allow the air to flow therein. In this case, the auxiliary heat exchanger can also conduct heat exchange with air.

According to a third example of the present disclosure, the heat pump cycle may further include a cycle switching device that switches a flow channel between the heating use in which the exterior heat exchanger functions as an absorption heat exchanger that allows the low-pressure refrigerant to absorb the heat and a cooling use in which the exterior heat exchanger functions as a radiation heat exchanger that allows the high-temperature refrigerant to radiate heat to the air. The auxiliary heat exchanger may radiate the heat obtained from the high-temperature refrigerant to the air in the cooling use. In this case, the heat pump cycle that is switchable between the heating use and the cooling use can be provided. Moreover, the auxiliary heat exchanger may be used to radiate the heat of the high-temperature refrigerant to air in the cooling use. Hence, the auxiliary heat exchanger can be used in both of the heating use and the cooling use.

According to a fourth example of the present disclosure, the heat pump cycle may further include a flow rate regulator that makes a flow rate of the high-temperature refrigerant in the cooling use larger than a flow rate of the high-temperature refrigerant in the heating use. In this case, the flow rate of the high-temperature refrigerant in the cooling use can be made higher than the flow rate of the high-temperature refrigerant in the heating use. The heat obtained from the high-temperature refrigerant in the cooling use can be made larger than the heat obtained from the high-temperature refrigerant in the heating use. As a result, the auxiliary heat exchanger can be sufficiently used in the cooling use.

According to a fifth example of the present disclosure, the exterior heat exchanger and the auxiliary heat exchanger may configure a first heat exchanger unit that is usable as an integrated unit. In this case, the absorption heat exchanger and the auxiliary heat exchanger can be provided by the first heat exchanger unit usable as the integrated unit.

According to a sixth example of the present disclosure, the exterior heat exchanger may include low-temperature medium tubes, and the auxiliary heat exchanger may include high-temperature medium tubes. The low-temperature medium tubes and the high-temperature medium tubes may be arranged to be thermally coupled with each other in at least a part of the first heat exchanger unit. In this case, since the low-temperature medium tubes and the high-temperature medium tubes are thermally coupled with each other, the heat of the high-temperature medium tubes is easily supplied to a vicinity of the low-temperature medium tubes.

According to a seventh example of the present disclosure, the low-temperature medium tubes and the high-temperature medium tubes may be thermally coupled with each other through a fin arranged in the air passage. In this case, heat exchange between the low-temperature medium tubes and the high-temperature medium tubes can be conducted through the fin.

According to an eighth example of the present disclosure, the first heat exchanger unit may include an upstream row in which tubes are arranged in a line, and a downstream row in which tubes are arranged in a line on a downstream side of the upstream row in a flow direction of the air. The upstream row may include a group of the high-temperature medium tubes. In this case, the limitation of frosting, and/or the removal of frost can be efficiently executed by the high-temperature medium tubes arranged in the upstream row.

According to a ninth example of the present disclosure, the upstream row may further include a group of the low-temperature medium tubes. Tubes of the group of the low-temperature medium tubes and tubes of the group of the high-temperature medium tubes may be alternately arranged in at least a part of the upstream row. In this case, the suppression of frost formation, and/or the removal of frost can be effectively executed.

According to a tenth example of the present disclosure, the exterior heat exchanger and the auxiliary heat exchanger may be separated from each other, and the auxiliary heat exchanger may be located upstream of the exterior heat exchanger with respect to the flow of air. In this case, even if the exterior heat exchanger and the auxiliary heat exchanger are separated from each other, the auxiliary heat exchanger can supply heat from the upstream side of the exterior heat exchanger.

According to an eleventh example of the present disclosure, the compressor, the use-side heat exchanger, the decompressor, and the exterior heat exchanger may configure a mainstream circuit in the heating use. The auxiliary heat exchanger may supply heat to the exterior heat exchanger, and the heat supplied from the auxiliary heat exchanger to the exterior heat exchanger may be obtained from the high-temperature refrigerant upstream or downstream of the use-side heat exchanger. In this case, the heat can be obtained from the high-temperature refrigerant with a simple configuration.

According to a twelfth example of the present disclosure, the compressor, the use-side heat exchanger, the decompressor, and the exterior heat exchanger may configure a mainstream circuit in the heating use. The heat pump cycle may further include a branching circuit that is branched from upstream or downstream of the use-side heat exchanger. The auxiliary heat exchanger may supply the heat to the exterior heat exchanger, and the heat supplied from the auxiliary heat exchanger to the exterior heat exchanger may be obtained from the high-temperature refrigerant in the branching circuit. In this case, the heat can be obtained from the high-temperature refrigerant with a simple configuration.

According to a thirteenth example of the present disclosure, the auxiliary heat exchanger may supply the heat to the exterior heat exchanger in order to limit frosting of the exterior heat exchanger when the exterior heat exchanger absorbs heat. In this case, frost formation on the exterior heat exchanger can be limited by the heat obtained from the refrigerant.

According to a fourteenth example of the present disclosure, the auxiliary heat exchanger may have an auxiliary medium that stores therein the heat obtained from the high-temperature refrigerant and may supply the stored heat to the exterior heat exchanger. In this case, the heat obtained from the high-temperature refrigerant can be stored in the auxiliary medium. For that reason, the heat of the high-temperature refrigerant can be supplied to the exterior heat exchanger through the auxiliary medium.

According to a fifteenth example of the present disclosure, the auxiliary heat exchanger may supply the heat from the auxiliary medium to the exterior heat exchanger in order to remove a frost adhered on the exterior heat exchanger after the exterior heat exchanger has absorbed heat. In this case, the defrosting can be executed by the heat obtained from the refrigerant.

According to a sixteenth example of the present disclosure, the heat pump cycle may further include a heat source heat exchanger that supplies the heat from the high-temperature refrigerant to the auxiliary medium. In this case, the heat of the high-temperature refrigerant can be supplied to the auxiliary medium by the heat source heat exchanger.

According to a seventeenth example of the present disclosure, the exterior heat exchanger and the heat source heat exchanger may configure a second heat exchanger unit that is usable as an integrated unit. In this case, the exterior heat exchanger in which the low-pressure refrigerant flows and the heat source heat exchanger in which the high-temperature refrigerant flows can be provided by the second heat exchanger unit usable as the integrated unit.

According to an eighteenth example of the present disclosure, the second heat exchanger unit may include the decompressor, and the decompressor may be disposed between the heat source heat exchanger and the exterior heat exchanger. In this case, the second heat exchanger unit can be provided with a decompressor.

According to a nineteenth example of the present disclosure, the heat pump cycle may further include an auxiliary medium circuit in which the auxiliary medium circulates through the auxiliary heat exchanger and the heat source heat exchanger, and an external heat source that is disposed in the auxiliary medium circuit and supplies the heat to the auxiliary medium. In this case, the heat of the external heat source can be also supplied to the auxiliary medium.

According to a twentieth example of the present disclosure, the auxiliary heat exchanger may allow the high-temperature refrigerant to flow therein and may receive the heat directly from the high-temperature refrigerant.

In this case, since the auxiliary heat exchanger arranged adjacent to the exterior heat exchanger allows the high-temperature refrigerant to flow, the heat of the high-temperature refrigerant can be directly received. The heat of the auxiliary heat exchanger can be supplied through air, or a member that couples the exterior heat exchanger and the auxiliary heat exchanger.

EMBODIMENTS FOR EXPLOITATION OF THE INVENTION

Figure 1:
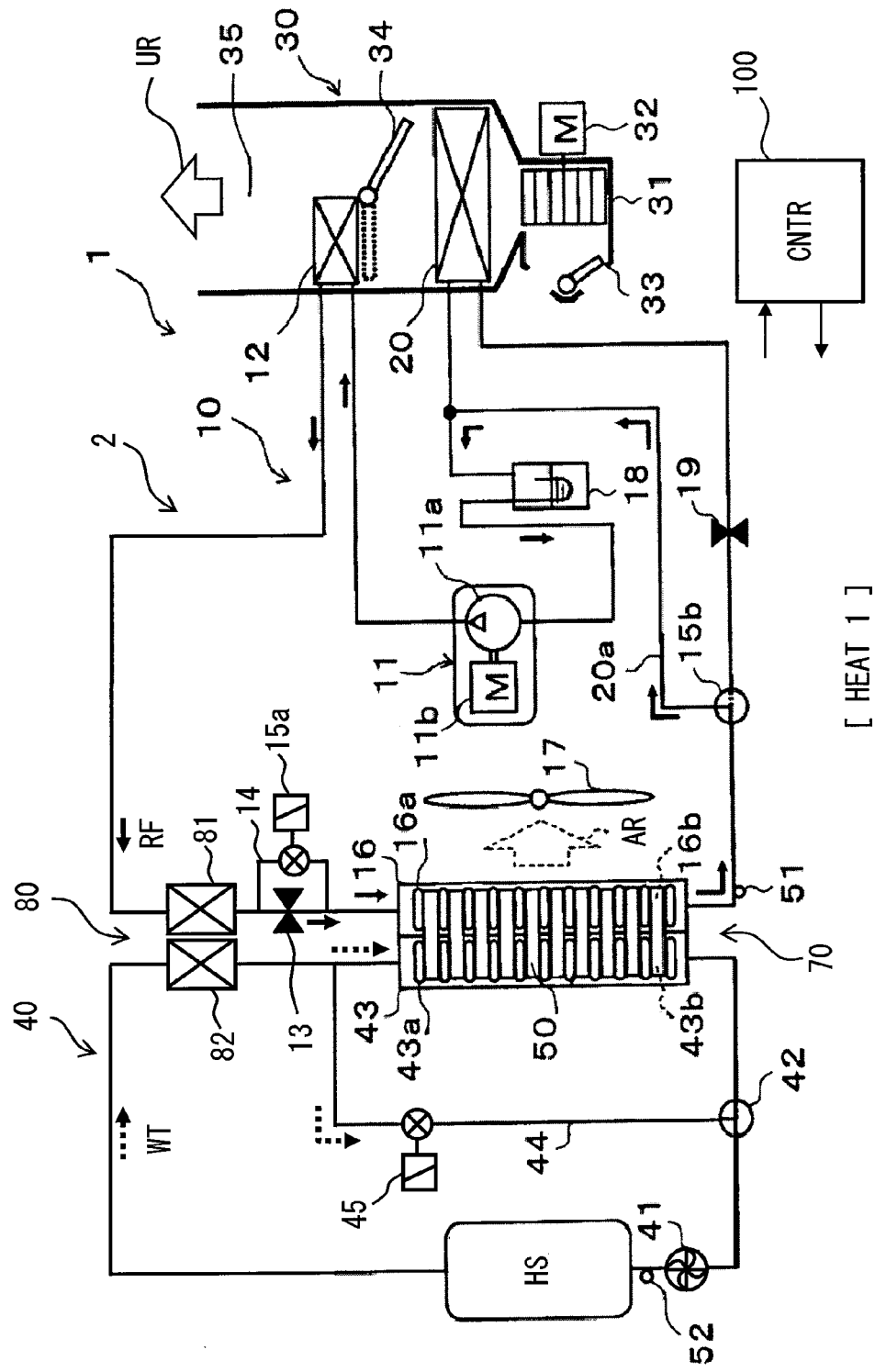
FIG. 1 is a schematic diagram illustrating a heating operation of a heat pump cycle according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. Moreover, in a subsequent embodiment, correspondence relationship with a preceding embodiment is shown by assigning a numeral different only in more than or equal to hundreds place digit from a numeral of a part that corresponds to a matter explained in the preceding embodiment. The parts may be combined even if it is not explicitly described that the parts can be combined. The embodiments may be partially combined even if it is not explicitly described that the embodiments can be combined, provided there is no harm in the combination.

First Embodiment

In FIG. 1, an air conditioner 1 for vehicle is provided in a first embodiment of the present disclosure. The air conditioner 1 includes a heat pump cycle (HPC) 2 according to the present disclosure. The heat pump cycle 2 includes a heat exchanger 70 and a heat exchanger 80 according to the present disclosure. The heat pump cycle 2 includes a refrigerant circuit 10 and a coolant circuit 40 according to the present disclosure.

The air conditioner 1 is adapted to a so-called hybrid vehicle that obtains a travel power from an internal combustion engine (engine) and a motor generator. The heat pump cycle 2 uses at least one of the engine, the motor generator, an inverter circuit, a battery, and a control circuit of the hybrid vehicle as an external heat source HS. One of in-vehicle devices associated with heat generation during operation can be used as the external heat source HS. The external heat source HS supplies heat to a coolant WT which is an example of an auxiliary medium. The coolant circuit 40 is a cooling system that cools the external heat source HS, and keeps the external heat source HS at an appropriate temperature. The air conditioner 1 can be used for any one of a vehicle having only the engine as a power source, the hybrid vehicle, and a vehicle having only an electric motor as the power source. In recent vehicles, a waste heat which is supplied from the power source is small. This makes it difficult to suppress frosting on the exterior heat exchanger 16, and/or conduct defrosting, depending only on the waste heat from the power source. This embodiment is to provide a heat source for suppressing frosting on an exterior heat exchanger 16, and/or defrosting, without depending only on the waste heat from the power source.

The air conditioner 1 includes an air conditioning unit 30 that blows an air UR toward a vehicle compartment which is a space to be air-conditioned. The air conditioner 1 includes a control device (CNTR) 100 that controls the heat pump cycle 2 and the air conditioning unit 30.

The air conditioning unit 30 is arranged in the vehicle compartment. The air conditioning unit 30 includes a casing 31 that provides a duct of the air UR fed toward the vehicle compartment. The air conditioning unit 30 is configured such that components such as a blower 32, an interior condenser 12, and an interior evaporator 20 in the casing 31. An internal/external air switching device 33 that selectively or mixedly introduces air inside the vehicle and air outside the vehicle is arranged in a most upstream portion within the casing 31. The blower 32 for blowing the air UR is arranged downstream of the internal/external air switching device 33.

The interior evaporator 20 and the interior condenser 12 are arranged in this order downstream of the blower 32 with respect to a flow of the air UR. The interior evaporator 20 is arranged upstream of the interior condenser 12. The interior evaporator 20 is a cooling heat exchanger that cools the air UR by conducting heat exchange between the refrigerant flowing through the interior evaporator 20 and the air UR. The interior condenser 12 is a heating heat exchanger that conducts heat exchange between a high-temperature high-pressure refrigerant flowing within the interior condenser 12 and the air UR that has passed through the interior evaporator 20.

An air mix door 34 is arranged downstream of the interior evaporator 20 and upstream of the interior condenser 12. The air mix door 34 regulates a ratio of the air UR that passes through the interior condenser 12 to the air UR that has passed through the interior evaporator 20. A mix space 35 is provided downstream of the interior condenser 12. The mix space 35 mixes the air UR heated by the interior condenser 12 and the air UR that has bypassed the interior condenser 12 and been not heated. A downstream of the mix space 35 is communicated with the vehicle compartment through an outlet.

The refrigerant circuit 10 is provided by a reversibly operable vapor compression refrigeration cycle. The refrigerant circuit 10 is a heating refrigerant cycle of the air conditioner 1. The refrigerant circuit 10 can additionally serve as a cooling refrigeration cycle. The refrigerant circuit 10 provides a narrowly-defined heat pump cycle using a vehicle exterior air AR as a heat source. The refrigerant circuit 10 is also called "refrigerant system". The refrigerant circuit 10 allows a refrigerant RF to flow in a refrigerant tube 16a which will be described later, and supplies heat absorbed by the refrigerant RF to the interior condenser 12. The refrigerant RF that flows in the refrigerant circuit 10 is a main functional medium for drawing the heat from the heat source. The refrigerant circuit 10 is also called "main medium circuit 10".

In the following description, to suppress the adhesion of frost in the exterior heat exchanger 16 of the refrigerant circuit 10, that is, the heat source side heat exchanger, and to suppress a growth of the adhered frost are called "suppression of frost formation". Also, that frost adhered on the exterior heat exchanger 16 is melted and removed is called "defrosting". Also, a performance that resists a reduction in the heat exchange performance caused by frost is called "frosting resistant performance". Hence, the frosting resistant performance is provided by the suppression of frost formation, and/or defrosting.

The coolant circuit is a heat source device that supplies heat to the refrigerant circuit 10. The coolant circuit 40 enables the coolant WT used as a heat carrying medium and a heat storing medium to flow. The coolant circuit 40 including the external heat source HS is called "water system" or "external heat source system". The coolant WT that flows in the coolant circuit 40 exemplifies an auxiliary medium for assisting in drawing the heat by the main medium circuit 10. The coolant circuit 40 may be used as an example of the auxiliary medium circuit in which the auxiliary medium flows.

The coolant circuit 40 also serves as a heat source device that supplies heat for suppression of frost formation. The coolant circuit 40 is also called "frost suppression medium circuit 40" for the medium to flow for suppressing frost formation. The coolant circuit 40 allows the coolant WT to flow in a later-described water tube 43a for suppressing frost formation. The coolant circuit 40 also serves as a heat source device that supplies heat for defrosting to the heat exchanger 70. The coolant circuit 40 may be used as an example of a defrosting medium circuit for allowing the medium for defrosting to flow. The coolant circuit 40 allows the coolant WT for the defrosting to flow in the water tube 43a. The coolant circuit 40 maintains the temperature of the coolant WT and the temperature of the external heat source HS at a temperature higher than the temperature at which the refrigerant within the refrigerant tube 16a absorbs the heat.

The refrigerant circuit 10 heats or cools the air UR blown into the vehicle compartment. The refrigerant circuit 10 switches the flow channel to execute heating operation for heating the air UR to heat the vehicle compartment, and cooling operation for cooling the air UR to cool the vehicle compartment. The refrigerant circuit 10 supplies heat for suppressing the frost formation on the exterior heat exchanger 16 in the heating operation. The refrigerant circuit 10 can execute defrosting operation for melting and removing the frost formed on the exterior heat exchanger 16 that functions as an evaporator that evaporates the refrigerant during the heating operation. Further, the refrigerant circuit 10 can execute waste heat recovery operation for allowing the heat of the external heat source HS to be absorbed by the refrigerant during the heating operation. Multiple operation modes are switched by the control device 100.

A compressor 11 is arranged within an engine room. The compressor 11 sucks and compresses a low-pressure refrigerant in the refrigerant circuit 10 to supply a high-pressure refrigerant. The compressor 11 includes a compression mechanism unit 11a such as a scroll type or a vane type, and an electric motor 11b that drives the compression mechanism unit 11a. The electric motor 11b is driven by the control device 100. A discharge side of the compressor 11 is provided with the interior condenser 12. The interior condenser 12 may be used as an example of a use-side heat exchanger to which the high-pressure refrigerant is supplied, and heat is supplied from the high-pressure refrigerant.

A heating fixed aperture 13 is disposed downstream of the interior condenser 12. The fixed aperture 13 decompresses and expands the refrigerant flowing out of the interior condenser 12 during the heating operation. The fixed aperture 13 is a decompressing device for heating operation. The fixed aperture 13 can be provided by an orifice or a capillary tube. The fixed aperture 13 provides a decompressor that decompresses the high-pressure refrigerant, and supplies the low-pressure refrigerant. The exterior heat exchanger 16 is disposed downstream of the fixed aperture 13. Further, a passage 14 for bypassing the fixed aperture 13 is disposed downstream of the interior condenser 12. The passage 14 allows the refrigerant flowing out of the interior condenser 12 to bypass the fixed aperture 13 and be guided to the exterior heat exchanger 16. An on-off valve 15a that opens and closes the passage 14 is arranged in the passage 14. The on-off valve 15a is an electromagnetic valve. A pressure loss in the on-off valve 15a is sufficiently smaller than a pressure loss in the fixed aperture 13. Therefore, when the on-off valve 15a is opened, the refrigerant solely flows in the passage 14. On the other hand, if the on-off valve 15a is closed, the refrigerant flows in the fixed aperture 13. As a result, the on-off valve 15a switches the flow channel of the refrigerant circuit 10. The on-off valve 15a functions as a switching device for the refrigerant flow channel. The switching device may be provided by an electric three-way valve.

The exterior heat exchanger 16 conducts heat exchange between the low-pressure refrigerant flowing through the exterior heat exchanger 16 and the air AR. The exterior heat exchanger 16 is arranged within the engine room. The exterior heat exchanger 16 functions as an evaporator that evaporates the low-pressure refrigerant, and exercises heat absorbing operation, in the heating operation. The exterior heat exchanger 16 provides an absorption heat exchanger that conducts heat exchange between the air AR and the low-pressure refrigerant, and allows the low-pressure refrigerant to absorb the heat. The exterior heat exchanger 16 functions as a radiator that allows the high-pressure refrigerant to radiate the heat in the cooling operation. The exterior heat exchanger 16 is integrated with a radiator 43. The exterior heat exchanger 16 and the radiator 43 configure the heat exchanger 70. The heat exchanger 70 may be used as an example of a first heat exchanger unit usable as an integrated unit.

The coolant WT flows in the radiator 43. The radiator 43 conducts heat exchange between the coolant WT of the coolant circuit 40 and the air AR. Further, the radiator 43 supplies the heat of the coolant WT to the exterior heat exchanger 16 and the heat exchanger 70 including the exterior heat exchanger 16. The heat of the high-pressure refrigerant is stored in the coolant WT. Hence, the radiator 43 holds the coolant WT that is an example of an auxiliary medium which stores therein the heat obtained from the high-temperature refrigerant, and supplies the stored heat to the absorption heat exchanger. The radiator 43 may be used as an example of the auxiliary heat exchanger arranged adjacent to the exterior heat exchanger 16. The auxiliary heat exchanger supplies the heat obtained from the high-temperature refrigerant which is compressed by the compressor 11 and is higher in temperature than the low-pressure refrigerant to the exterior heat exchanger 16.

A fan 17 is an electric motor-driven air blower that blows the air AR to the exterior heat exchanger 16. The fan 17 provides an exterior air blowing device that blows the air AR toward both of the exterior heat exchanger 16 and the radiator 43.

The refrigerant circuit 10 includes the heat exchanger 80 that conducts heat exchange between the high-temperature refrigerant before being decompressed by the fixed aperture 13, and the coolant WT of the coolant circuit 40. The heat exchanger 80 may be used as an example of the heat source heat exchanger that supplies the heat from the high-temperature refrigerant to the coolant WT. The heat exchanger 80 includes a heat exchange portion 81 on a side of the refrigerant circuit 10, and a heat exchange portion 82 on a side of the coolant circuit 40. The heat exchanger 80 can be provided by various heat exchangers that conduct the heat exchange between the refrigerant RF and the coolant WT. For example, the heat exchanger 80 can be configured by a double pipe-type heat exchanger, a tank and tube-type heat exchanger, or a stacked-type heat exchanger. In this embodiment, the heat exchanger 80 is configured, separately from the heat exchanger 70, and the heat exchanger 80 and the heat exchanger 70 are connected to each other by piping.

The heat exchanger 80 is provided to supply the heat of the high-temperature refrigerant in the refrigerant circuit 10 to a low temperature portion of the heat exchanger 70. In this embodiment, the heat of the high-temperature refrigerant is supplied to the heat exchanger 70 through the coolant WT. Hence, the heat exchanger 80 can be called "self-heating heat exchanger" that supplies the heat of the high-temperature refrigerant in the refrigerant circuit 10 to the low-temperature refrigerant of the refrigerant circuit 10. Also, frost is adhered and grows in a low-temperature portion of the heat exchanger 70. However, the heat supplied from the heat exchanger 80 through the coolant WT suppresses the adhesion of frost, and suppresses the growth of frost. In other words, the heat supplied from the heat exchanger 80 suppresses the formation of frost in the heat exchanger 70. Also, the heat obtained from the heat exchanger 80 is stored in the coolant WT. The coolant WT in which the heat is stored is supplied to the heat exchanger 70 in the defrosting operation, and used for defrosting. Hence, the heat exchanger 80 can be also called "heat source heat exchanger" for improving the frosting resistant performance in the heat exchanger 70.

An electric three-way valve 15b is connected to a downstream of the exterior heat exchanger 16. The three-way valve 15b is controlled by the control device 100. The three-way valve 15b configures the switching device for the refrigerant flow channel together with the on-off valve 15a. The electric three-way valve 15b connects an outlet port of the exterior heat exchanger 16 directly to an inlet port of an accumulator 18 not through the heat exchanger, in the heating operation. The three-way valve 15b connects the outlet port of the exterior heat exchanger 16 to an inlet portion of a fixed aperture 19, in the cooling operation. The fixed aperture 19 is a cooling decompressing device. The fixed aperture 19 decompresses and expands the refrigerant flowing out of the exterior heat exchanger 16 in the cooling operation. The fixed aperture 19 has the same configuration as that of the fixed aperture 13.

The interior evaporator 20 is disposed downstream of the fixed aperture 19. The accumulator 18 is disposed downstream of the interior evaporator 20. The flow channel which is formed by the three-way valve 15b in the heating operation and communicates directly with the accumulator 18 from the three-way valve 15b configures a passage 20a that allows the refrigerant downstream of the exterior heat exchanger 16 to bypass the interior evaporator 20. The accumulator 18 is a gas-liquid separator for the low-pressure refrigerant which separates gas and liquid of the refrigerant flowing into the accumulator 18, and stores a redundant refrigerant within the cycle. The compressor 11 is connected to a gas-phase refrigerant outlet port of the accumulator 18. The accumulator 18 performs a function of limiting intake of the liquid-phase refrigerant into the compressor 11 to prevent liquid compression of the compressor 11.

The coolant circuit 40 is a cooling medium circulation circuit in which the coolant flows into the external heat source HS to cool the external heat source HS. The coolant circuit 40 includes components such as a pump 41, an electric three-way valve 42, the radiator 43, a bypass passage 44 for flowing the coolant to bypass the radiator 43, and a flow rate regulation valve 45. The pump 41 is an electric pump that pumps the coolant into the coolant circuit 40. The coolant circuit 40 may be used as an example of the auxiliary medium circuit in that the coolant WT circulates so as to pass through the radiator 43 and the heat exchanger 80. In the coolant circuit 40, the pump 41, the heat exchanger 80, and the radiator 43 are arranged in series on a circulation route of the coolant WT.

The three-way valve 42 switches the flow channel in the coolant circuit 40. The three-way valve 42 switches between a flow channel that passes through the external heat source HS and the radiator 43 and a flow channel that passes through the external heat source HS and the bypass passage 44. The bypass passage 44 provides a flow channel that bypasses the radiator 43. When the three-way valve 42 allows the coolant WT to flow in the bypass passage 44 and bypass the radiator 43, the coolant WT arises in temperature without radiating heat by the radiator 43. In other word, the heat is stored in the coolant WT in this situation. The radiator 43 is a heat exchanger for heat radiation which is arranged within the engine room, and conducts heat exchange between the coolant WT and the air AR blown from the fan 17. The radiator 43 is configured integrally with the exterior heat exchanger 16 to configure the heat exchanger 70. When the three-way valve 42 allows the coolant to flow in the radiator 43, the heat is radiated from the coolant WT by the radiator 43. The coolant WT supplies the heat to the air UR and/or the refrigerant. In this situation, the heat supplied from the high-temperature refrigerant to the coolant WT by the heat exchanger 80 is supplied to the heat exchanger 70 in the radiator 43.

Further, the three-way valve 42 is capable of configuring the flow channel so as to pass through both of the radiator 43 and the bypass passage 44. The flow rate regulation valve 45 regulates a ratio of a flow rate that passes through the radiator 43 and a flow rate that passes through the bypass passage 44. The coolant WT that flows in the radiator 43 carries the heat obtained in the heat exchanger 80 to the heat exchanger 70. The coolant WT that flows in the bypass passage 44 allows the heat obtained in the heat exchanger 80 to be stored in the coolant circuit 40. In this situation, the heat supplied from the external heat source HS is also stored in the coolant circuit 40.

The heat exchanger 70 provides the heat exchange between two of the refrigerant RF, the coolant WT, and the air AR. The heat exchanger 70 provides the heat exchange between the refrigerant RF and the coolant WT, between the refrigerant RF and the air AR, and between the coolant WT and the air AR. The heat exchanger 70 includes components such as multiple tubes through which the refrigerant or the coolant flows, and a collection tank and a distribution tank which are arranged on both ends of the multiple tubes.

The exterior heat exchanger 16 has multiple refrigerant tubes 16a through which the refrigerant flows. The refrigerant tubes 16a are heat exchange tubes in which the refrigerant RF that absorbs the heat from the air flows. The refrigerant tubes 16a may be used as an example of the low-temperature medium tubes in which a low-temperature medium CMD flows during the heating operation. The refrigerant tubes 16a are flat tubes in which a shape of a cross-section perpendicular to a longitudinal direction thereof is flattened.

The radiator 43 has multiple water tubes 43a through which the coolant flows. The water tubes 43a are heat exchange tubes in which the medium flows in order to suppress frost formation and/or defrost. The water tubes 43a may be used as an example of the high-temperature medium tubes in which a high-temperature medium HMD flows in the heating operation and the defrosting operation. The heat of the high-temperature medium HMD suppresses the formation of frost on the heat exchanger 70 in the heating operation. Further, the heat of the high-temperature medium HMD melts frost on the heat exchanger 70 in the defrosting operation. The water tubes 43a are flat tubes in which a shape of a cross-section perpendicular to a longitudinal direction thereof is flattened. Hereinafter, the refrigerant tubes 16a and the water tubes 43a are called "tubes 16a and 43a", respectively.

The multiple tubes 16a and 43a are arranged so that larger flat surfaces of their outer surfaces are substantially parallel to a flow of the air AR. The multiple tubes 16a and 43a are arranged at predetermined intervals. Air passages 16b and 43b in which the air AR flows are formed around the multiple tubes 16a and 43a. The air passages 16b and 43b are used as heat radiation air passages, and/or heat absorption air passages.

The multiple tubes 16a and 43a are arranged to be thermally coupled with each other in at least a part of the heat exchanger 70. The multiple tubes 16a and 43a are arranged in row in a direction orthogonal to the flow of the air AR. Further, the multiple tubes 16a and 43a are arranged in rows along a flow direction of the air AR. As illustrated in the drawings, the multiple tubes 16a and 43a can be arranged in two rows. The multiple tubes 16a and 43a are arranged to form an upstream row located on an upstream side in the flow direction of the air AR, and a downstream row located downstream of the upstream row.

The water tubes 43a are arranged in at least a part of the upstream row. In at least a part of the upstream row, the refrigerant tubes 16a and the water tubes 43a are adjacent to each other. In at least a part of the upstream row, the water tubes 43a can be located on both sides of the refrigerant tubes 16a. In at least a part of the upstream row, the refrigerant tubes 16a can be located on both sides of the water tubes 43a. In at least a part of the upstream row, the refrigerant tubes 16a and the water tubes 43a can be alternately located. The refrigerant tubes 16a and the water tubes 43a are alternately arranged so that the water tubes 43a are located on both sides of the refrigerant tubes 16a in at least the upstream row. That is, in the heat exchanger 70, the water tubes 43a are located on both sides of the refrigerant tubes 16a on an inflow side of the air AR, and these are arranged in line.

According to the above configuration, the refrigerant tubes can be arranged widely. As a result, frost can be dispersed in the large area. According to this configuration, the suppression of frost formation, and/or the removal of frost can be efficiently executed by the water tubes 43a arranged in the upstream row. Further, the water tubes 43a are located adjacent to the refrigerant tubes 16a. For that reason, the adhesion of frost and the growth of frost in the vicinity of the refrigerant tubes 16a can be suppressed in the heating operation. Also, the heat supplied from the water tubes 43a can be efficiently transmitted to a lump of frost grown in the vicinity of the refrigerant tubes 16a in the defrosting operation.

In the downstream row, the refrigerant tubes 16a and the water tubes 43a can be arranged in the same manner as that in the upstream row. Instead, in the downstream row, only the refrigerant tubes 16a or only the water tubes 43a may be arranged.

The multiple tubes 16a and 43a may be arranged so that a large number of water tubes 43a are located in the upstream row, and a small number of water tubes 43a are located in the downstream row. Also, the multiple tubes 16a and 43a may be arranged so that the water tubes 43a are located in only the upstream row. As a result, the radiator 43 is mainly arranged on the upstream side of the flow of the air AR, and the exterior heat exchanger 16 is mainly arranged on the downstream side thereof.

Fins 50 are arranged in the air passages 16b and 43b. The fins 50 are outer fins for facilitating the heat exchange between the tubes 16a, 43a, and the air AR. The fins 50 are joined to two tubes 16a and 43a adjacent in the row. Further, the fins 50 are joined to two tubes 16a and 43a arranged in the flow direction of the air AR. Hence, each fin 50 is joined to at least four tubes 16a and 43a. The fins 50 integrate the exterior heat exchanger 16 with the radiator 43. The fins 50 are each formed of a thin plate made of metal superior in heat conductivity. The fins 50 are corrugated fins obtained by bending the thin plate into a corrugated shape. The fins 50 facilitate the heat exchange between the refrigerant RF and the air AR. The fins 50 facilitate the heat exchange between the coolant WT and the air AR. At least a part of the fins 50 is joined to both of the refrigerant tubes 16a and the water tubes 43a. The refrigerant tubes 16a and the water tubes 43a are thermally coupled with each other through the fins 50. Hence, the fins 50 also perform a function of enabling heat transfer between the refrigerant tubes 16a and the water tubes 43a. Two fins 50 arranged on both sides of one refrigerant tube 16a are corrugated fins having multiple ridge portions joined to both surfaces of the refrigerant tubes 16a.

The tank of the exterior heat exchanger 16 and the tank of the radiator 43 can be at least partially formed of the same member. The refrigerant tubes 16a, the water tubes 43a, the tanks, and the fins 50 are made of aluminum alloy. Those components are joined to each other by brazing.

The heat exchanger 70 includes a core portion in which the tubes 16a, 43a, and the fins 50 are arranged, and tank portions arranged on both ends of the core portion. The tubes 16a and 43a arranged in the core portion configure multiple rows including at least the upstream row and the downstream row in the flow direction of the air AR. Each of the two tank portions includes an inside tank adjacent to the core portion, and an outside tank located away from the core portion. The inside tank and the outside tank extend to cover substantially an overall end of the core portion on the end of the core portion. Hence, the inside tank and the outside tank are stacked on each other on one end of the core portion. Also, the inside tank and the outside tank are stacked on each other on the other end of the core portion. Parts of the multiple tubes 16a and 43a are connected to the inside tank to communicate with an interior of the inside tank, and the remaining portions of the multiple tubes 16a and 43a are connected to the outside tank to communicate with an interior of the outside tank. Those remaining portions extend through walls of the inside tank. The tubes 16a and 43a are arranged separately within the core portion. The refrigerant tubes 16a or the water tubes 43a can be arranged to form a non-uniform distribution in the interior of the core portion. The arrangement of the tubes 16a and 43a in the core portion is set to be adapted to the performances of the heat exchange required by the exterior heat exchanger 16 and the radiator 43. The heat exchanger 70 enables a relatively free arrangement of the tubes 16a and 43a. For example, the refrigerant tubes 16a or the water tubes 43a are arranged separately to the upstream row and the downstream row along the flow direction of the air AR. In other words, the refrigerant tubes 16a and the water tubes 43a can be arranged together in the upstream row or the downstream row.

The control device 100 is provided by a microcomputer having a storage medium readable by the computer. The storage medium non-temporarily stores a program readable by the computer. The storage medium can be provided by a semiconductor memory or a magnetic disk. The program is executed by the control device 100 so that the control device 100 functions as a device described in this specification, and the control device 100 functions to execute a control method described in this specification. The device provided by the control device 100 can be also called "functional block or module for achieving a predetermined function".

The control device 100 controls the operation of the devices 11, 15a, 15b, 17, 41, 42, and 45. The control device 100 is connected with multiple sensors. The multiple sensors include an internal air sensor as an internal air temperature detecting device for detecting a temperature of the vehicle compartment, an external air sensor that detects the temperature of the air of the vehicle exterior, a solar sensor that detects the amount of insolation within the vehicle compartment, an evaporator temperature sensor that detects a blowout air temperature (evaporator temperature) of the interior evaporator 20, and a discharge refrigerant temperature sensor that detects a discharge refrigerant temperature of the compressor 11. Further, the multiple sensors may include an outlet refrigerant temperature sensor 51 that detects an outlet side refrigerant temperature Te of the exterior heat exchanger 16, and a coolant temperature sensor 52 as a coolant temperature detecting device for detecting a coolant temperature Tw that flows into a travel electric motor MG.

The control device 100 provides a control portion for controlling the amount of refrigerant that flows in the refrigerant circuit 10, and the flow channel. The amount of refrigerant is controlled by regulating a refrigerant discharge capacity of the compressor 11. The flow channel of the refrigerant is selectively controlled by controlling the devices 15a and 15b. As a result, the devices 15a and 15b, and the control device 100 may be used as an example of a cycle switching device of the heat pump cycle 2. A cycle switching device (15a, 15b, 100) controls the flow channel so that the exterior heat exchanger 16 functions as the absorption heat exchanger during the heating operation, and the exterior heat exchanger 16 functions as the radiation heat exchanger during the cooling operation. The heating is a heating use for heating an object. The cooling is a cooling use for cooling the object. The refrigerant circuit 10 can be switched to any one of the heating use and the cooling use.

Also, the control device 100 provides a control portion for controlling a flow of the coolant in the coolant circuit and controlling the flow channel. The flow of coolant is controlled by controlling the pump 41. The flow channel of the coolant is controlled by controlling the three-way valve 42 and the flow rate regulation valve 45.

Further, the control device 100 provides a frost formation determining portion that determines whether frost is formed in the exterior heat exchanger 16, or not, on the basis of detection signals from the multiple sensors, and/or a timer. The frost formation determining portion determines that frost is formed in the exterior heat exchanger 16 when a vehicle velocity of a traveling vehicle falls below a predetermined reference vehicle velocity, for example, 20 km/h, and the outlet side refrigerant temperature Te of the exterior heat exchanger 16 falls below a predetermined reference temperature, for example, 0° C. The control device 100 provides a defrosting control portion that executes a defrosting control for removing frost adhered to the exterior heat exchanger 16. The defrosting control portion controls the heat pump cycle 2.

The control device 100 controls the coolant circuit 40 so that the temperature of the coolant falls below a predetermined upper limit temperature, and exceeds a predetermined lower limit temperature. The control device 100 controls the air conditioner 1 so as to selectively provide the cooling operation (COOL) and the heating operation by the air conditioner 1. Further, the control device 100 controls the air conditioner 1 so as to provide normal heating operation (HEAT1), defrosting operation (DEFROST), and waste heat recovery operation (HEAT2) in the heating operation. When the formation of frost is detected by the frost formation determining portion during the normal heating operation, the operation is shifted to the defrosting operation. If the coolant temperature Tw detected by the coolant temperature sensor 52 exceeds the predetermined reference temperature, for example, 60° C. during the normal heating operation, the operation is shifted to the waste heat recovery operation. Further, if return conditions are satisfied, the operation returns to the normal heating operation.

(a) Normal Heating Operation (HEAT1)

During the normal heating operation, the air UR is heated by the interior condenser 12 with the air AR of the vehicle exterior as a heat source, to thereby execute heating within the vehicle compartment. The normal heating operation starts by a switch operated by a user of the vehicle. The refrigerant circuit 10 is controlled so that the on-off valve 15a is closed, the three-way valve 15b connects the exterior heat exchanger 16 and the accumulator 18 through the passage 20a, and the compressor 11 operates. With this control, the refrigerant circuit 10 is switched to a refrigerant flow channel in which the refrigerant flows as indicated by solid arrows in FIG. 1. The coolant circuit 40 is controlled so that the pump 41 pumps a predetermined flow rate of coolant, and the three-way valve 42 allows the coolant to flow in both of the radiator 43 and the bypass passage 44. The coolant circuit 40 is switched to a circuit in which the coolant flows as indicated by dashed arrows in FIG. 1.

In the refrigerant circuit 10 during the normal heating operation, the high-pressure refrigerant discharged from the compressor 11 flows into the interior condenser 12. The refrigerant that has flowed into the interior condenser 12 conducts the heat exchange with the air UR that has been blown from the blower 32, and passed through the interior evaporator 20, and radiates heat. As a result, the air UR is heated. The high-pressure refrigerant that has flowed out of the interior condenser 12 flows into the heat exchanger 80, and heats the coolant WT. Thereafter, the high-pressure refrigerant flows into the fixed aperture 13, and is decompressed and expanded.

The low-pressure refrigerant that has been decompressed and expanded by the fixed aperture 13 flows into the exterior heat exchanger 16. The low-pressure refrigerant that has flowed into the exterior heat exchanger 16 absorbs heat from the air AR blown by the fan 17, and is evaporated. The refrigerant that has flowed out of the exterior heat exchanger 16 flows into the accumulator 18, and is separated into gas and liquid. A gas-phase refrigerant separated by the accumulator 18 is sucked into the compressor 11, and again compressed.

In the coolant circuit 40, a part of the coolant WT is supplied to the heat exchanger 70. As a result, the heat exchanger 70 is heated by the coolant WT. Since the heat exchanger 70 is cooled by the exterior heat exchanger 16, frost may adhere to surfaces of the constituent members, and the frost may further grow. The coolant WT is heated in the heat exchanger 80, and thereafter supplied to the heat exchanger 70. For that reason, the coolant WT suppresses the adhesion of frost to the surface of the heat exchanger 70, and the growth of frost. In other words, since the heat supplied from the high-pressure refrigerant of the refrigerant circuit 10 in the heating operation is supplied indirectly to the constituent member of the heat exchanger 70, the formation of frost on the constituent member is suppressed.

On the other hand, since a part of the coolant WT flows into the bypass passage 44, the heat radiation from the coolant to the refrigerant, and the heat absorption from the refrigerant to the coolant in the heat exchanger 70 are suppressed. In other words, a thermal mutual influence relationship between the coolant and the refrigerant is suppressed. As a result, the heat supplied from the external heat source HS, and the heat supplied from the refrigerant circuit 10 in the heat exchanger 80 are stored in the coolant circuit 40.

(b) Defrosting Operation (DEFROST)

Frost adhering to the exterior heat exchanger 16 is defrosted by the heat obtained from the coolant circuit 40 in the defrosting operation. The control device 100 stops the operation of the compressor 11, and also stops the operation of the fan 17 in the defrosting operation. Therefore, in the defrosting operation, the refrigerant flow rate that flows into the exterior heat exchanger 16 decreases, and the air volume of the air AR that flows into the heat exchanger 70 decreases as compared with the normal heating operation. Further, the control device 100 switches the three-way valve 42 so that the coolant passes through the radiator 43 as indicated by dashed arrows in FIG. 2. Therefore, the heat provided in the coolant that flows through the water tubes 43a of the radiator 43 is transferred to the exterior heat exchanger 16 through the fins 50 to defrost the exterior heat exchanger 16. That is, defrosting effectively utilizing the heat provided in the coolant circuit 40 is realized. The heat utilized in defrosting includes the waste heat supplied from the external heat source HS, and the heat stored in the coolant circuit 40. Also, the heat utilized in defrosting includes the heat supplied from the refrigerant circuit 10 to the coolant circuit 40 in the heat exchanger 80, and stored in the coolant circuit 40 in the heating operation.

In the heat exchanger 70, the fins 50 each formed of a metal member are arranged to enable heat transfer between the refrigerant tubes 16a and the water tubes 43a. As a result, the heat provided in the coolant can be transferred to the exterior heat exchanger 16 through the fins 50 in the defrosting operation. As a result, a defrosting operation time can be reduced.

Further, the operation of the compressor 11 stops in the defrosting operation, to thereby set the refrigerant flow rate that flows into the exterior heat exchanger 16 to be smaller than that before the operation is shifted to the defrosting operation, for example, to 0 (zero). Hence, the heat can be prevented from being absorbed by the refrigerant flowing through the refrigerant tubes 16a. In other words, since the operation of the compressor 11 stops to reduce the amount of absorbed heat of the refrigerant in the exterior heat exchanger 16 in the defrosting operation, the heat of the coolant circuit 40 including the external heat source HS can be effectively utilized for defrosting. Further, the operation of the fan 17 stops to set the air volume of the air AR that flows into the heat exchanger 70 to be smaller, for example, 0 (zero) in the defrosting operation. Hence, the heat can be prevented from being absorbed by the air AR. Further, in the refrigerant circuit 10, the heat of the external heat source HS is stored in the coolant circuit 40. Therefore, defrosting can be completed by the stored heat in a short time.

(c) Waste Heat Recovery Operation (HEAT2)

Heating within the vehicle compartment is executed with the external heat source HS as a heat source in the waste heat recovery operation. The heat of the coolant circuit 40 can be radiated to the air AR, but the waste heat recovery operation that transfers the heat of the coolant circuit 40 to the refrigerant circuit 10 to enhance the heating capacity is executed if predetermined conditions are met. For example, if the coolant temperature Tw exceeds the predetermined reference temperature, for example, 60° C. in the heating operation, the waste heat recovery operation can be executed.

Figure 3:
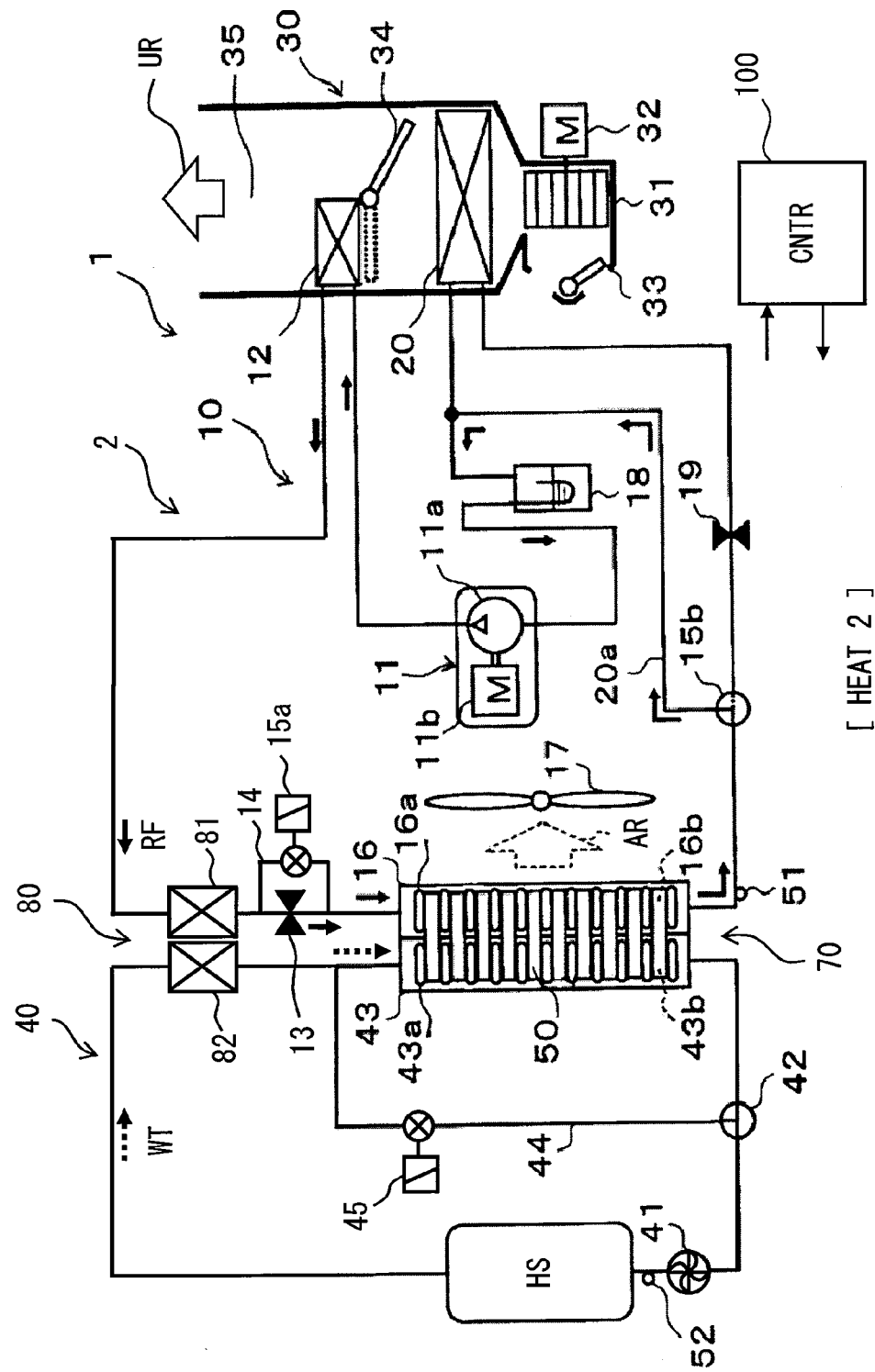
FIG. 3 is a schematic diagram illustrating a waste heat recovery operation of the heat pump cycle according to the first embodiment.

The three-way valve 15b is controlled in the same manner as that of the normal heating operation in the waste heat recovery operation. The three-way valve 42 is controlled in the same manner as that of the defrosting operation. Therefore, as indicated by solid arrows in FIG. 3, the high-pressure refrigerant discharged from the compressor 11 heats the air UR by the aid of the interior condenser 12, flows into the heat exchanger 80, and heats the coolant WT.

Thereafter, the high-pressure refrigerant is decompressed and expanded by the fixed aperture 13, and flows into the exterior heat exchanger 16. The low-pressure refrigerant that has flowed into the exterior heat exchanger 16 absorbs both of the heat provided in the air AR, and the heat provided in the coolant which is transferred through the fins 50, and is evaporated. In this way, the coolant circuit 40 supplies the heat which is absorbed by the refrigerant RF flowing in the refrigerant tubes 16a. According to this configuration, the absorption of heat into the refrigerant RF in the refrigerant tubes 16a is facilitated by the coolant WT flowing within the water tubes 43a. As a result, a large amount of heat can be absorbed by the refrigerant RF in the refrigerant tubes 16a. As a result, heating that effectively utilizes the waste heat of the external heat source HS can be realized.

(d) Cooling Operation (COOL)

Figure 4:
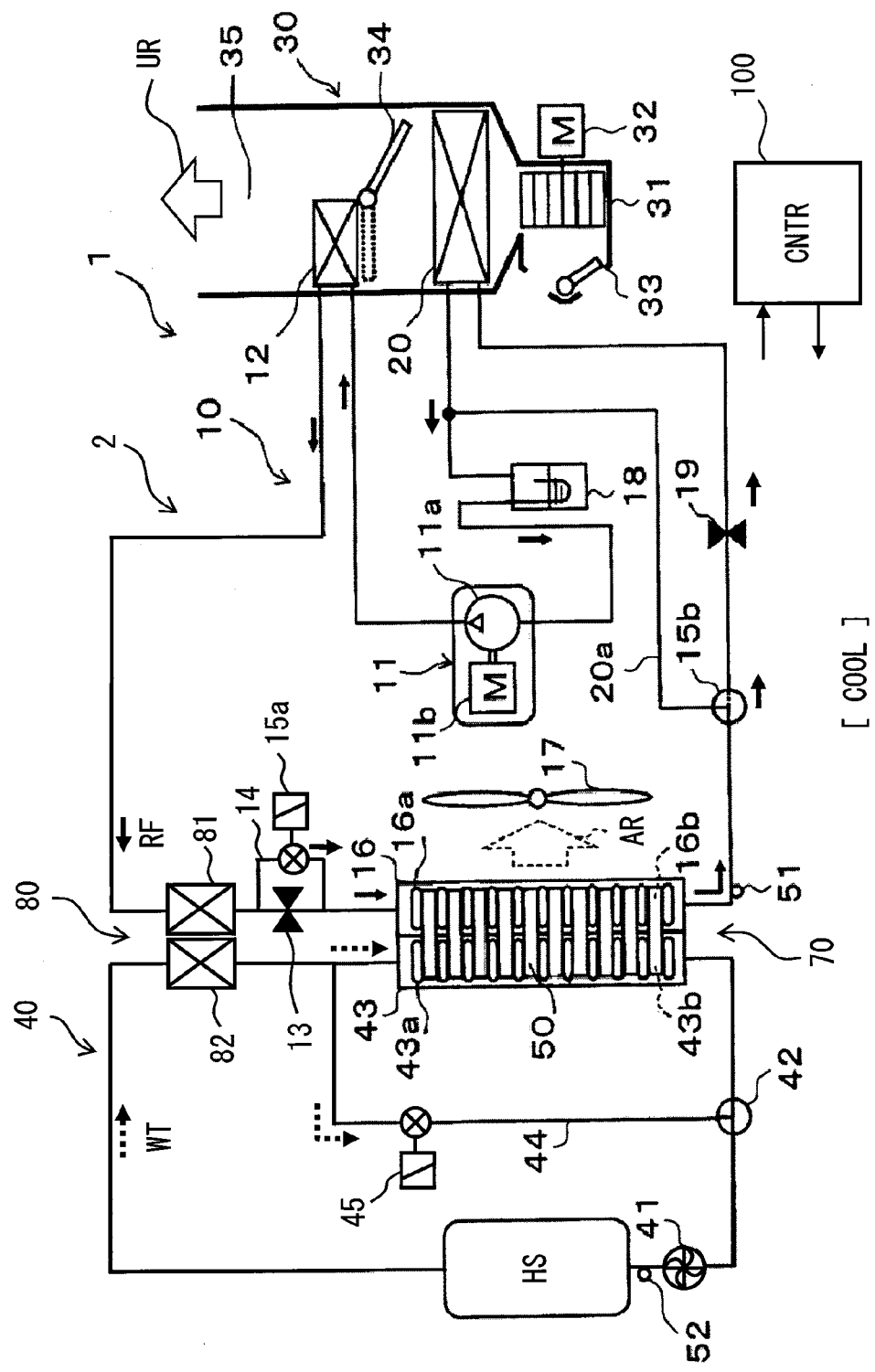
FIG. 4 is a schematic diagram illustrating a cooling operation of the heat pump cycle according to the first embodiment.

Cooling within the vehicle compartment is executed in the cooling operation. The cooling operation starts by the switch operated by the user of the vehicle. The refrigerant circuit 10 is controlled so that the on-off valve 15a is opened, the three-way valve 15b connects the exterior heat exchanger 16 and the fixed aperture 19, and the compressor 11 operates. The refrigerant flows in the refrigerant circuit 10 as indicated by solid arrows in FIG. 4. The coolant circuit 40 is controlled so that the three-way valve 42 allows the coolant to flow into the radiator 43 if the coolant temperature Tw exceeds the reference temperature, and the three-way valve 42 allows the coolant to pass through the bypass passage 44 if the coolant temperature Tw falls below the reference temperature. In FIG. 4, the flow of the coolant when the coolant temperature Tw exceeds the reference temperature is indicated by dashed arrows.

In the refrigerant circuit 10, the high-pressure refrigerant discharged from the compressor 11 flows into the interior condenser 12, and heats the air UR. Further, the high-pressure refrigerant flows into the heat exchanger 80, and heats the coolant WT. As a result, the coolant circuit 40 can also function as an auxiliary heat radiation device that draws the heat from the refrigerant circuit 10. Thereafter, the high-pressure refrigerant flows into the exterior heat exchanger 16 through the passage 14. The high-pressure refrigerant that has flowed into the exterior heat exchanger 16 further radiates the heat to the air AR blown by the fan 17.

The coolant WT heated by the high-pressure refrigerant in the heat exchanger 80 may flow into the radiator 43. In this case, the heat of the high-pressure refrigerant is radiated to the coolant WT through the heat exchanger 80, and the heat is further radiated from the coolant WT to the air AR in the radiator 43. The heat exchanger 80 provides heat exchange between the coolant WT that flows into the radiator 43, and the high-pressure refrigerant. The heat exchanger 70 provides the direct heat radiation from the high-pressure refrigerant to the air AR, and also provides the indirect heat radiation from the high-pressure refrigerant to the air AR through the coolant WT, in the cooling operation. The direct heat radiation is provided by the exterior heat exchanger 16 with the use of the fins 50. The indirect heat radiation is provided by the radiator 43 with the use of the fins 50. Both of the exterior heat exchanger 16 and the radiator 43 are used in the heating operation, and both of the exterior heat exchanger 16 and the radiator 43 are also used in the cooling operation.

The refrigerant that has flowed out of the exterior heat exchanger 16 is decompressed and expanded by the fixed aperture 19. The refrigerant that has flowed out of the fixed aperture 19 flows into the interior evaporator 20, absorbs heat from the air UR, and is evaporated. As a result, the air UR is cooled. The refrigerant that has flowed out of the interior evaporator 20 flows into the accumulator 18, and is separated into gas and liquid, sucked into the compressor 11, and again compressed.

When the refrigerant circuit 10 is subjected to the cooling operation, that is, when the exterior heat exchanger 16 functions as a condenser, the coolant circuit 40 may be positively used as an auxiliary heat radiation device that drains the heat from the refrigerant circuit 10. For example, the flow rate of the coolant WT that flows in the radiator 43 is maximized in the cooling operation. As a result, the heat radiation from the refrigerant circuit 10 to the coolant circuit 40 is facilitated, and the cooling performance of the refrigerant circuit 10 can be enhanced.

Figure 5:
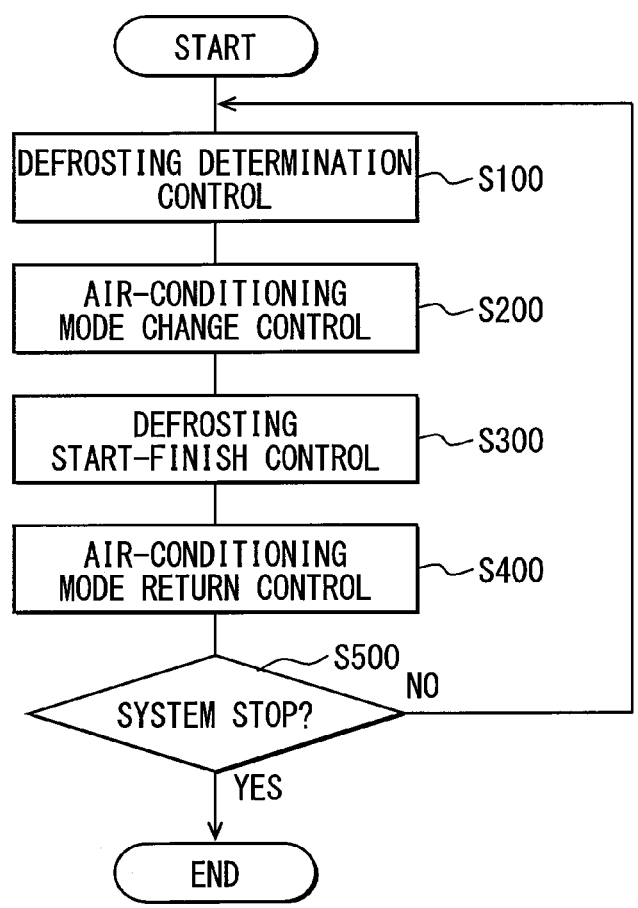
FIG. 5 is a flowchart illustrating a defrosting control of the heat pump cycle according to the first embodiment.

FIG. 5 is a flowchart illustrating a control for shifting to defrosting control to be executed in the heating operation. Frost is formed in the exterior heat exchanger 16, and it is determined whether defrosting is conducted, or not, at Step S100. An air-conditioning mode of the air conditioning unit 30 is controlled to suppress a change in an air conditioning state under the defrosting control at Step S200. The defrosting control is executed at Step S300. A start of the defrosting control and a completion of the defrosting control are controlled at Step S300. The air conditioning unit 30 returns to the air-conditioning mode before starting the defrosting operation at Step S400. It is determined whether the stop of the air conditioner 1 is requested, or not, at Step S500. If the stop of the air conditioner 1 is not requested, the control returns to Step S100, and if the stop of the air conditioner 1 is requested, the control is completed.

Figure 6:
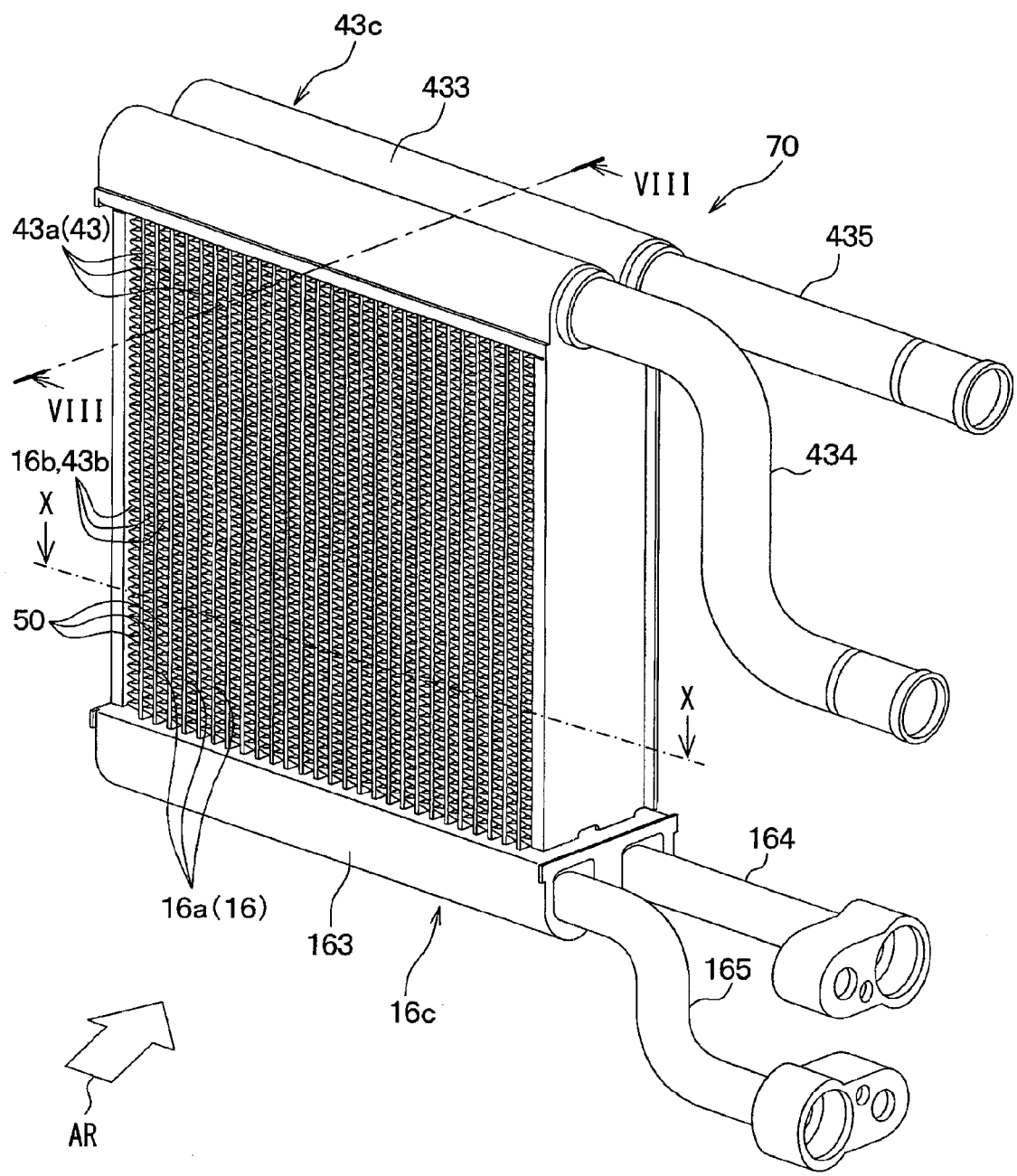
FIG. 6 is a perspective view of a heat exchanger available in the heat pump cycle according to the first embodiment.
Figure 7:
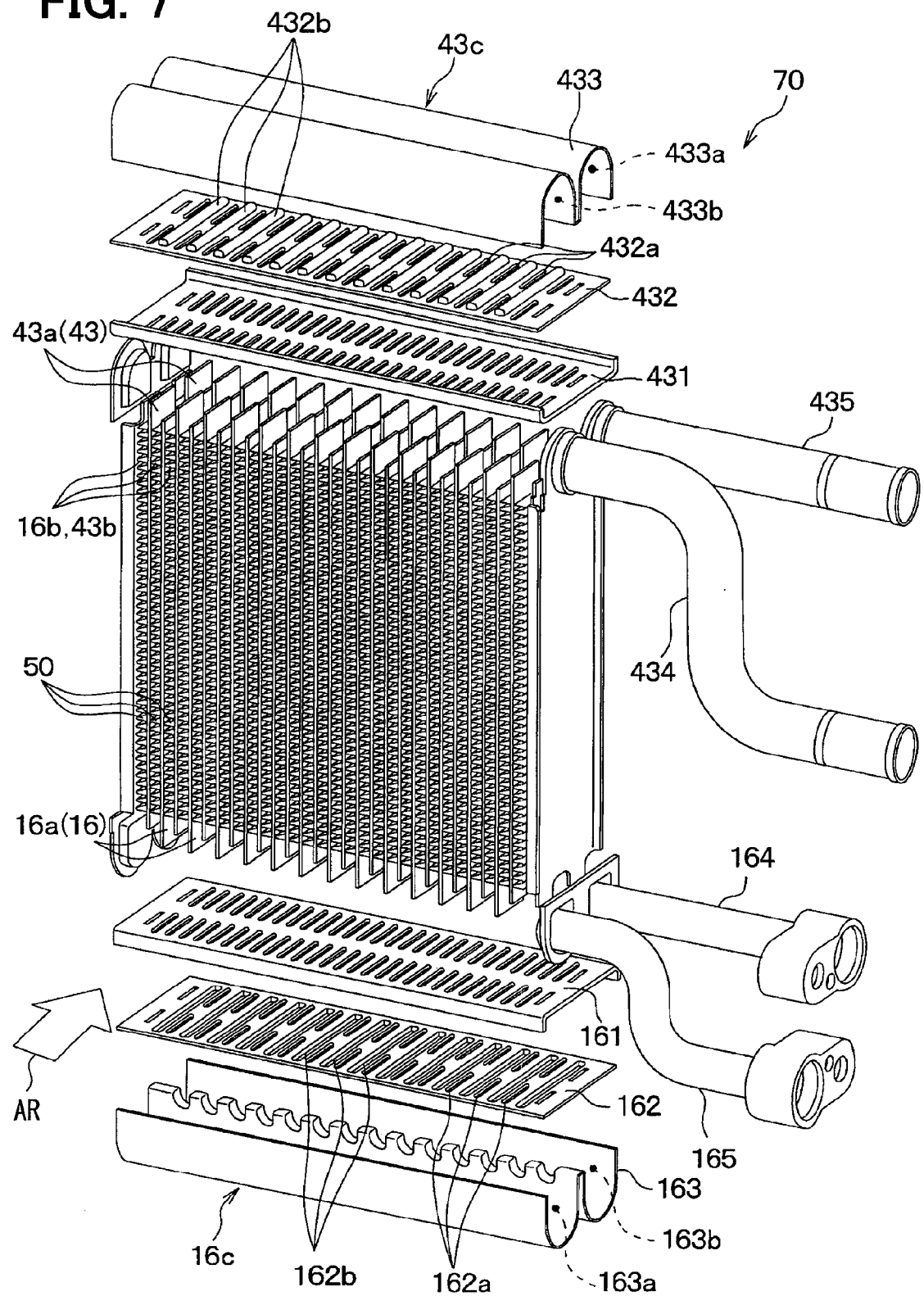
FIG. 7 is an exploded view of the heat exchanger according to the first embodiment.

Referring to FIGS. 6 to 10, the heat exchanger 70 is a so-called tank and tube type heat exchanger. As illustrated in FIGS. 6 and 7, the refrigerant tubes 16a and the water tubes 43a are arranged in two rows along the flow direction of the air AR. The refrigerant tubes 16a and the water tubes 43a are alternately arranged on both of the upstream row and the downstream row. Therefore, a heat absorption air passage 16b and a heat radiation air passage 43b are shared by the upstream row and the downstream row. The fins 50 are arranged in the shared passages 16b and 43b. The fins 50 are joined to the tubes 16a and 43a adjacent to the fins 50. The multiple refrigerant tubes 16a, the multiple water tubes 43a, and the multiple fins 50 are stacked on each other, and joined together to form the heat exchange unit. This heat exchange unit provides the heat exchange between multiple fluids, for example, three fluids including the refrigerant RF, the coolant WT, and the air AR.

A first tank 16c for collecting or distributing the refrigerant and the coolant is arranged on one end side of the multiple refrigerant tubes 16a and water tubes 43a in the longitudinal direction thereof, on a lower portion of the figure. The first tank receives the refrigerant, and discharges the refrigerant, and therefore is also called "refrigerant tank". The first tank also provides a coupling unit that guides the coolant from one water tube 43a to another water tube 43a.

The first tank 16c includes a connection plate member 161 connected to the refrigerant tubes 16a and the water tubes 43a which are arranged in two rows, an intermediate plate member 162 fixed to the connection plate member 161, and a first tank member 163. Through-holes that penetrate through two sides of the connection plate member 161 are formed in the connection plate member 161 at portions corresponding to the multiple tubes 16a and 43a. The multiple tubes 16a and 43a penetrate through those through-holes, and are fixed thereto.

Through-holes 162a that penetrate through two sides of the intermediate plate member 162 are formed at portions of the intermediate plate member 162 corresponding to the refrigerant tubes 16a. The refrigerant tubes 16a are arranged to penetrate through the through-holes 162a. In the first tank 16c, the refrigerant tubes 16a are protruded toward the first tank 16c side more than the water tubes 43a. The first tank member 163 is fixed to the connection plate member 161 and the intermediate plate member 162 to form a collection space 163a in which the refrigerant is collected, and a distribution space 163b in which the refrigerant is distributed, inside of the first tank member 163. The first tank member 163 is formed into a W-shape when viewed from in a longitudinal direction thereof, by pressing a metal plate. A center portion of the first tank member 163 is joined to the intermediate plate member 162. The collection space 163a and the distribution space 163b are partitioned as spaces independent from each other. The collection space 163a is arranged upstream of the air AR, and the distribution space 163b is arranged downstream of the air AR.

Plate-shaped cover members are fixed to both ends of the first tank member 163 in the longitudinal direction thereof. One end of the distribution space 163b is connected with an inlet pipe 164 into which the refrigerant flows. One end of the collection space 163a is connected with an outlet pipe 165 out of which the refrigerant flows.

A second tank 43c for collecting or distributing the refrigerant and the coolant is arranged on the other end of the multiple tubes 16a and 43a in the longitudinal direction thereof, on an upper portion of the drawing. The second tank receives the coolant, and discharges the coolant, and therefore is also called "water tank". The second tank also provides a coupling unit that guides the refrigerant from one refrigerant tube 16a to another refrigerant tube 16a.

The second tank 43c basically has the same configuration as that of the first tank 16c. The second tank 43c includes a connection plate member 431, an intermediate plate member 432, and a second tank member 433. Through-holes 432a that penetrate through two sides of the intermediate plate member 432 are formed at portions of the intermediate plate member 432 corresponding to the water tubes 43a. The water tubes 43a are arranged to penetrate through the through-holes 432a, and are fixed thereto. In the second tank 43c, the water tubes 43a are protruded toward the second tank 43c side more than the refrigerant tubes 16a. Further, the second tank member 433 forms a collection space 433a in which the coolant is collected, and a distribution space 433b in which the coolant is distributed. The distribution space 433b is arranged upstream of the air AR, and the collection space 433a is arranged downstream of the air AR.

Plate-shaped cover members are fixed to both ends of the second tank member 433 in the longitudinal direction thereof. One end of the distribution space 433b is connected with an inlet pipe 434 into which the coolant flows. One end of the collection space 433a is connected with an outlet pipe 435 out of which the coolant flows.

Figure 8:
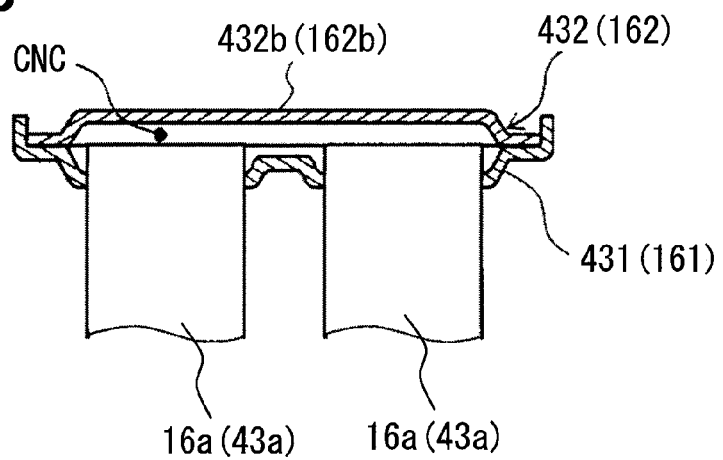
FIG. 8 is a cross-sectional view taken along a line VIII-VIII of FIG. 6.

As illustrated in FIG. 8, spaces CNC that provide communication portions are formed between the intermediate plate members 162, 432, and the connection plate members 161, 431. Multiple recesses 162b and 432b are formed in the intermediate plate members 162 and 432, respectively. The multiple recesses 162b and 432b form multiple spaces CNC communicated with the tubes 43a and 16a between the intermediate plate members 162, 432, and the connection plate members 161, 431, by fixing the intermediate plate members 162 and 432 to the connection plate members 161 and 431, respectively. The spaces CNC formed between the intermediate plate member 162 and the connection plate member 161 communicate the two water tubes 43a arranged in two rows in the flow direction of the air AR with each other. The spaces CNC formed between the intermediate plate member 432 and the connection plate member 431 communicate the two refrigerant tubes 16a arranged in two rows in the flow direction of the air AR with each other.

Figure 9:
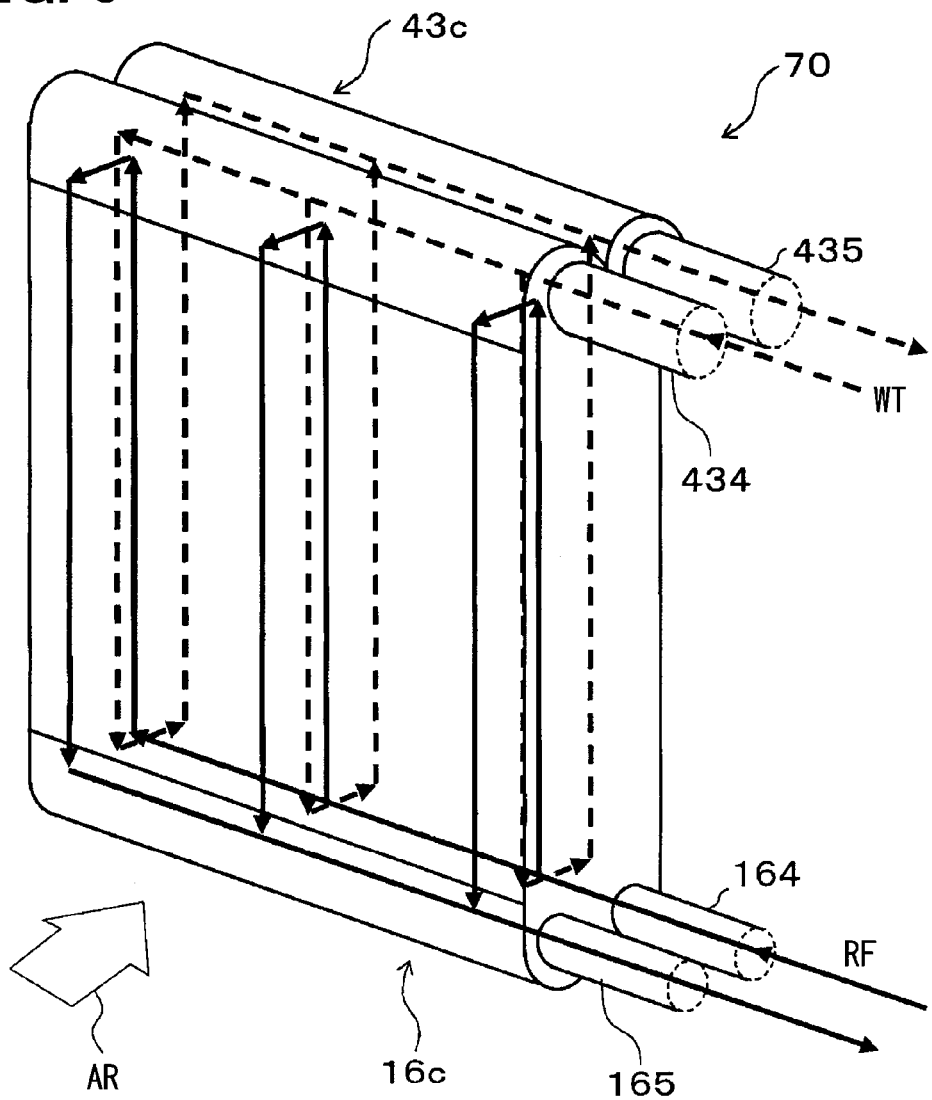
FIG. 9 is a schematic perspective diagram illustrating flows of fluids in the heat exchanger according to the first embodiment.

As illustrated in FIG. 9, the refrigerant RF and the coolant WT flow in a counterflow in most portions of the interior of the heat exchanger 70. Solid arrows indicate a flow of the refrigerant RF. Dashed arrows indicate a flow of the coolant WT.

The refrigerant RF flows into the distribution space 163b of the first tank 16c through the inlet pipe 164, and flows into the refrigerant tubes 16a of the downstream row. The refrigerant flows within the refrigerant tubes 16a of the downstream row upward in the drawing. The refrigerant that has flowed out of the refrigerant tubes 16a in the downstream row flows into the refrigerant tubes 16a of the upstream row through the spaces CNC of the second tank 43c. The refrigerant flows in the refrigerant tubes 16a of the upstream row downward in the figure. The refrigerant that has flowed out of the refrigerant tubes 16a in the upstream row is collected in the collection space 163a of the first tank 16c, and thereafter flows out of the outlet pipe 165. Hence, in the heat exchanger 70, the refrigerant flows in a U-turn manner from the downstream row to the upstream row.

The coolant WT flows into the distribution space 433b of the second tank 43c through the inlet pipe 434, and flows into the water tubes 43a in the upstream row. The coolant flows within the water tubes 43a of the upstream row downward in the drawing. The refrigerant that has flowed out of the water tubes 43a in the upstream row flows into the water tubes 43a of the downstream row through the spaces CNC of the first tank 16c. The coolant flows in the water tubes 43a of the downstream row upward in the drawing. The coolant that has flowed out of the water tubes 43a in the downstream row is collected in the collection space 433a of the second tank 43c, and thereafter flows out of the outlet pipe 435. Hence, in the heat exchanger 70, the coolant flows from the upstream row to the downstream row in the U-turn manner.

The refrigerant tubes 16a and the water tubes 43a are arranged so that one water tube 43a is located adjacent to one refrigerant tube 16a through the fins 50. This arrangement is effective in efficiently transferring the heat supplied from the water tubes 43a to the frost that grows in the vicinity of the refrigerant tubes 16a. In at least a part of the heat exchanger 70 in the upstream row, one refrigerant tube 16a is arranged between the two water tubes 43a. Also, in at least a part of the heat exchanger 70 in the upstream row, one water tube 43a is arranged between the two refrigerant tubes 16a. In other words, the refrigerant tubes 16a and the water tubes 43a are alternately arranged in at least the upstream row. Further, the refrigerant tubes 16a and the water tubes 43a are alternately arranged even in the downstream row.

The air passage 16b for allowing the refrigerant tubes 16a to absorb the heat, and the air passage 43b for allowing the water tubes 43a to radiate the heat are provided by a common air passage. For that reason, the frost that has grown in the vicinity of the refrigerant tubes 16a can be efficiently defrosted by the heat of the water tubes 43a.

Figure 10:
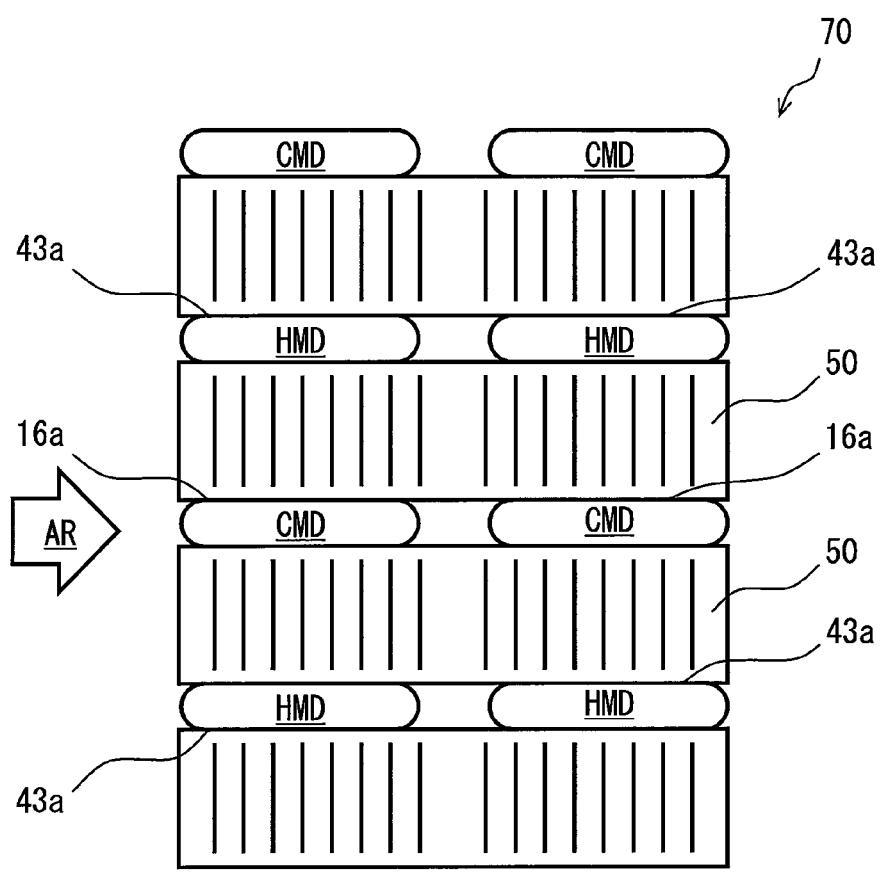
FIG. 10 is a schematic cross-sectional diagram taken along a line X-X of FIG. 6.

As illustrated in FIG. 10, the refrigerant tubes 16a allow the low-temperature medium CMD to flow therein in the heating operation. As the low-temperature medium CMD, the low-pressure refrigerant within the refrigerant circuit 10 may be used as an example. The water tubes 43a allow the high-temperature medium HMD higher in temperature than the low-temperature medium CMD to flow therein in the heating operation. As the high-temperature medium HMD, the coolant WT within the coolant circuit 40 may be used as an example. However, the high temperature of the high-temperature medium HMD is caused by the heat supplied from the high-pressure refrigerant of the refrigerant circuit 10 through the heat exchanger 80. Hence, the high temperature of the high-temperature medium HMD is supplied by the refrigerant circuit 10 as with the low temperature of the low-temperature medium CMD.

Frost tries to adhere to surfaces of the refrigerant tubes 16a and the fins 50, and grow due to the low-temperature medium CMD. However, since the high-temperature medium HMD flows in the water tubes 43a, the adhesion of frost onto the constituent members of the heat exchanger 70 such as the tubes 16a, 43a, and the fins 50, and the growth of frost are suppressed during the heating operation.

Further, the high-temperature medium HMD flows in the water tubes 43a even in the defrosting operation. The temperature of the high-temperature medium HMD in the defrosting operation is a temperature of the degree that a lump of frost that has largely grown is melted, for example, 60° C. or higher. Also, in order to supply a necessary amount of heat for melting the lump of frost, a sufficient flow rate of coolant flows in the water tubes 43a.

In the heat exchanger 70, the refrigerant tubes 16a and the water tubes 43a are thermally coupled with each other through the fins 50. When both of the low-temperature medium CMD and the high-temperature medium HMD conduct the heat exchange with the air AR, the fins 50 is used by the refrigerant tubes 16a and the water tubes 43a. However, when the flow of the high-temperature medium HMD is blocked, only the refrigerant tubes 16a can use the overall fins 50. For that reason, the heat exchanger 70 can provide a large heat exchange area between the refrigerant tubes 16a and the air AR. This configuration is used as a large heat radiation area in the cooling use, and used as a large heat absorption area in the heating use.

According to this embodiment, the heat supplied from the high-pressure refrigerant of the refrigerant circuit 10 is supplied to the heat exchanger 70 as the evaporator of the refrigerant circuit 10. As a result, the suppression of the formation of frost, and an improvement in defrosting are conducted by the refrigerant circuit 10 without depending on only the external heat source HS other than the refrigerant circuit 10.

Specifically, as illustrated in FIG. 1, the heat is extracted from the high-pressure refrigerant by the heat exchanger 80, and the heat is supplied indirectly to the heat exchanger 70 through the coolant WT, during a period where the heat exchanger 70 functions as the evaporator. In other words, in order to suppress the adhesion of frost onto the exterior heat exchanger 16, the radiator 43 supplies the heat to the exterior heat exchanger 16 when the exterior heat exchanger 16 absorbs the heat. As a result, the adhesion of frost onto the heat exchanger 70, and the growth of frost are suppressed.

Figure 2:
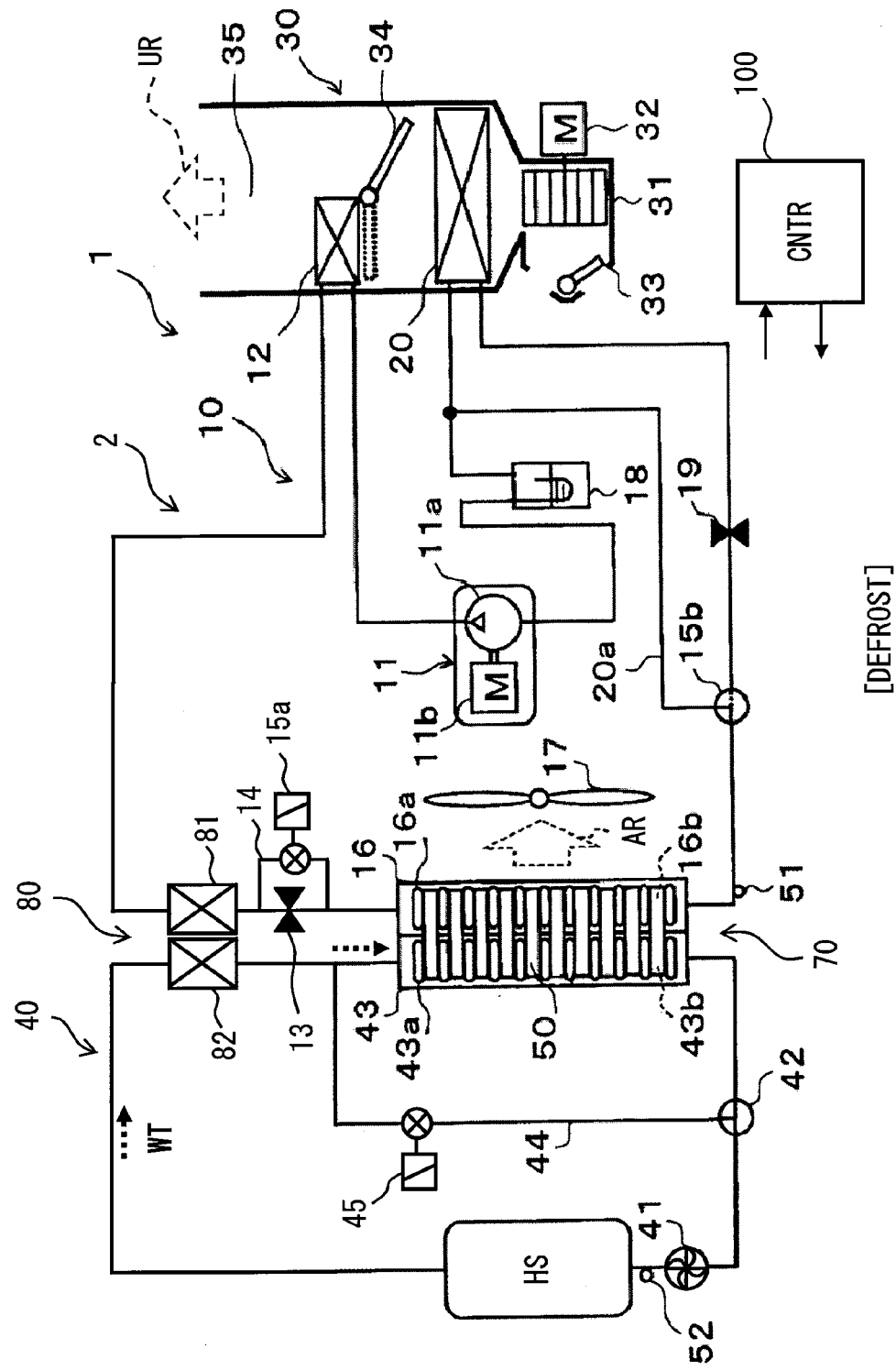
FIG. 2 is a schematic diagram illustrating a defrosting operation of the heat pump cycle according to the first embodiment.

Also, as illustrated in FIG. 1, the heat is extracted from the high-pressure refrigerant by the heat exchanger 80, and the heat is stored in the coolant WT during a period where the heat exchanger 70 functions as the evaporator. After the above heat storing operation has been conducted, as illustrated in FIG. 2, after the heat exchanger 70 functions as the evaporator, particularly after frost has adhered to the heat exchanger 70, the heat extracted from the high-pressure refrigerant by the heat exchanger 80 and stored therein is supplied indirectly to the heat exchanger 70 through the coolant WT. In other words, in order to defrost the frost adhered to the exterior heat exchanger 16 and the heat exchanger 70, the radiator 43 supplies the heat from the coolant WT to the exterior heat exchanger 16 after the exterior heat exchanger 16 has absorbed the heat. As a result, the frost adhered to the heat exchanger 70 is removed.

Second Embodiment

Figure 11:
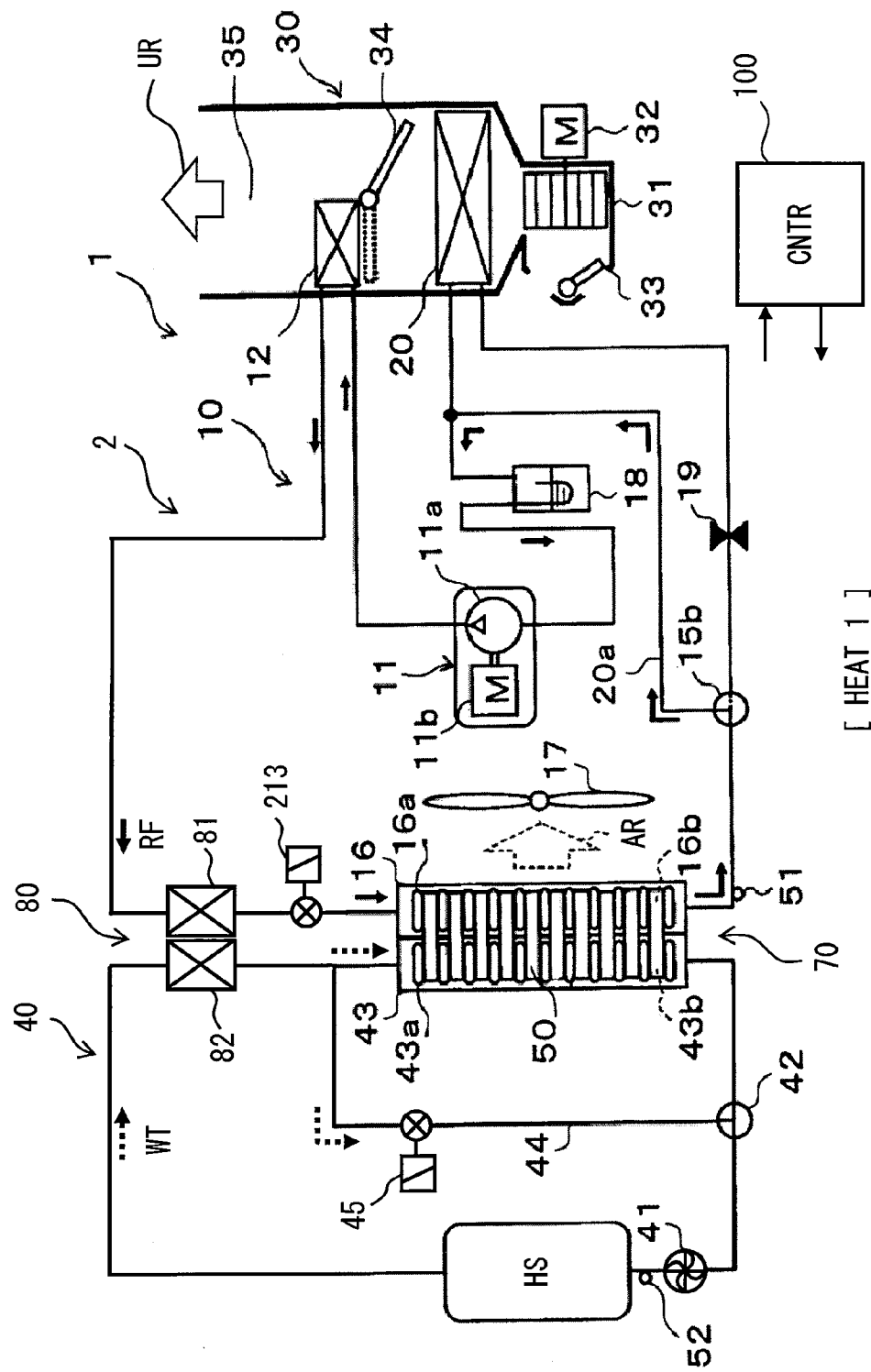
FIG. 11 is a schematic diagram illustrating a heating operation of a heat pump cycle according to a second embodiment of the present disclosure.

In the following description, changes and differences from the preceding embodiment will be mainly described. A subsequent embodiment is a modified example based on any one of the preceding embodiments. The above embodiment provides the switching device that switches the refrigerant to be supplied to the heat exchanger 70 between the high-pressure refrigerant and the low-pressure refrigerant with the use of the fixed aperture 13 and the on-off valve 15a. Instead, in this embodiment, as illustrated in FIG. 11, an expansion valve 213 is applied. The expansion valve 213 is an electric expansion valve that can regulate its opening degree. The expansion valve 213 can regulate the opening degree in a range from a small opening degree corresponding to the fixed aperture 13 to a large opening degree corresponding to a full opening degree of the on-off valve 15a.

The expansion valve 213 is controlled to the small opening degree that functions as the aperture in the heating operation, and controlled to the large opening degree in the cooling operation.

Third Embodiment

Figure 12:
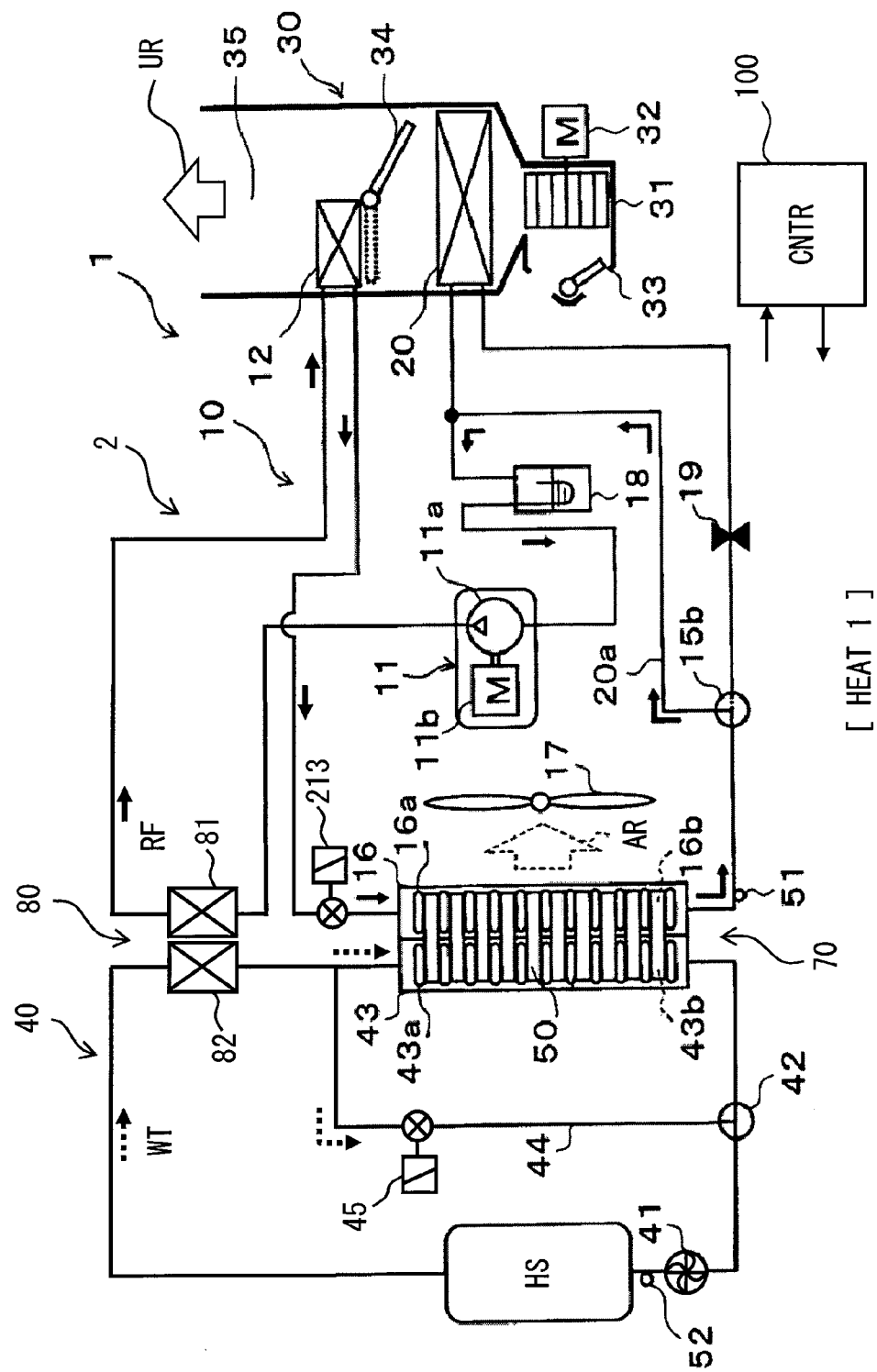
FIG. 12 is a schematic diagram illustrating a heating operation of a heat pump cycle according to a third embodiment of the present disclosure.

In the above embodiment, the heat exchanger 80 is disposed downstream of the interior condenser 12 in the refrigerant circuit 10. Instead, in this embodiment, as illustrated in FIG. 12, the heat exchanger 80 is disposed upstream of the interior condenser 12. In this configuration, the high-pressure refrigerant immediately after having been discharged from the compressor 11 is supplied to the heat exchanger 80.

Fourth Embodiment

Figure 13:
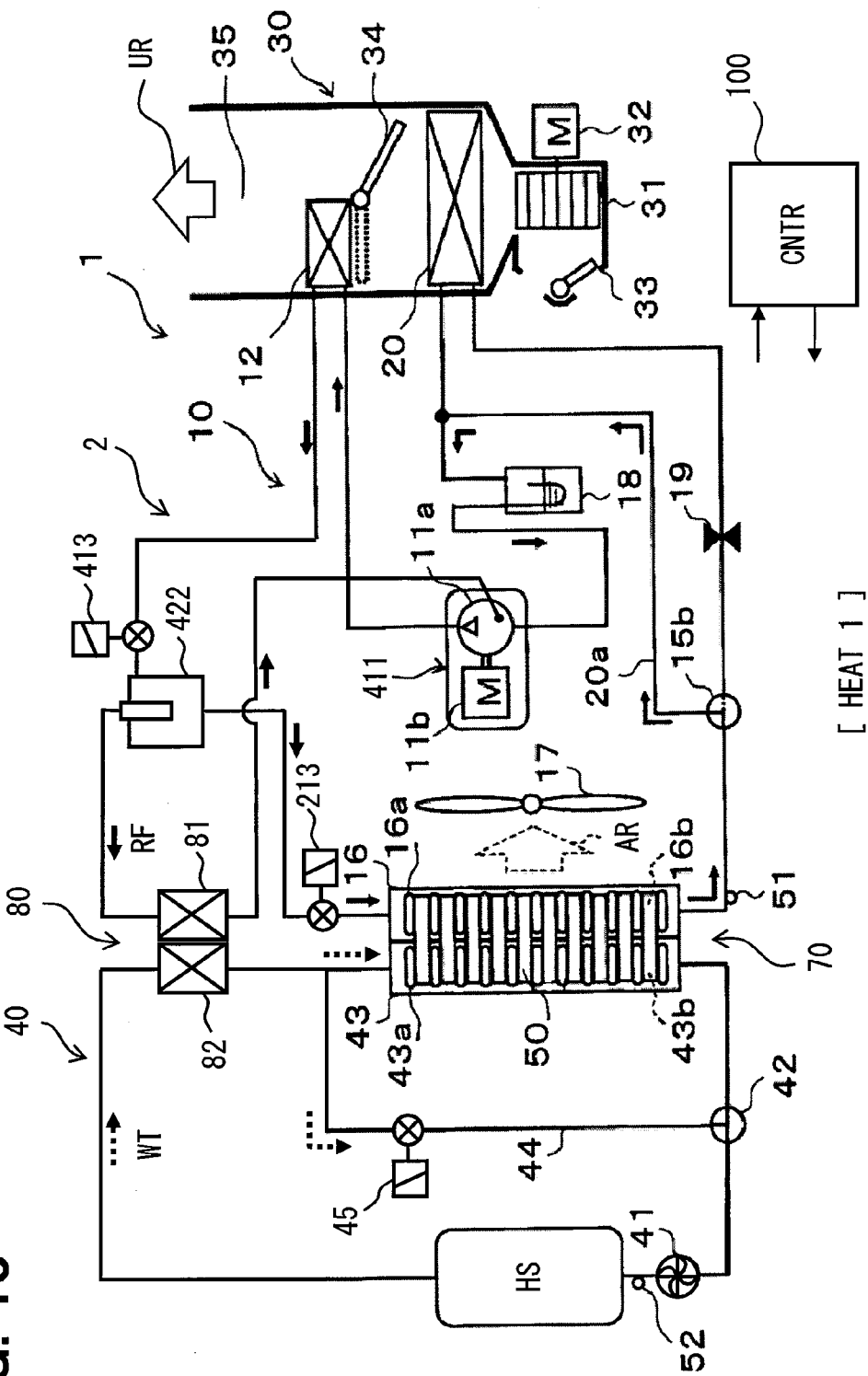
FIG. 13 is a schematic diagram illustrating a heating operation of a heat pump cycle according to a fourth embodiment of the present disclosure.

In the above embodiment, the heat of the high-pressure refrigerant is extracted in the heat exchanger 80, and supplied to the heat exchanger 70. Instead, in this embodiment, as illustrated in FIG. 13, heat of an intermediate-pressure refrigerant having an intermediate pressure between the high-pressure refrigerant in the condenser and the low-pressure refrigerant in the evaporator is extracted in the heat exchanger 80.

The refrigerant circuit 10 includes a compressor 411 having a gas injection port. The compressor 411 sucks the intermediate-pressure refrigerant from the gas injection port. The refrigerant circuit 10 includes a decompressor 413 and a gas-liquid separator 422 downstream of the interior condenser 12. The decompressor 413 decompresses the high-pressure refrigerant to the intermediate-pressure refrigerant. The intermediate-pressure refrigerant is further decompressed to the low-pressure refrigerant by the expansion valve 213. The gas-liquid separator 422 separates the intermediate-pressure refrigerant into a gas refrigerant and a liquid refrigerant. The gas refrigerant is supplied to the heat exchanger 80. The gas refrigerant that has passed through the heat exchanger 80 is sucked by the compressor 411. The liquid refrigerant is supplied to the heat exchanger 70 through the expansion valve 213.

The gas refrigerant supplied to the heat exchanger 80 is the intermediate-pressure refrigerant. The gas refrigerant is the high-temperature refrigerant having a temperature higher than the temperature of the low-pressure refrigerant in the evaporator. Hence, the heat obtained from the intermediate-pressure refrigerant in the heat exchanger 80 enables the exterior heat exchanger 16 functioning as the evaporator to be heated.

Fifth Embodiment

Figure 14:
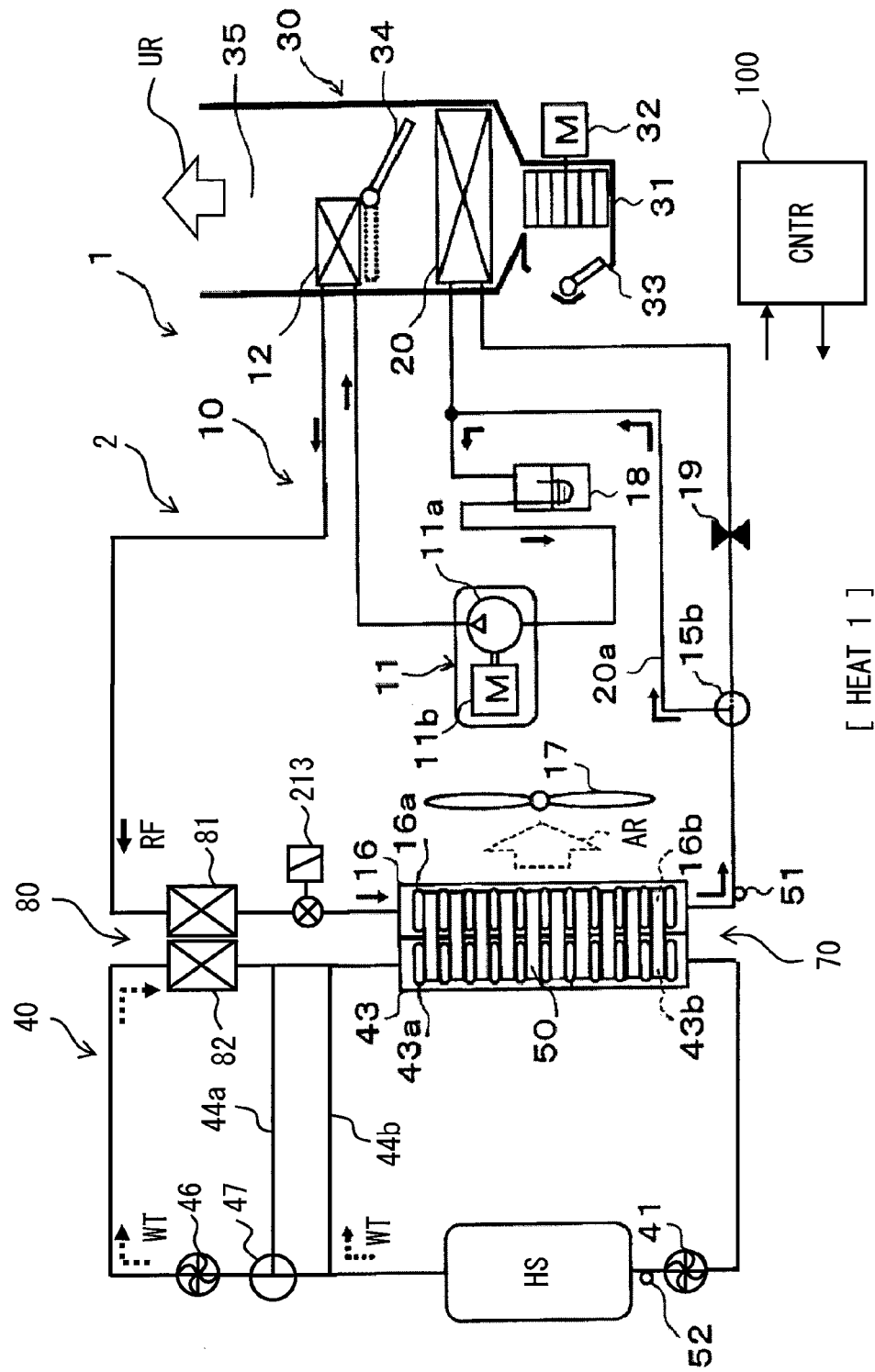
FIG. 14 is a schematic diagram illustrating a heating operation of a heat pump cycle according to a fifth embodiment of the present disclosure.

In the above embodiment, the heat obtained in the heat exchanger 80 is used for both of the suppression of the formation of frost in the heating operation and an improvement in the defrosting performance in the defrosting operation. Instead, in this embodiment, the heat obtained in the heat exchanger 80 is used for only the improvement in the defrosting performance in the defrosting operation. The coolant circuit 40 is configured as illustrated in FIG. 14. The coolant circuit 40 configures a closed circuit including the heat exchanger 80, the heat exchanger 70, and the external heat source HS. Further, the coolant circuit 40 includes a pump 46, a bypass passage 44*a*, and a three-way valve 47 so as to configure a closed circuit including only the heat exchanger 80. Further, the coolant circuit 40 includes the pump 41 and a bypass passage 44*b* so as to configure a closed circuit having only the heat exchanger 70 and the external heat source HS.

In this configuration, the pump 46 allows the coolant WT to flow in the closed circuit that passes through the heat exchanger 80 and the bypass passage 44*a* in the heating operation. With the above configuration, the heat of the refrigerant obtained in the heat exchanger 80 is stored in the coolant WT. Also, the heat stored in the coolant is supplied to the heat exchanger 70 in the normal heating operation. As a result, the formation of frost when the exterior heat exchanger 16 absorbs the heat is suppressed.

The coolant WT flows to pass through the heat exchanger 80, the heat exchanger 70, and the external heat source HS in stated order in the defrosting operation. With this configuration, the heat stored in the coolant WT is supplied to the heat exchanger 70 to execute defrosting.

The coolant WT flows through the bypass passage 44*b*, the heat exchanger 70, and the external heat source HS in the waste heat recovery operation. As a result, the heat of the external heat source HS is supplied to the heat exchanger 70. The coolant flows in the heat exchanger 70 so that the heat discharged from the refrigerant circuit 10 can be accepted by the coolant in the heat exchanger 70, in the cooling operation. In this situation, the cooling performance can be enhanced by a heat capacity of the coolant WT.

Sixth Embodiment

Figure 15:
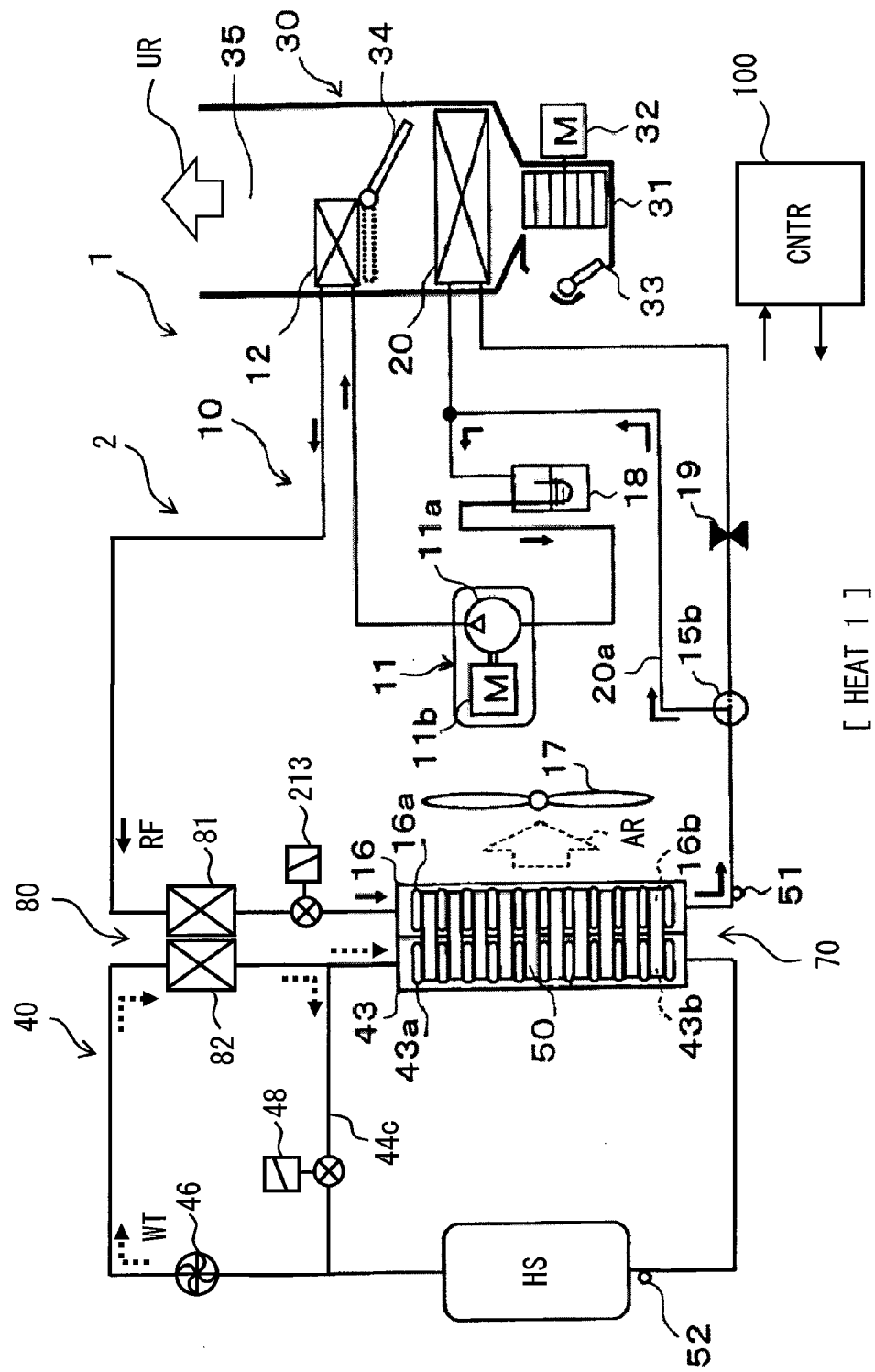
FIG. 15 is a schematic diagram illustrating a heating operation of a heat pump cycle according to a sixth embodiment of the present disclosure.

In the above embodiment, the bypass passage 44 is disposed to bypass the heat exchanger 70. Instead, in this embodiment, as illustrated in FIG. 15, a bypass passage 44*c* is disposed to configure the closed circuit including only the heat exchanger 80. A flow rate regulation valve 48 is disposed in the bypass passage 44*c*. The pump 46 is disposed in the closed circuit that passes through the heat exchanger 80 and the bypass passage 44*c*.

The pump 46 operates in the heating operation. The flow rate regulation valve 48 regulates the flow rate so that a part of the coolant WT flows in the bypass passage 44*c*, and the remaining part of the coolant WT flows in the heat exchanger 70 and the external heat source HS. With this configuration, the heat of the refrigerant obtained in the heat exchanger 80 is stored in the coolant WT. At the same time, a part of the heat obtained in the heat exchanger 80 is supplied to the heat exchanger 70. With this configuration, the formation of frost is suppressed by not only the heat of the external heat source HS but also the heat obtained in the heat exchanger 80.

The coolant WT flows to pass through the heat exchanger 80, the heat exchanger 70, and the external heat source HS in the stated order in the defrosting operation. With this configuration, the heat stored in the coolant WT is supplied to the heat exchanger 70 to execute defrosting.

The coolant WT flows to pass through the heat exchanger 80, the heat exchanger 70, and the external heat source HS in the stated order in the waste heat recovery operation. As a result, the heat of the external heat source HS, and the heat of the refrigerant circuit 10, which has been obtained in the heat exchanger 80, are supplied to the heat exchanger 70. Also, the heat stored in the coolant in the normal heating operation is supplied to the heat exchanger 70. The coolant flows in the heat exchanger 70 so that the heat discharged from the refrigerant circuit 10 can be accepted by the coolant in the heat exchanger 70, in the cooling operation.

Seventh Embodiment

Figure 16:
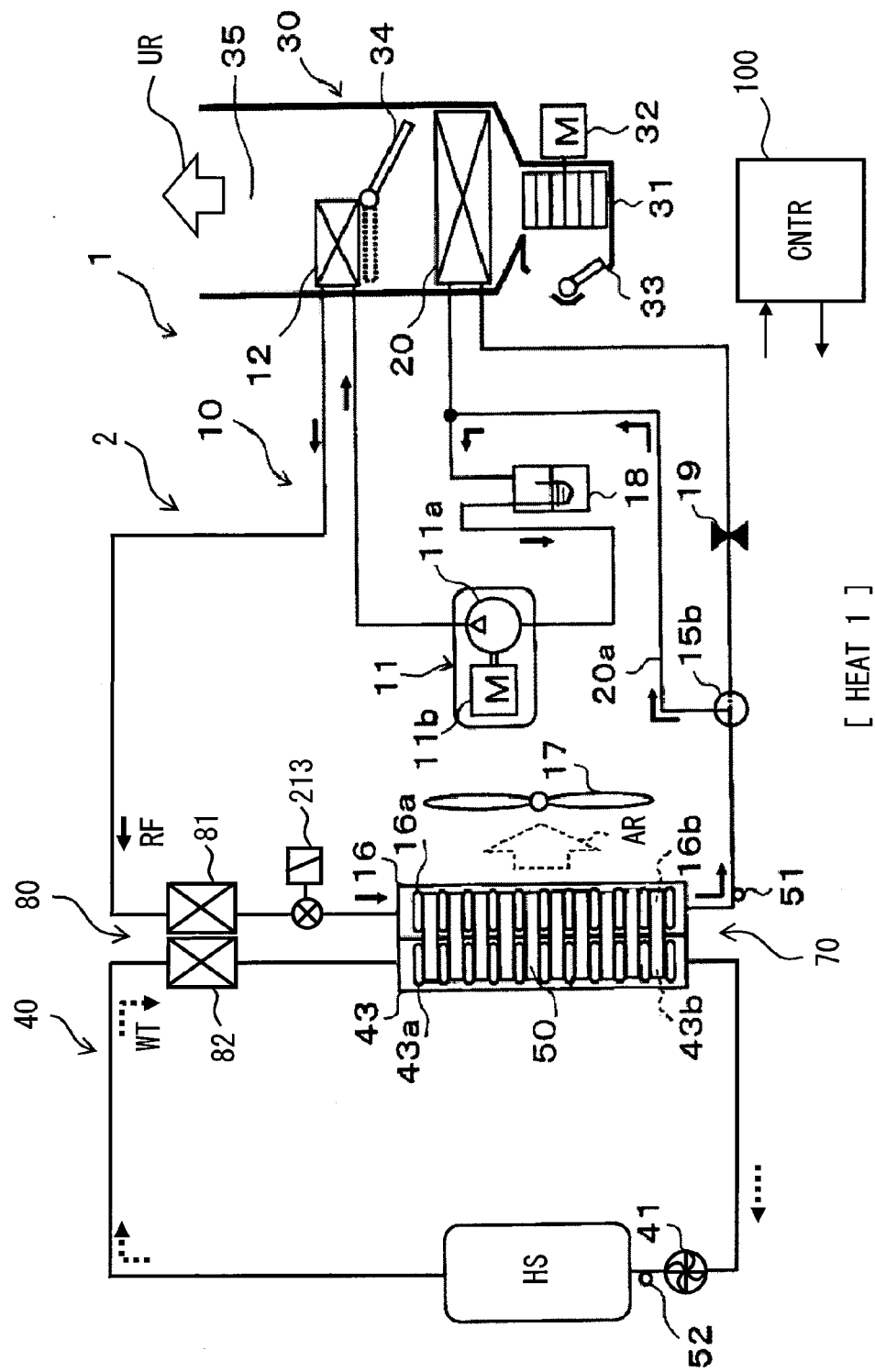
FIG. 16 is a schematic diagram illustrating a heating operation of a heat pump cycle according to a seventh embodiment of the present disclosure.

In the above embodiment, the bypass passage 44 is disposed to bypass the heat exchanger 70. Instead, in this embodiment, as illustrated in FIG. 16, the coolant circuit 40 is configured by only a closed circuit. The pump 41 is controlled to regulate the circulation rate in the coolant circuit 40.

For example, the pump 41 is controlled so that the heat obtained in the heat exchanger 80 is carried to the heat exchanger 70, in the heating operation. The pump 41 is controlled so that the heat stored in the coolant circuit 40 is supplied to the heat exchanger 70, in the defrosting operation. The pump 41 is controlled so that the heat of the external heat source HS is supplied to the heat exchanger 70 in the waste heat recovery operation. The pump 41 is controlled so that the heat discharged from the refrigerant circuit 10 is accepted by the coolant WT, in the cooling operation.

Eighth Embodiment

Figure 17:
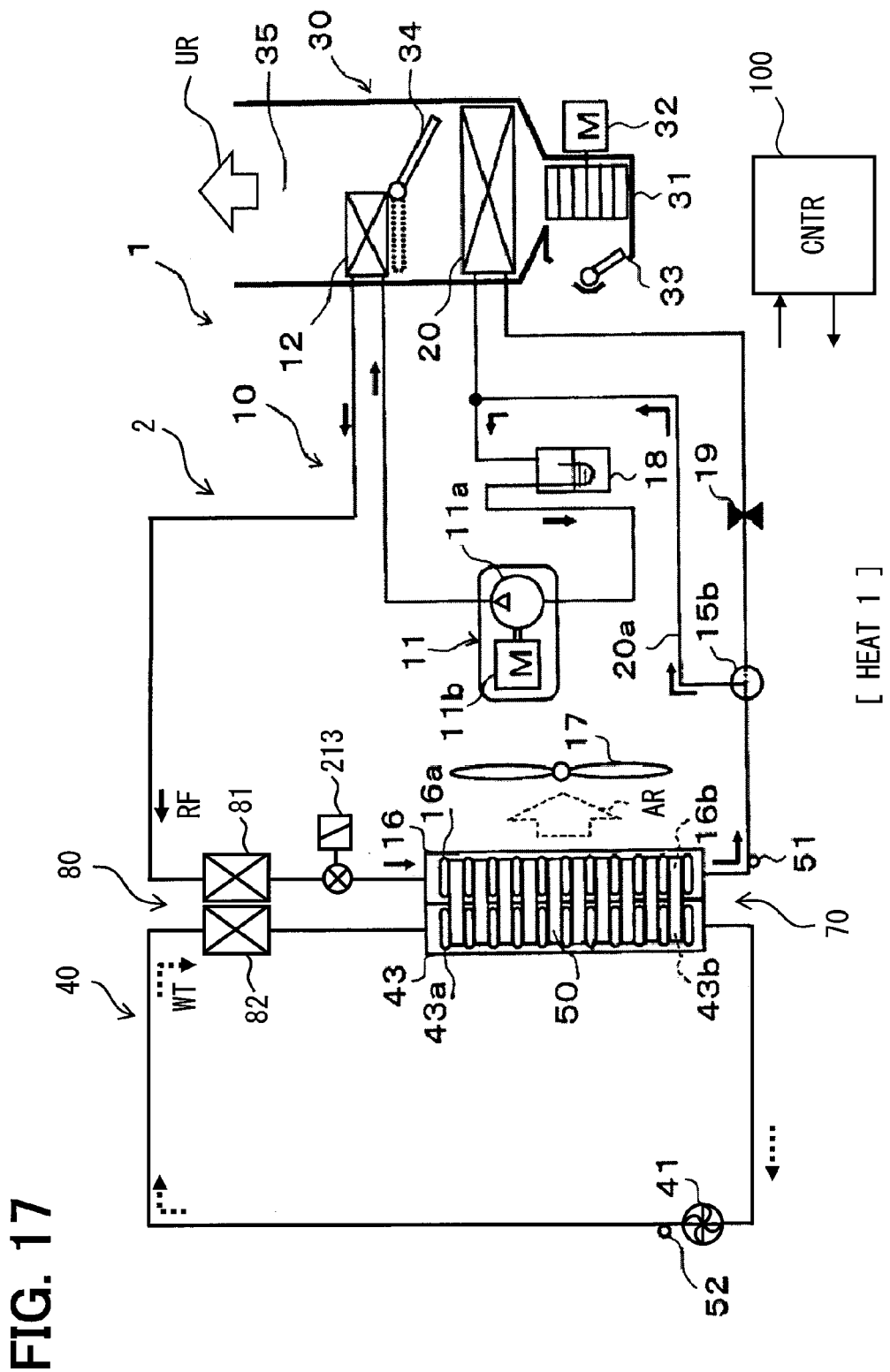
FIG. 17 is a schematic diagram illustrating a heating operation of a heat pump cycle according to an eighth embodiment of the present disclosure.

In the above embodiment, the external heat source HS is disposed in the coolant circuit 40. Instead, in this embodiment, as illustrated in FIG. 17, the coolant circuit 40 having no external heat source HS is applied. Even in this configuration, the heat obtained in the heat exchanger 80 can be supplied to the heat exchanger 70 in the heating operation. Also, the heat, which has been obtained in the heat exchanger 80, and stored in the coolant WT, can be supplied to the heat exchanger 70 in the defrosting.

Ninth Embodiment

Figure 18:
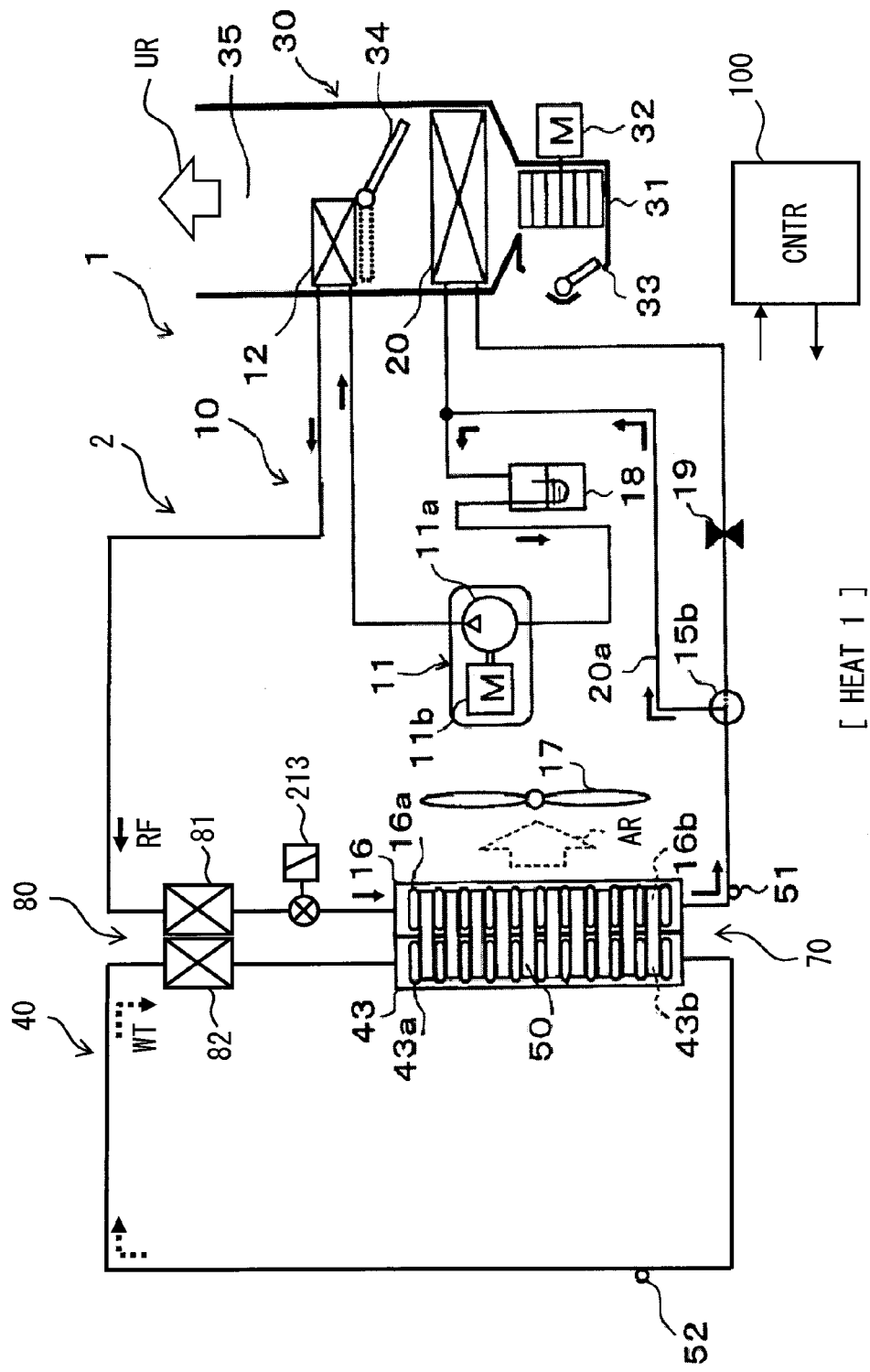
FIG. 18 is a schematic diagram illustrating a heating operation of a heat pump cycle according to a ninth embodiment of the present disclosure.

In the above embodiment, the pump is provided in the coolant circuit 40 in order to circulate the coolant WT therein. Instead, in this embodiment, as illustrated in FIG. 18, the coolant circuit 40 in which the coolant WT circulates naturally is applied. The coolant circuit 40 configures a fluid circuit that can carry the heat obtained in the heat exchanger 80 to the heat exchanger 70. As the coolant WT, a refrigerant that is evaporated in the heat exchanger 80, and condensed in the heat exchanger 70 can be used when the refrigerant circuit 10 conducts the heating operation. The coolant circuit 40 can be provided by a heat pipe that carries the heat in a high temperature portion to a low temperature portion.

The coolant WT carries the heat of the refrigerant RF obtained in the heat exchanger 80 to the heat exchanger 70, and heats the heat exchanger 70. As a result, the heat obtained in the heat exchanger 80 can be supplied to the heat exchanger 70 to suppress the formation of frost, in the heating operation.

In this embodiment, the heat obtained from the high-temperature refrigerant in the heat exchanger 80 is mainly used to suppress the formation of frost in the heating operation. When the compressor 11 stops, and the circulation of the refrigerant within the refrigerant circuit 10 stops, a temperature difference between the refrigerant within the heat exchange portion 81 and the refrigerant within the exterior heat exchanger 16 is rapidly lost. However, if frost remains in the heat exchanger 70, the heat exchanger 70 and the radiator 43 are maintained at a low temperature. In this case, the heat that has remained in the coolant WT is supplied to the heat exchanger 70 from the radiator 43, and defrosting is executed by the amount of heat that has remained in the coolant WT.

Tenth Embodiment

Figure 19:
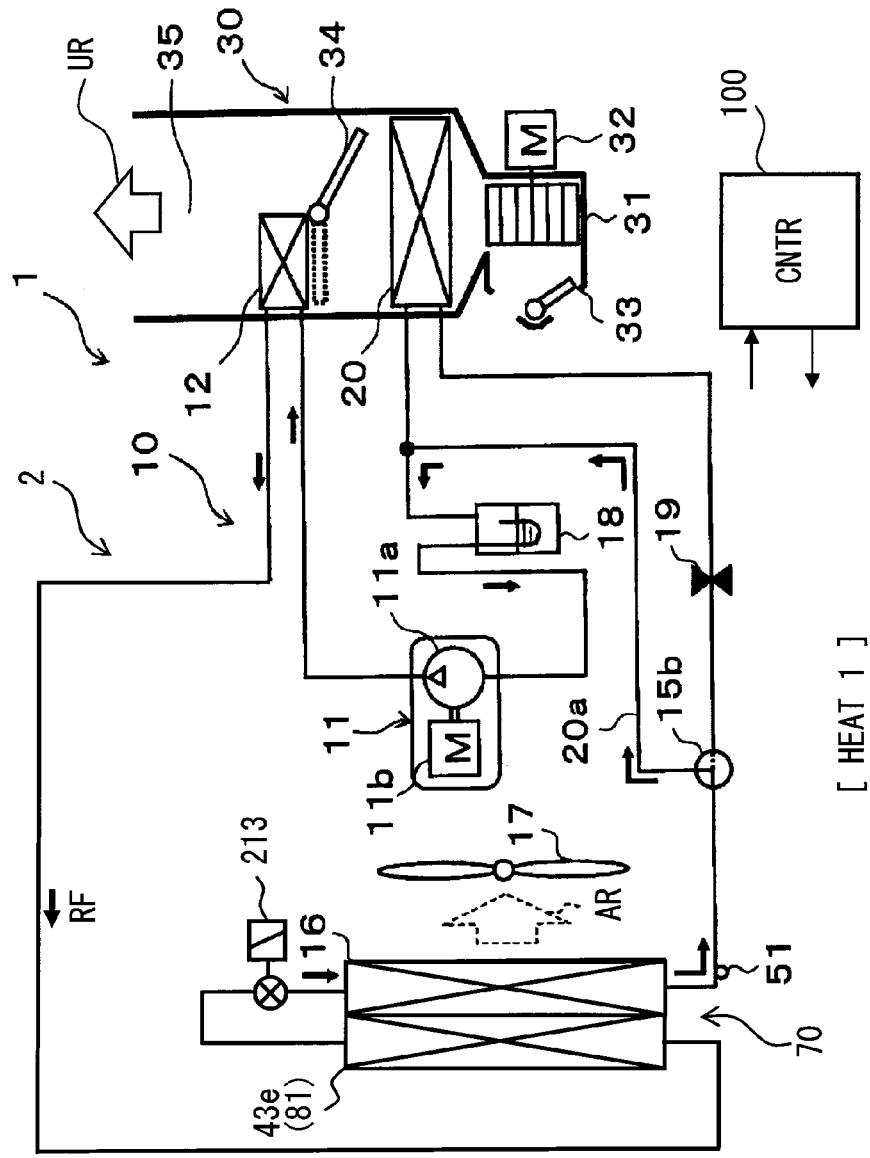
FIG. 19 is a schematic diagram illustrating a heating operation of a heat pump cycle according to a tenth embodiment of the present disclosure.

In the above embodiment, the heat of refrigerant in the refrigerant circuit 10 is supplied indirectly to the heat exchanger 70 through the coolant WT. Instead, the heat of the high-pressure refrigerant in the refrigerant circuit 10 may be transferred directly to the exterior heat exchanger 16 that functions as the evaporator of the refrigerant circuit 10, and the heat exchanger 70 including the exterior heat exchanger 16. In this embodiment, as illustrated in FIG. 19, a radiator 43e of the heat exchanger 70 is used as the heat exchange portion 81 for extracting the heat from the high-pressure refrigerant. The high-pressure refrigerant is supplied to the radiator 43e. With this configuration, the constituent components of the heat exchanger 70 are heated directly by the high-pressure refrigerant. The refrigerant that has flowed out of the radiator 43e is introduced into the exterior heat exchanger 16 through the expansion valve 213. Hence, the radiator 43e may be used as an example of the auxiliary heat exchanger that allows the high-pressure refrigerant, that is, the high-temperature refrigerant to flow therein, and receives the heat directly from the high-temperature refrigerant, to thereby supply the heat obtained from the high-temperature refrigerant to the heat exchanger 70 and the exterior heat exchanger 16.

In this configuration, since the radiator 43e arranged adjacent to the exterior heat exchanger 16 allows the high-temperature refrigerant to flow therein, the radiator 43e directly accepts the heat of the high-temperature refrigerant. The heat of the radiator 43e is supplied through air, or a member that couples the exterior heat exchanger 16 and the radiator 43e.

The heat of the high-pressure refrigerant is supplied directly to the heat exchanger 70 in the heating operation. As a result, the formation of frost on the heat exchanger 70 is suppressed. In this embodiment, the heat obtained in the radiator 43e is used for only the suppression of the formation of frost in the heating operation. Also, the heat for improving the frosting resistant performance can be supplied by only the refrigerant circuit 10 without depending on the external heat source HS.

Figure 20:
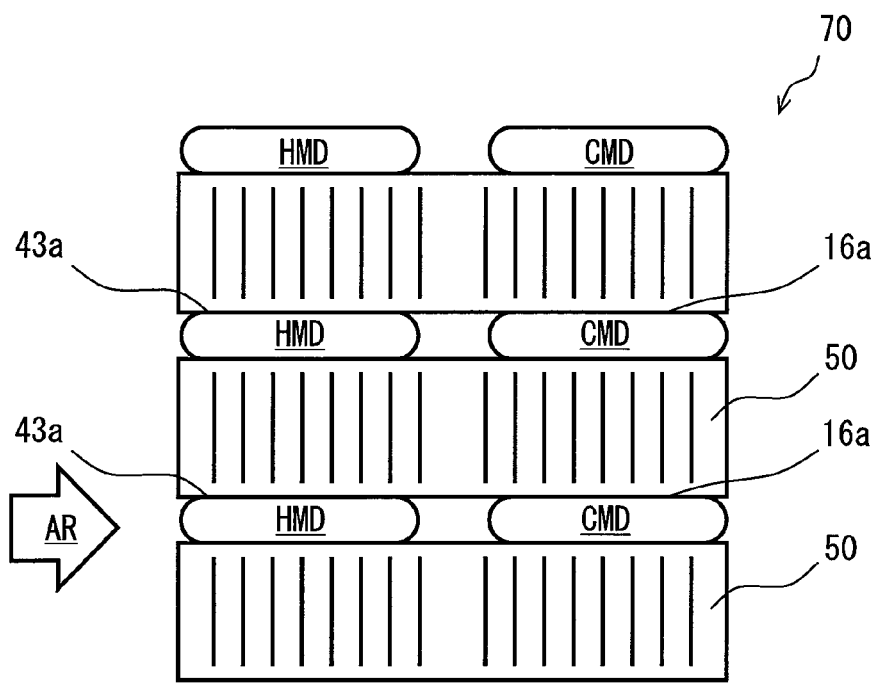
FIG. 20 is a schematic cross-sectional diagram illustrating a heat exchanger according to the tenth embodiment.

FIG. 20 illustrates an arrangement of the tubes 16a and 43a of the heat exchanger 70 illustrated in FIG. 19. When the refrigerant circuit 10 conducts the heating operation, the high-temperature medium HMD flows in the water tubes 43a. The low-temperature medium CMD flows in the refrigerant tubes 16a. The water tubes 43a are arranged upstream of the refrigerant tubes 16a with respect to the flow of the air AR. For that reason, the high-temperature medium HMD can flow in an upstream portion of the heat exchanger to which frost is liable to adhere.

Eleventh Embodiment

Figure 21:
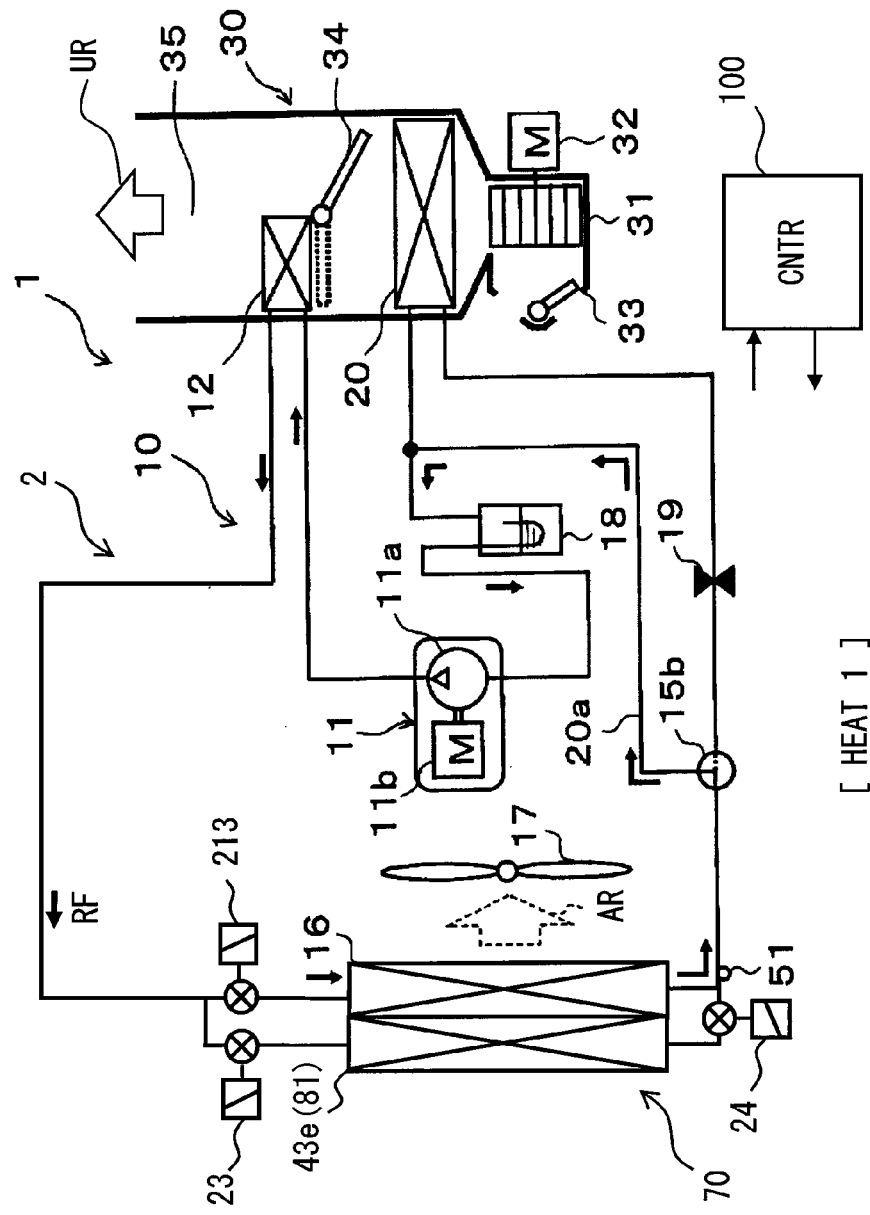
FIG. 21 is a schematic diagram illustrating a heating operation of a heat pump cycle according to an eleventh embodiment of the present disclosure.

In the above embodiment, the high-pressure refrigerant as the high-temperature medium HMD is introduced directly into the radiator 43e of the heat exchanger 70. Instead, in this embodiment, as illustrated in FIG. 21, the intermediate-pressure refrigerant is introduced directly into the radiator 43e of the heat exchanger 70. The refrigerant circuit 10 is branched between the interior condenser 12 and the expansion valve 213. A decompressor 23 to an intermediate pressure is disposed in the branched passage. The intermediate-pressure refrigerant is supplied to the radiator 43e. A decompressor 24 that decompresses the intermediate-pressure refrigerant to the low-pressure refrigerant is disposed downstream of the radiator 43e.

The temperature of the intermediate-pressure refrigerant is higher than the temperature of the low-pressure refrigerant decompressed by the expansion valve 213. Hence, the temperature of the intermediate-pressure refrigerant within the radiator 43e is higher than the temperature of the low-pressure refrigerant within the exterior heat exchanger 16. Hence, the exterior heat exchanger 16 can be heated by the intermediate-pressure refrigerant. Even in this configuration, the heat for improving the frosting resistant performance can be supplied by only the refrigerant circuit 10 without depending on the external heat source HS.

Twelfth Embodiment

Figure 22:
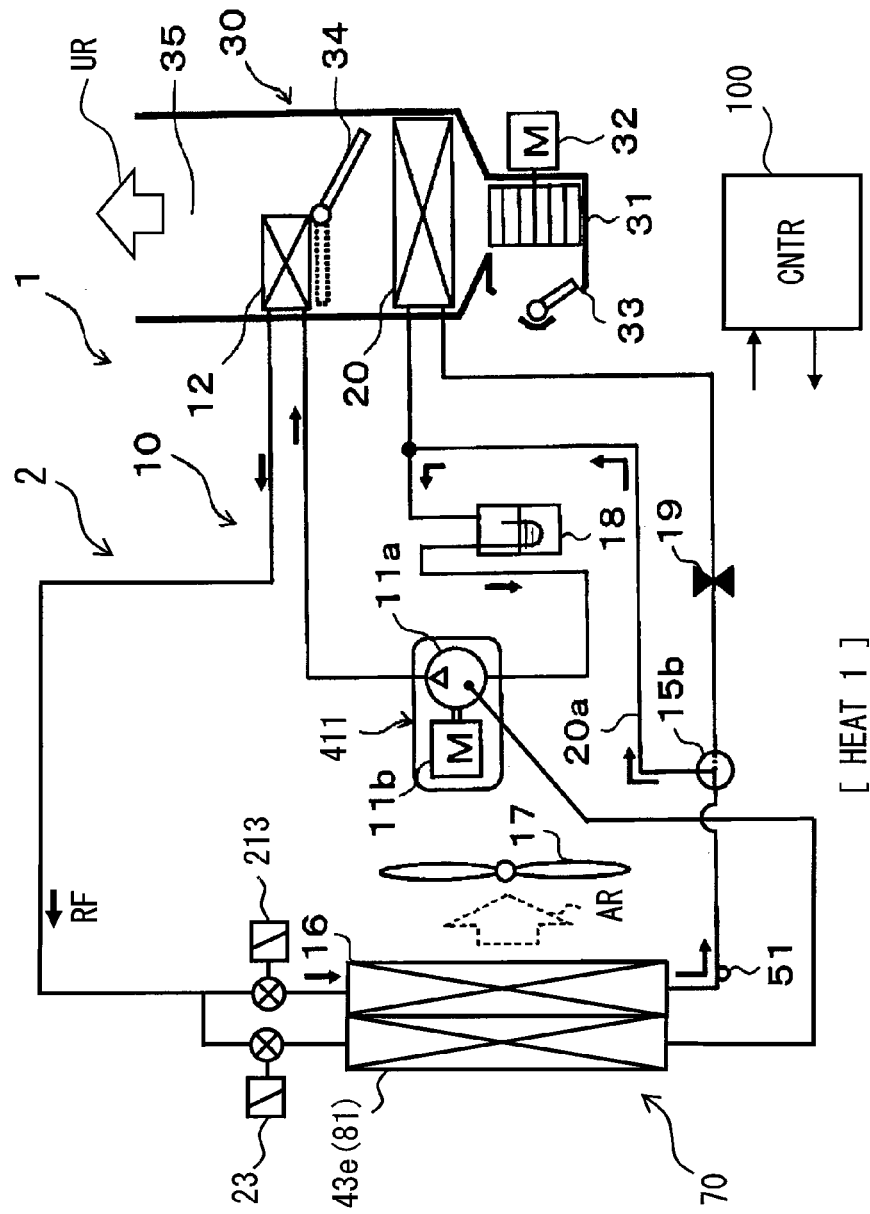
FIG. 22 is a schematic diagram illustrating a heating operation of a heat pump cycle according to a twelfth embodiment of the present disclosure.

In the above embodiment, the intermediate-pressure refrigerant that has passed through the radiator 43e is decompressed to a lower pressure. Instead, in this embodiment, as illustrated in FIG. 22, the intermediate-pressure refrigerant is sucked into the gas injection port of the compressor 411. According to this configuration, the intermediate-pressure refrigerant can be supplied to the radiator 43e without use of the decompressor 24.

Thirteenth Embodiment

Figure 23:
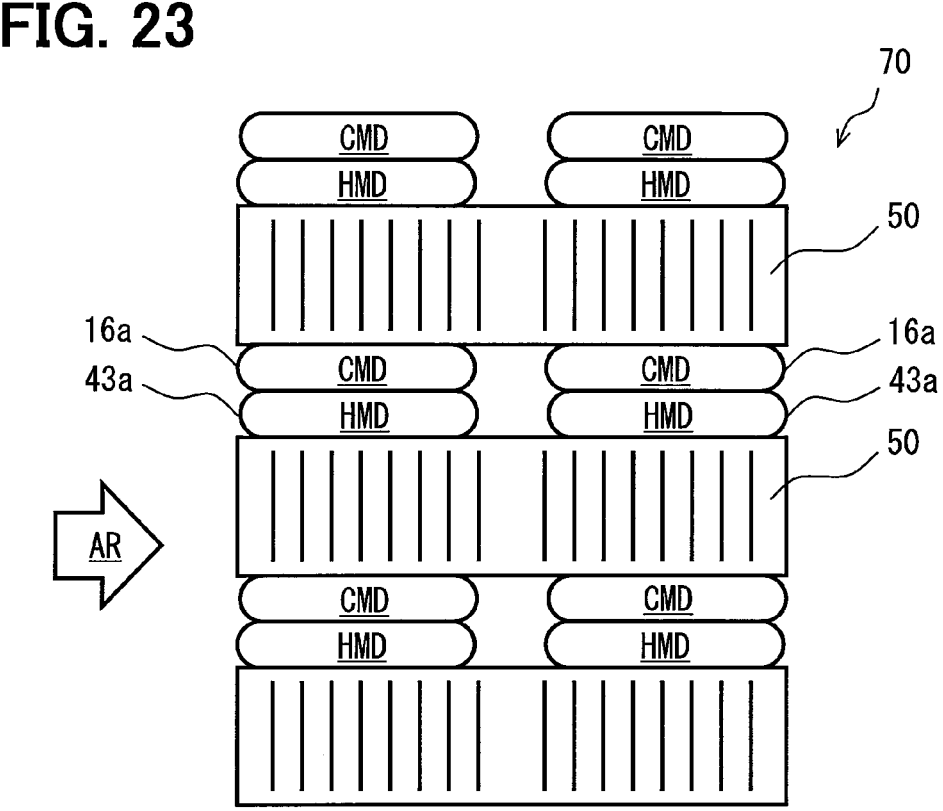
FIG. 23 is a schematic cross-sectional diagram illustrating a heat exchanger available in a heat pump cycle according to a thirteenth embodiment of the present disclosure.

In the above embodiment, the refrigerant tubes 16a and the water tubes 43a, which are disposed in the heat exchanger 70, are thermally coupled with each other by the air AR and the fins 50 disposed between the refrigerant tubes 16a and the water tubes 43a. Instead, in this embodiment, as illustrated in FIG. 23, the refrigerant tubes 16a and the water tubes 43a are brought in direct contact with each other. Hereinafter, the refrigerant tubes 16a is called "CMD tube 16a", and the water tubes 43a is called "HMD tube 43a".

One CMD tube 16a and one HMD tube 43a are stacked on each other so as to be adjacent to each other in a direction perpendicular to the flow direction of the air AR. According to this configuration, the heat of the HMD tube 43a is effectively transmitted to the CMD tube 16a. One CMD tube 16a is arranged to be located between two HMD tubes 43a.

Fourteenth Embodiment

Figure 24:
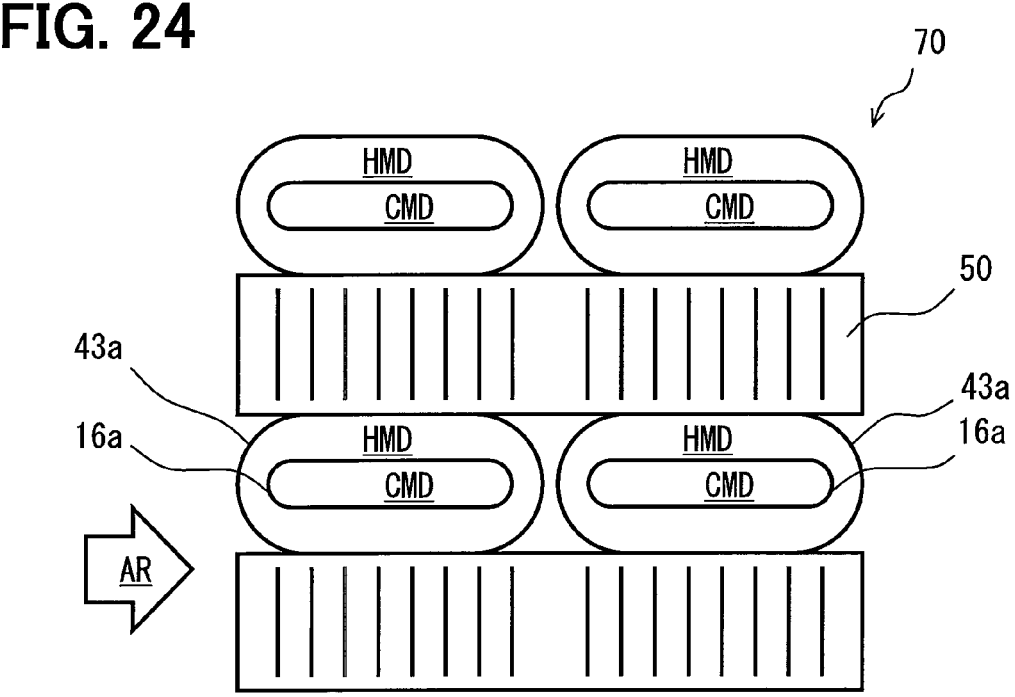
FIG. 24 is a schematic cross-sectional diagram illustrating a heat exchanger available in a heat pump cycle according to a fourteenth embodiment of the present disclosure.

In the above embodiment, the CMD tubes 16a and the HMD tubes 43a are arranged side by side. Instead, in this embodiment, as illustrated in FIG. 24, the CMD tubes 16a and the HMD tubes 43a are provided by multiple tubes. In an example illustrated in the figure, the CMD tubes 16a are arranged within the HMD tubes 43a. The HMD tubes 43a may be arranged among the CMD tubes 16a. According to this configuration, the heat of the HMD tubes 43a is effectively transmitted to the CMD tubes 16a.

Fifteenth Embodiment

Figure 25:
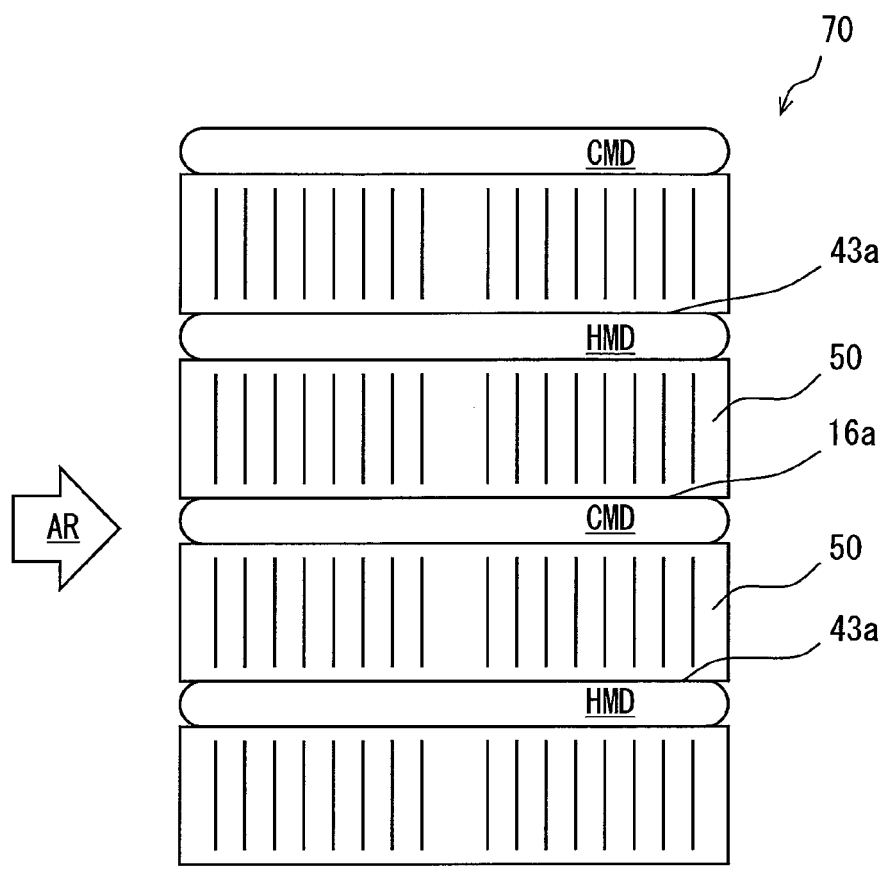
FIG. 25 is a schematic cross-sectional diagram illustrating a heat exchanger available in a heat pump cycle according to a fifteenth embodiment of the present disclosure.

In the above embodiment, the CMD tubes 16a and the HMD tubes 43a are arranged side by side so as to configure multiple rows, that is, the upstream row and the downstream row in the flow direction of the air AR. Instead, in this embodiment, as illustrated in FIG. 25, the CMD tubes 16a and the HMD tubes 43a are arranged so as to configure a single row with respect to the flow direction of the air AR. Even in this configuration, the frosting resistant performance can be improved by the heat supplied to the HMD tubes 43a.

Sixteenth Embodiment

Figure 26:
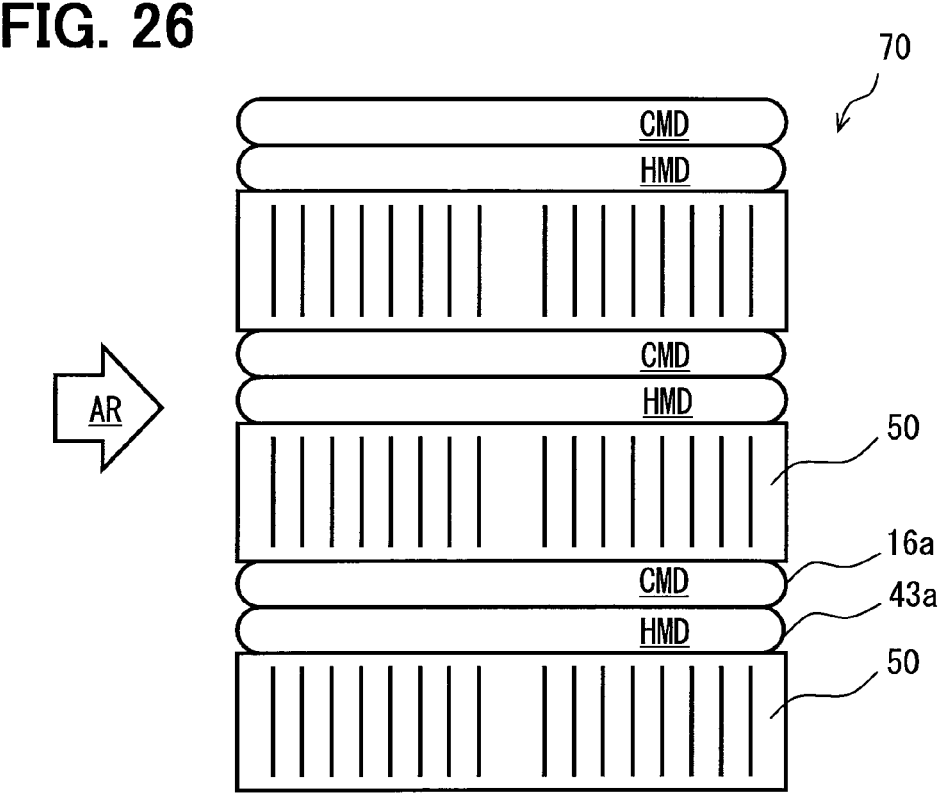
FIG. 26 is a schematic cross-sectional diagram illustrating a heat exchanger available in a heat pump cycle according to a sixteenth embodiment of the present disclosure.

In this embodiment, as illustrated in FIG. 26, one CMD tube 16a and one HMD tube 43a are arranged to be stacked on each other, and arranged to configure a single row with respect to the flow direction of the air AR. Even in this configuration, the frosting resistant performance can be improved by the heat supplied to the HMD tubes 43a.

Seventeenth Embodiment

Figure 27:
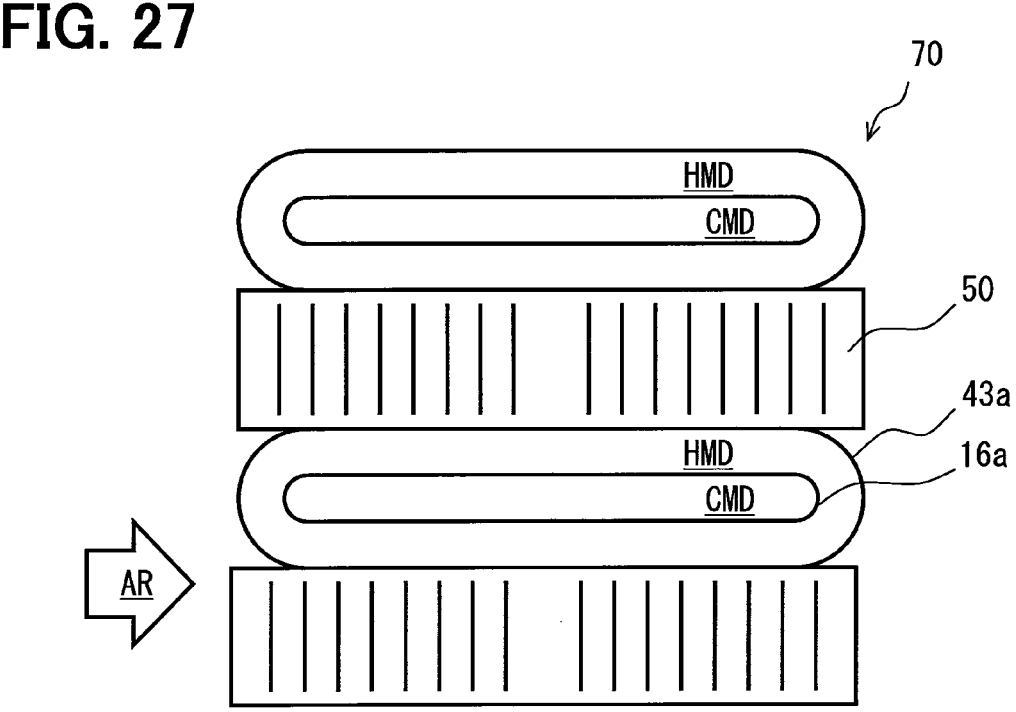
FIG. 27 is a schematic cross-sectional diagram illustrating a heat exchanger available in a heat pump cycle according to a seventeenth embodiment of the present disclosure.

In this embodiment, as illustrated in FIG. 27, the CMD tubes 16a and the HMD tubes 43a are provided by the multiple tubes, and the multiple tubes are arranged to configure the single row with respect to the flow direction of the air AR. Even in this configuration, the frosting resistant performance can be improved by the heat supplied to the HMD tubes 43a.

Eighteenth Embodiment

Figure 28:
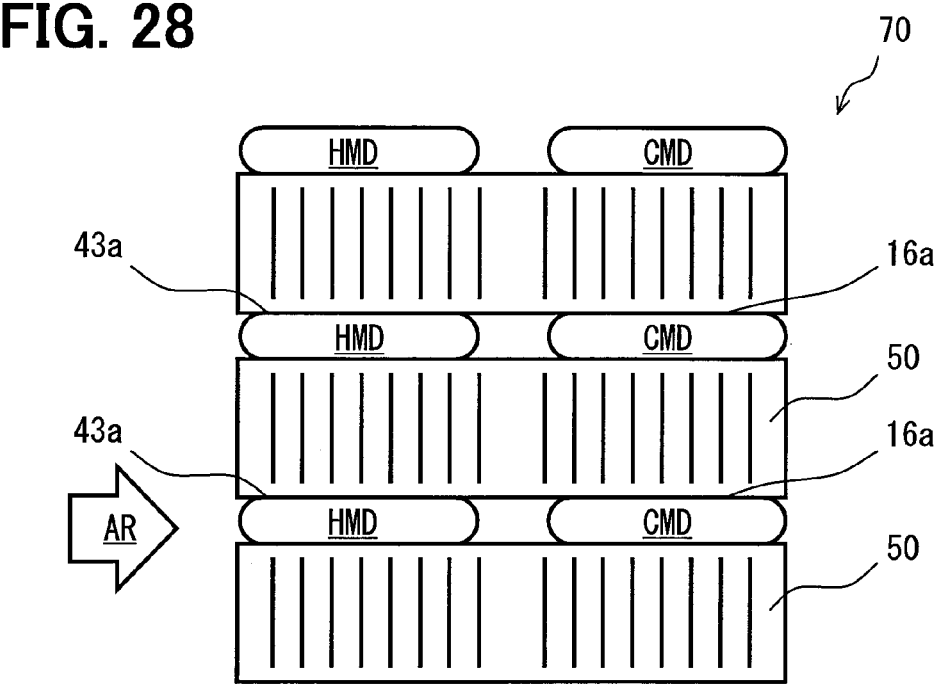
FIG. 28 is a schematic cross-sectional diagram illustrating a heat exchanger available in a heat pump cycle according to an eighteenth embodiment of the present disclosure.

In the heat exchanger 70 according to first embodiment, the CMD tubes 16a and the HMD tubes 43a are alternately arranged in the upstream row and the downstream row. Instead, in this embodiment, as illustrated in FIG. 28, only the HMD tubes 43a are arranged in the upstream row, and only the CMD tubes 16a are arranged in the downstream row. According to this configuration, the heat of the HMD tubes 43a can be supplied to the upstream row to which frost is liable to adhere. With this configuration, the frosting resistant performance can be effectively improved.

Nineteenth Embodiment

Figure 29:
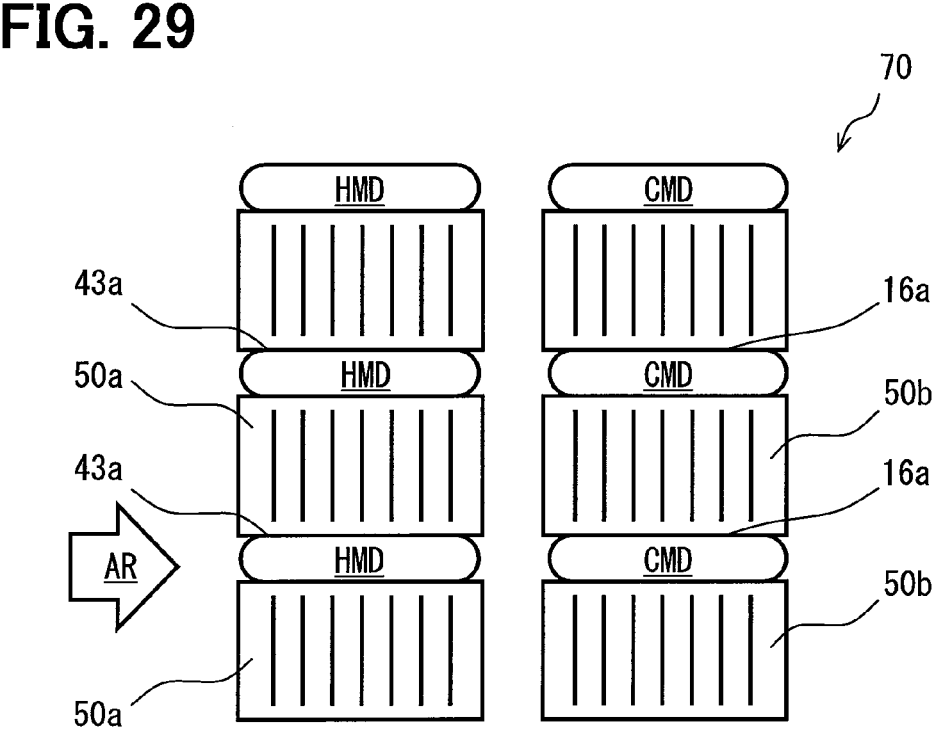
FIG. 29 is a schematic cross-sectional diagram illustrating a heat exchanger available in a heat pump cycle according to a nineteenth embodiment of the present disclosure.

In the above embodiment, the fins 50 are arranged so as to couple the upstream row and the downstream row. Instead, in this embodiment, as illustrated in FIG. 29, fins 50a are arranged in the upstream row, and fins 50b are arranged in the downstream row. In this embodiment, the fins 50a of the radiator 43 and the fins 50b of the exterior heat exchanger 16 are separated from each other. Further, the radiator 43 and the exterior heat exchanger 16 are separate members usable separately. The exterior heat exchanger 16 and the radiator 43 are arranged so that the radiator 43 is located upstream of the exterior heat exchanger 16 with respect to the flow of the air AR.

Even in this configuration, the heat of the HMD tubes 43a is transferred to the CMD tubes 16a and the fins 50b by radiation, and heat transfer through the air AR. As a result, the frosting resistant performance can be improved.

Twentieth Embodiment

Figure 30:
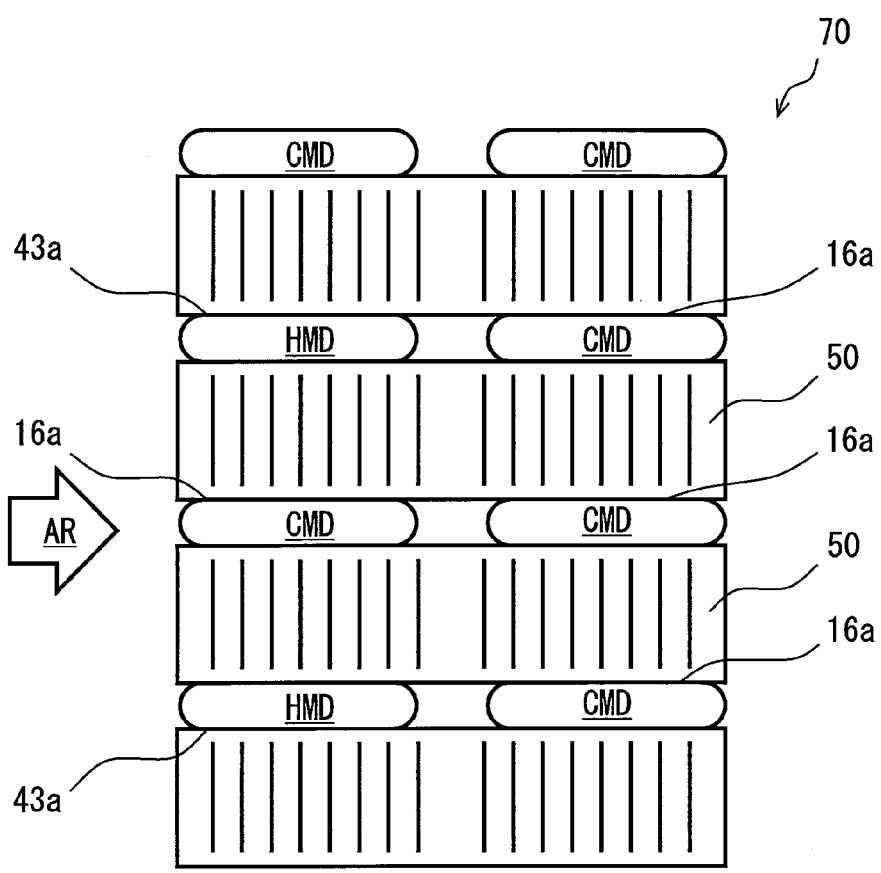
FIG. 30 is a schematic cross-sectional diagram illustrating a heat exchanger available in a heat pump cycle according to a twentieth embodiment of the present disclosure.

In the heat exchanger 70 according to the first embodiment, the CMD tubes 16a and the HMD tubes 43a are alternately arranged in the upstream row and the downstream row. Instead, in this embodiment, as illustrated in FIG. 30, the CMD tubes 16a and the HMD tubes 43a are alternately arranged only in the upstream row. Only the CMD tubes 16a are arranged in the downstream row. According to this configuration, the number of CMD tubes 16a can be reduced in the upstream row. For that reason, the formation of frost in the upstream row can be suppressed. Also, since a large number of HMD tubes 43a are arranged in the upstream row, the formation of frost in the upstream row can be suppressed by the heat of the HMD tubes 43a. Also, since the large number of HMD tubes 43a are arranged in the upstream row, the frost that has grown in the upstream row can be effectively melted by the heat of the HMD tubes 43a. As a result, the frosting resistant performance can be improved.

Twenty-First Embodiment

Figure 31:
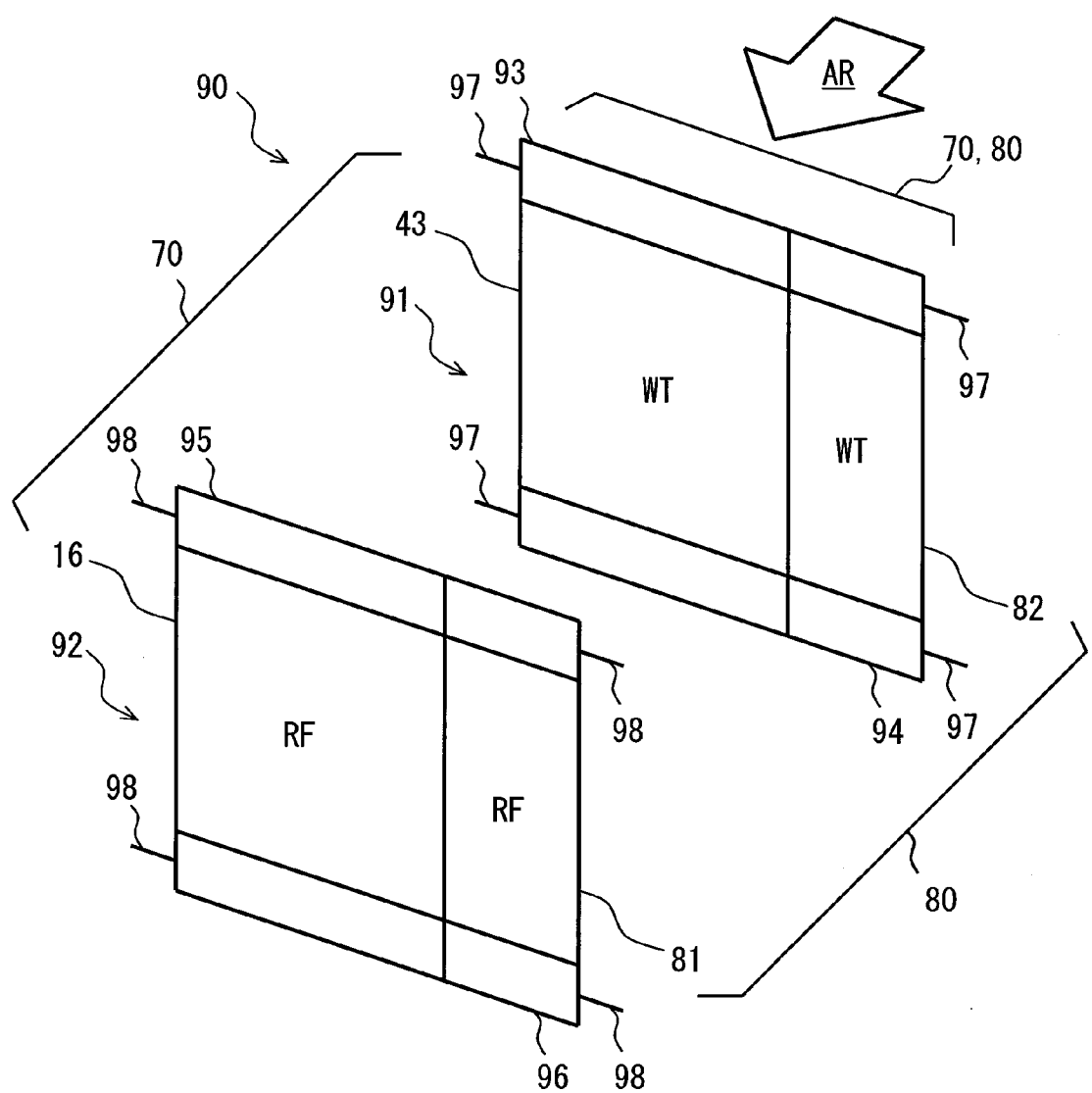
FIG. 31 is a schematic cross-sectional diagram illustrating a heat exchanger available in a heat pump cycle according to a twenty-first embodiment of the present disclosure.

In the above embodiment, the heat exchanger 70 and the heat exchanger 80 are separated from each other. Instead, in this embodiment, as illustrated in FIG. 31, the heat exchanger 70 and the heat exchanger 80 are integrated with each other. The heat exchanger 70 provides heat exchange between the respective media including the air AR, the refrigerant RF, and the coolant WT. In this embodiment, the heat exchanger 80 has the same configuration as that of the heat exchanger 70. The heat exchanger 70 and the heat exchanger 80 are continuously configured by the same constituent component. Both of the heat exchanger 70 and the heat exchanger 80 can conduct heat exchange with the air AR. According to this configuration, the heat exchanger 70 and the heat exchanger 80 can be integrated with each other. As a result, the heat pump cycle 2 can be downsized.

The heat exchanger 70 and the heat exchanger 80 are configured as the same tank and tube type heat exchanger as the heat exchanger 70 exemplified in the first embodiment. The heat exchanger 70 and the heat exchanger 80 are located side by side in a direction perpendicular to the flow direction of the air AR. The radiator 43 and the heat exchange portion 82, which are heat exchangers for the coolant WT are arranged on the upstream side in the flow direction of the air AR. The exterior heat exchanger 16 and the heat exchange portion 81, which are heat exchange portions for the refrigerant RF, are located on the downstream side in the flow direction of the air AR.

The heat exchangers 70 and 80 are provided by a second heat exchanger unit 90 integrally configured, which is usable as an integrated unit. At least the exterior heat exchanger 16 and the heat exchanger 80 configure the second heat exchanger unit 90. The heat exchanger unit 90 has an upstream portion 91 and a downstream portion 92. The radiator 43 and the heat exchange portion 82 are provided by the upstream portion 91. The upstream portion 91 provides the radiator 43 and the heat exchange portion 82 by partitioning two tanks 93 and 94. The exterior heat exchanger 16 and the heat exchange portion 81 are provided by the downstream portion 92. The downstream portion 92 provides the exterior heat exchanger 16 and the heat exchange portion 81 by partitioning two tanks 95 and 96. In the figure, an inlet/outlet 97 for the coolant WT and an inlet/outlet 98 for the refrigerant RF are illustrated. The inlets/outlets 97 and 98 can be arranged on the tanks 93, 94, 95, and 96. The inlets/outlets 97 and 98 are used as outlets or inlets for the purpose of satisfying performances required by the heat exchangers 70 and 80.

Twenty-Second Embodiment

Figure 32:
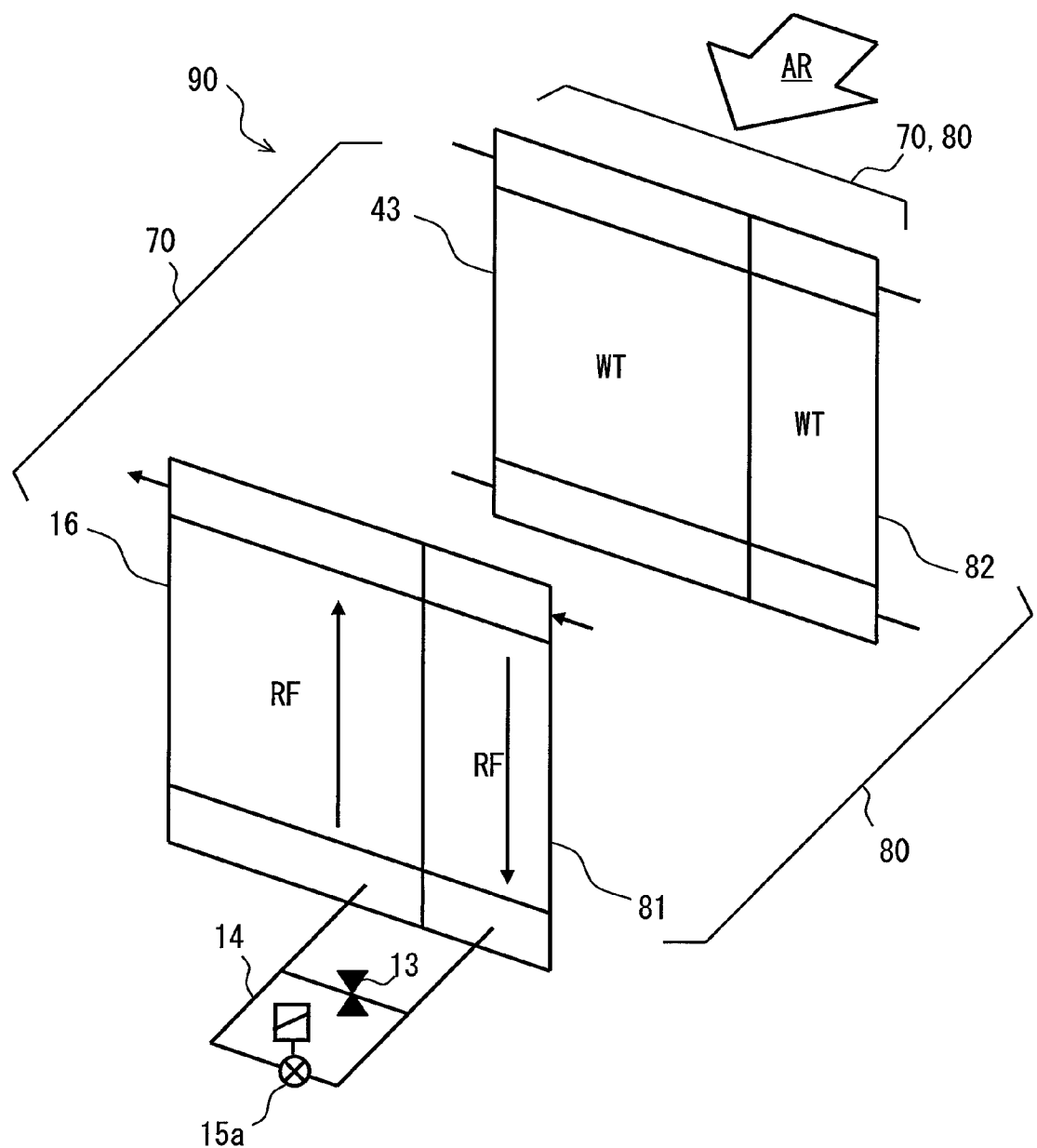
FIG. 32 is a schematic cross-sectional diagram illustrating a heat exchanger available in a heat pump cycle according to a twenty-second embodiment of the present disclosure.

In this embodiment, as illustrated in FIG. 32, the fixed aperture 13, the bypass passage 14, and the on-off valve 15a are loaded in the second heat exchanger unit 90 to configure one unit. Hence, the second heat exchanger unit 90 includes a decompressor, and the decompressor is disposed between the heat exchanger 80 and the exterior heat exchanger 16. With this configuration, the heat pump cycle 2 can be downsized.

Twenty-Third Embodiment

Figure 33:
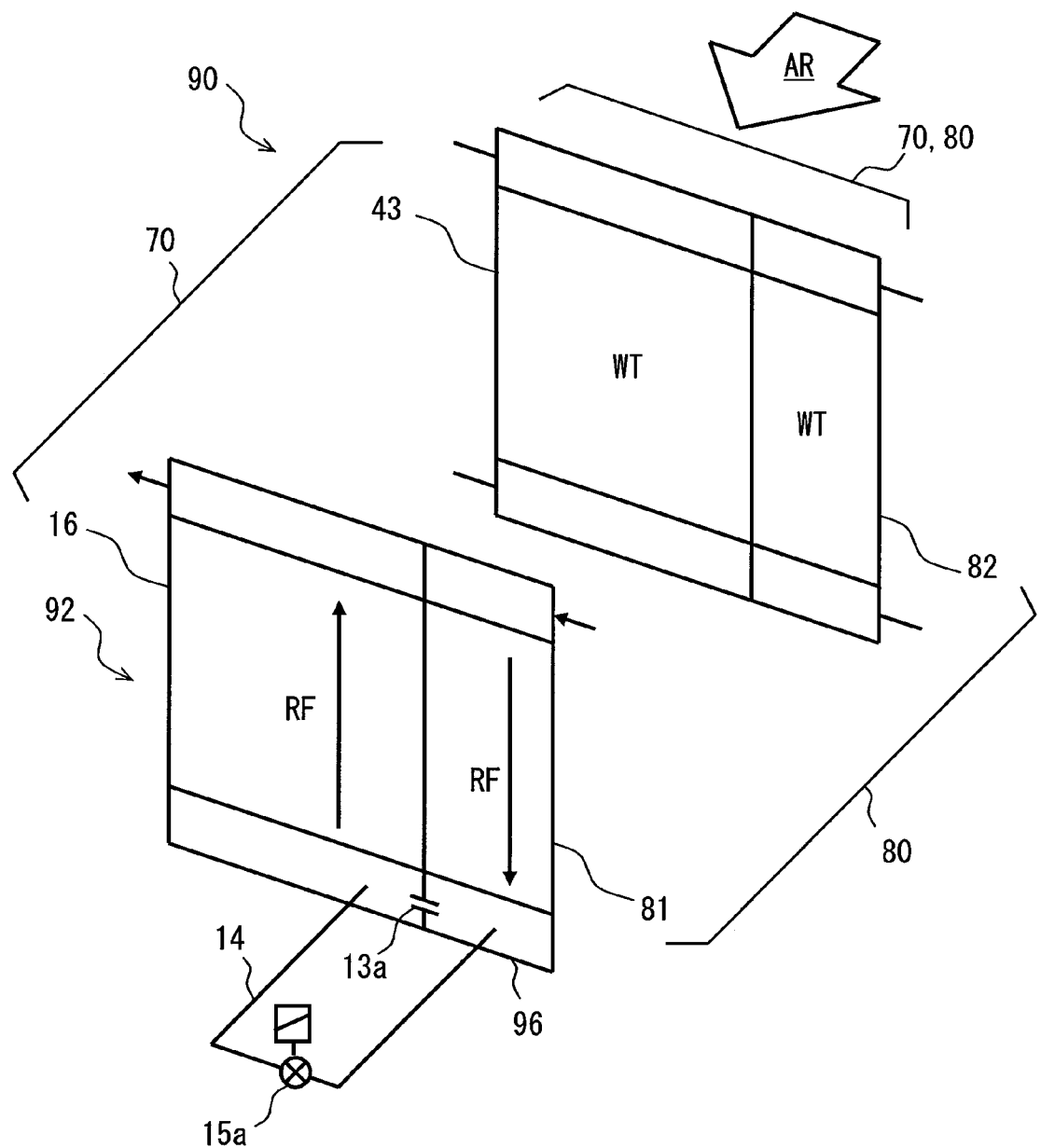
FIG. 33 is a schematic cross-sectional diagram illustrating a heat exchanger available in a heat pump cycle according to a twenty-third embodiment of the present disclosure.

In this embodiment, as illustrated in FIG. 33, a through-hole 13a is formed in a partition wall of the tank 96 to form the fixed aperture 13. With this configuration, the heat pump cycle 2 can be downsized.

Twenty-Fourth Embodiment

Figure 34:
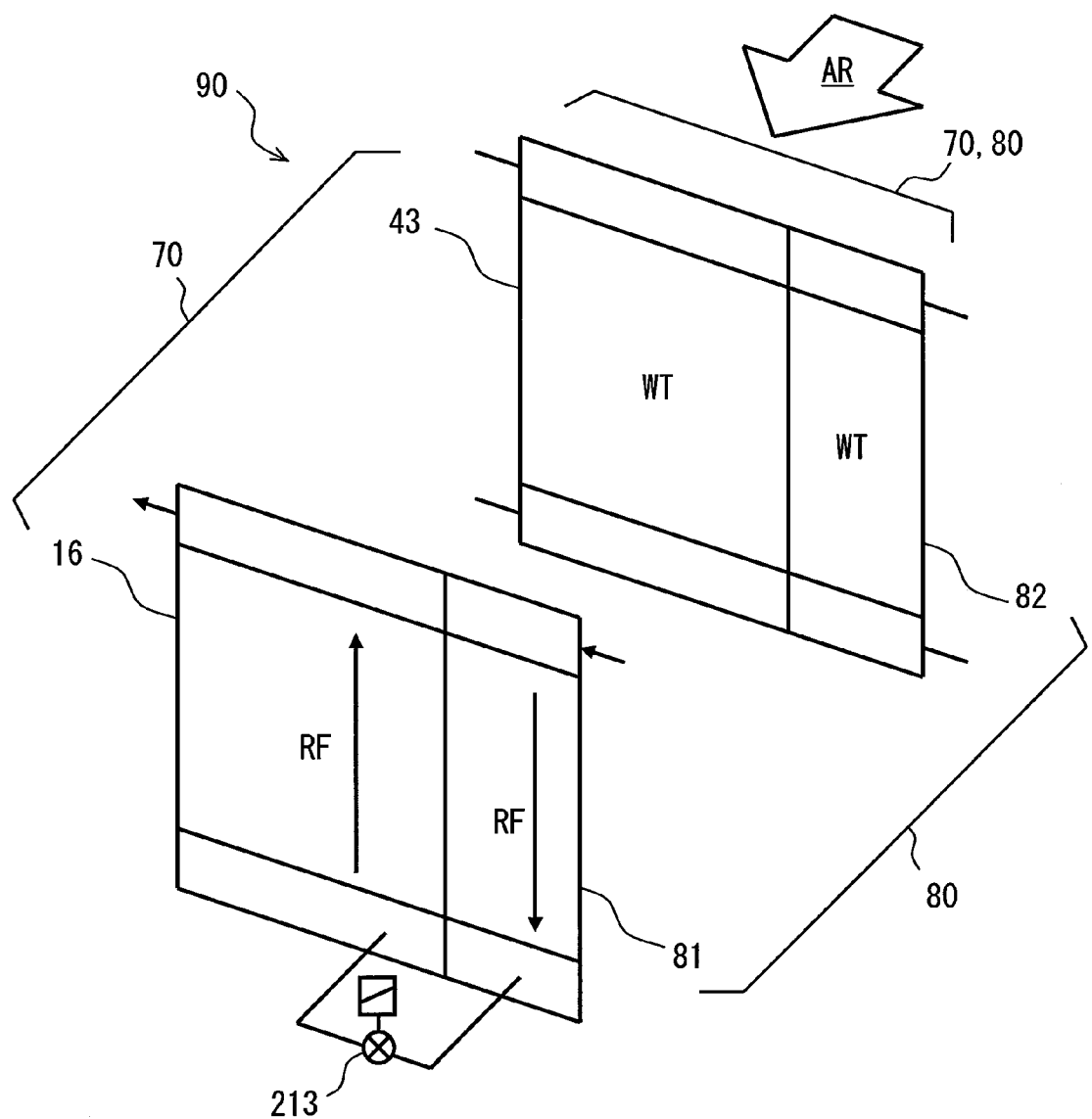
FIG. 34 is a schematic cross-sectional diagram illustrating a heat exchanger available in a heat pump cycle according to a twenty-fourth embodiment of the present disclosure.

In this embodiment, as illustrated in FIG. 34, the expansion valve 213 is loaded in the second heat exchanger unit 90 to configure one unit. With this configuration, the heat pump cycle 2 can be downsized.

Twenty-Fifth Embodiment

Figure 35:
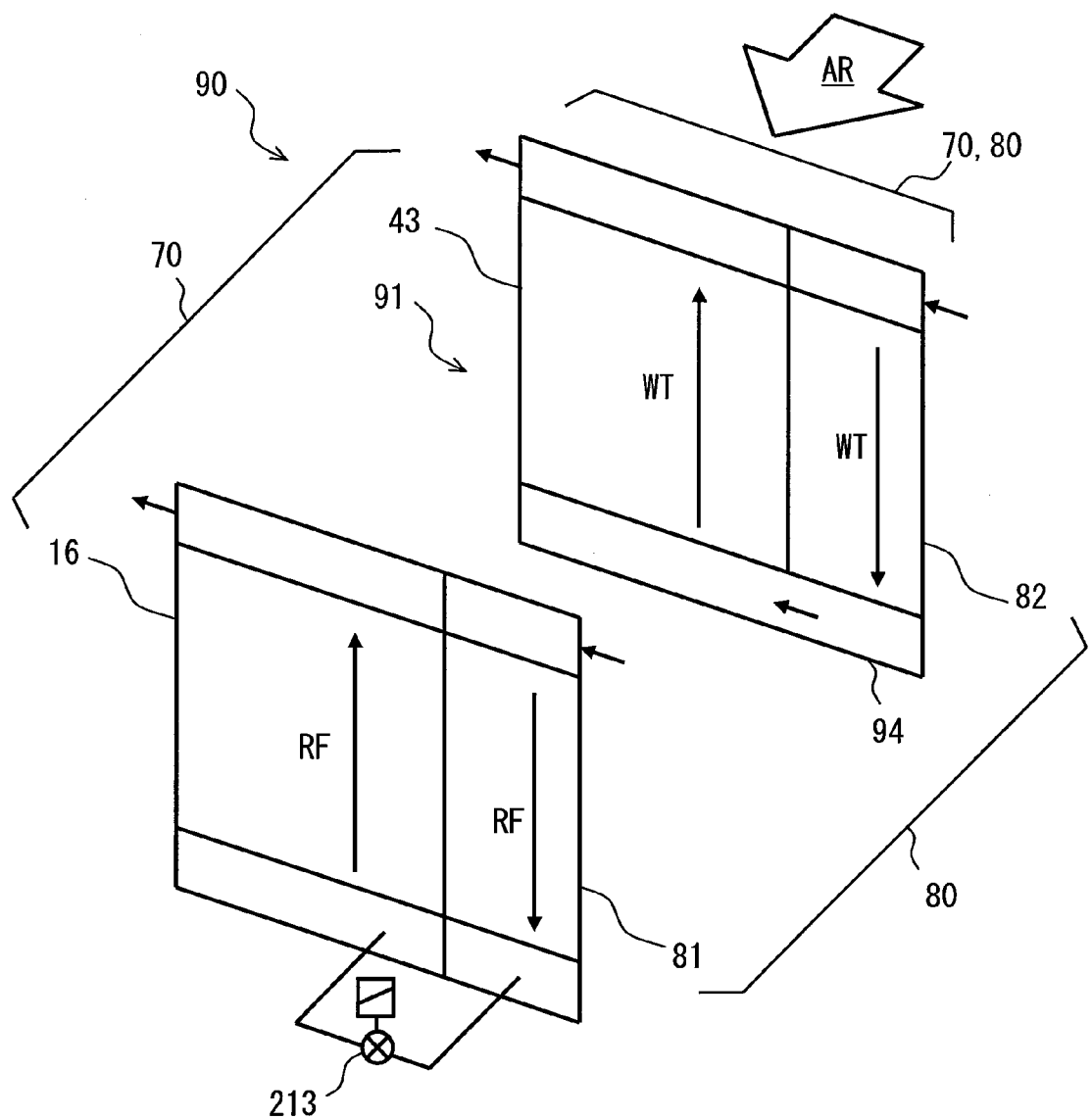
FIG. 35 is a schematic cross-sectional diagram illustrating a heat exchanger available in a heat pump cycle according to a twenty-fifth embodiment of the present disclosure.

In this embodiment, as illustrated in FIG. 35, the tank 94 of the upstream portion 91 is configured by a continuous passage. In this configuration, a passage of the coolant circuit 40 that connects the heat exchange portion 82 and the radiator 43 is provided by the tank 94.

Twenty-Sixth Embodiment

Figure 36:
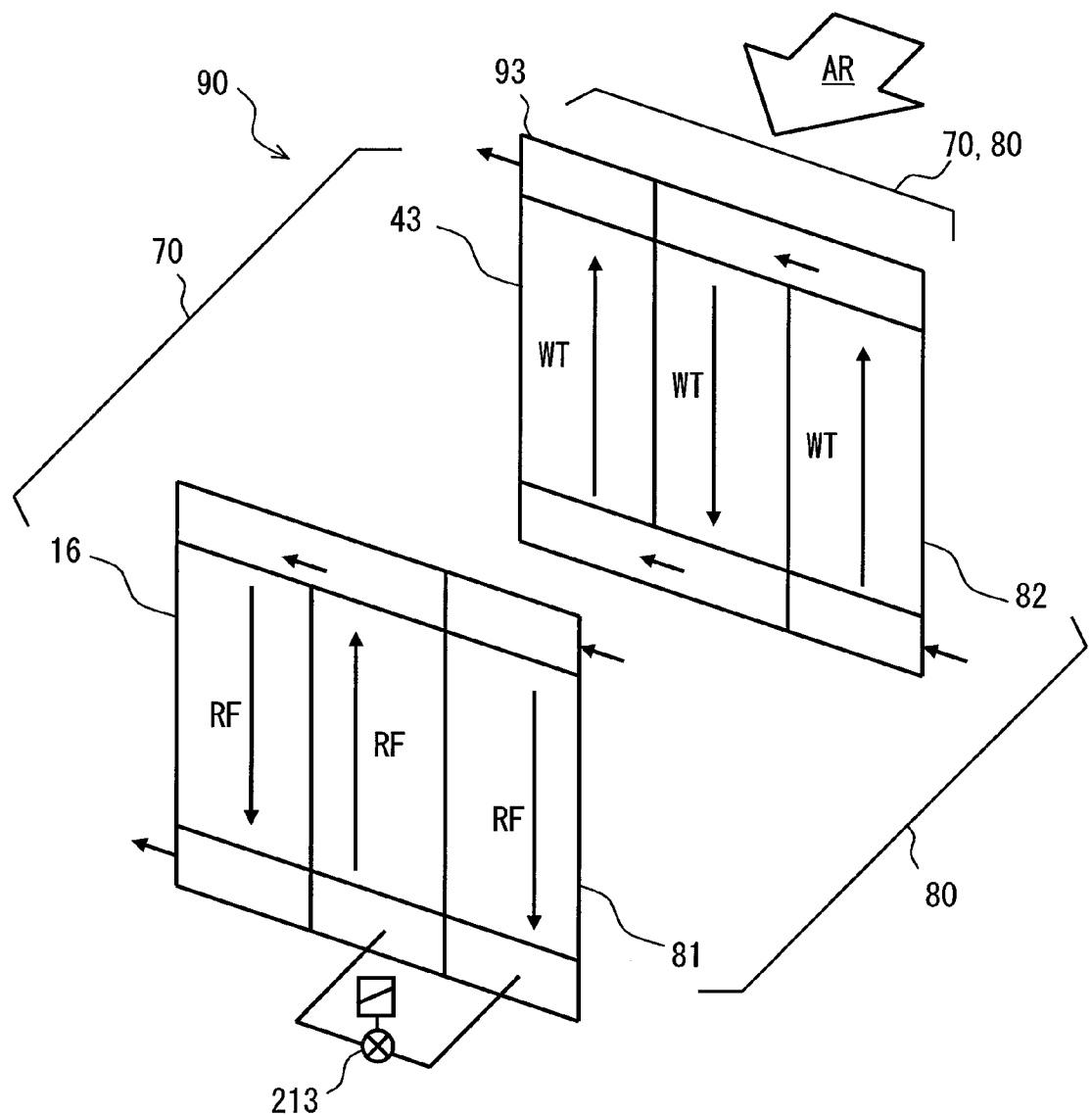
FIG. 36 is a schematic cross-sectional diagram illustrating a heat exchanger available in a heat pump cycle according to a twenty-sixth embodiment of the present disclosure.

In this embodiment, as illustrated in FIG. 36, a U-turn flow channel is formed in the radiator 43 and the exterior heat exchanger 16. The flow directions of the coolant WT and the refrigerant RF can be counter to each other. Also, since an outlet of the coolant WT is disposed in the upper tank 93, the discharging efficiency of air bubble can be enhanced.

Twenty-Seventh Embodiment

Figure 37:
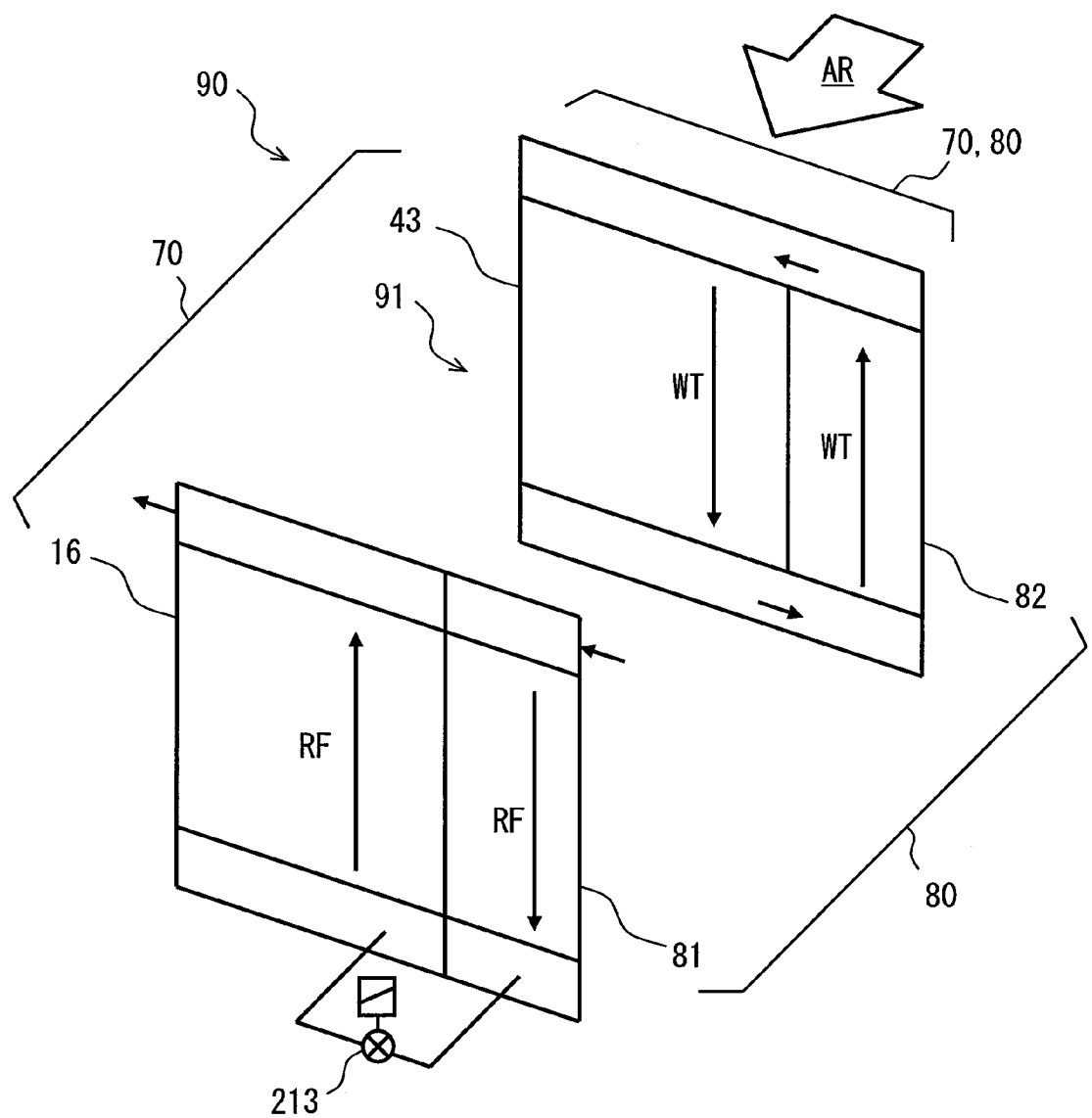
FIG. 37 is a schematic cross-sectional diagram illustrating a heat exchanger available in a heat pump cycle according to a twenty-seventh embodiment of the present disclosure.

In this embodiment, as illustrated in FIG. 37, a closed circuit of the coolant circuit 40 within the upstream portion 91 is configured. This configuration is suitable for the embodiment illustrated in FIG. 18. The coolant WT functioning as a working medium of the heat pipe is enclosed in the upstream portion 91. The coolant circuit 40 configures a heat pipe called "closed circuit type" or "circulation type". The coolant WT drains the heat from the refrigerant RF of the heat exchange portion 81 in the heat exchange portion 82, and radiates heat in the radiator 43. The heat discharged from the radiator 43 heats the constituent components of the exterior heat exchanger 16 and the radiator 43.

Twenty-Eighth Embodiment

Figure 38:
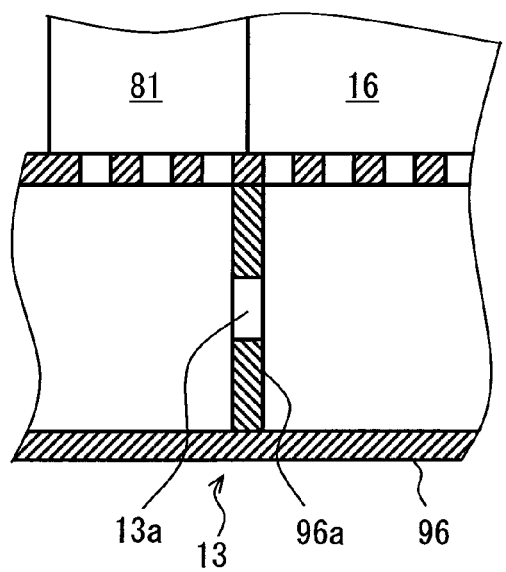
FIG. 38 is a cross-sectional view illustrating a fixed aperture used in a second heat exchanger unit available in a heat pump cycle according to a twenty-eighth embodiment of the present disclosure.

In this embodiment, as illustrated in FIG. 38, a partition wall 96a that partitions the heat exchange portion 81 and the exterior heat exchanger 16 is disposed within the tank 96. The through-hole 13a is pierced in the partition wall 96a. The through-hole 13a provides the fixed aperture 13 that decompresses the high-pressure refrigerant, and supplies the low-pressure refrigerant.

Twenty-Ninth Embodiment

Figure 39:
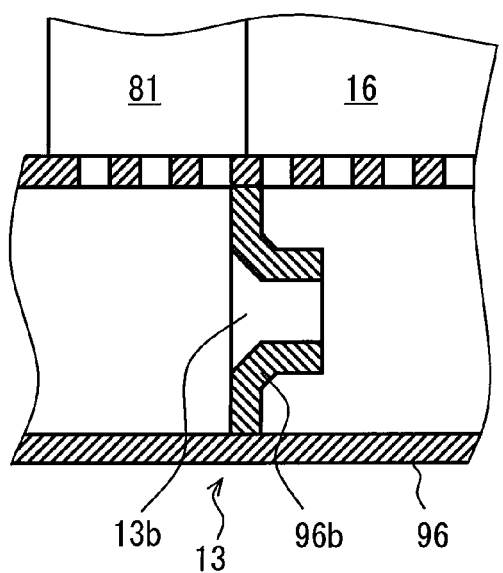
FIG. 39 is a cross-sectional view illustrating a fixed aperture used in a second heat exchanger unit available in a heat pump cycle according to a twenty-ninth embodiment of the present disclosure.

In this embodiment, as illustrated in FIG. 39, a partition wall 96b that partitions the heat exchange portion 81 and the exterior heat exchanger 16 is disposed within the tank 96. A nozzle-shaped through-hole 13b is pierced in the partition wall 96b. The through-hole 13b provides the fixed aperture 13 that decompresses the high-pressure refrigerant, and supplies the low-pressure refrigerant.

Thirtieth Embodiment

Figure 40:
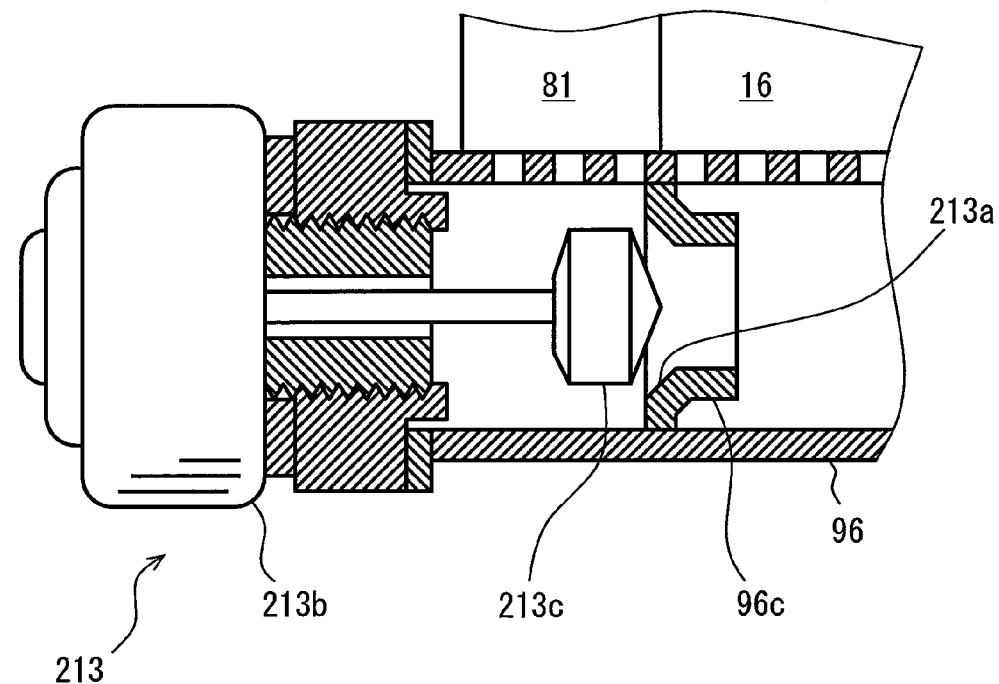
FIG. 40 is a cross-sectional view illustrating an expansion valve used in a second heat exchanger unit available in a heat pump cycle according to a thirtieth embodiment of the present disclosure.

In this embodiment, as illustrated in FIG. 40, the expansion valve 213 loadable directly in the tank 96 is applied. A partition wall 96c that partitions the heat exchange portion 81 and the exterior heat exchanger 16 is disposed within the tank 96. A passage 213a is pierced in the partition wall 96c. A drive portion 213b of the expansion valve 213 is liquid-tightly fixed onto an end surface of the tank 96. The drive portion 213b supports a movable valving element 213c. The drive portion 213b and the movable valving element 213c are inserted into the tank 96 from an opening portion on an end of the tank 96. The drive portion 213b moves a position of the movable valving element 213c in a horizontal direction in the figure. The movable valving element 213c changes the opening degree of the passage 213a according to its position. According to this configuration, the expansion valve 213 can be integrated with the heat exchanger unit 90.

Thirty-First Embodiment

Figure 41:
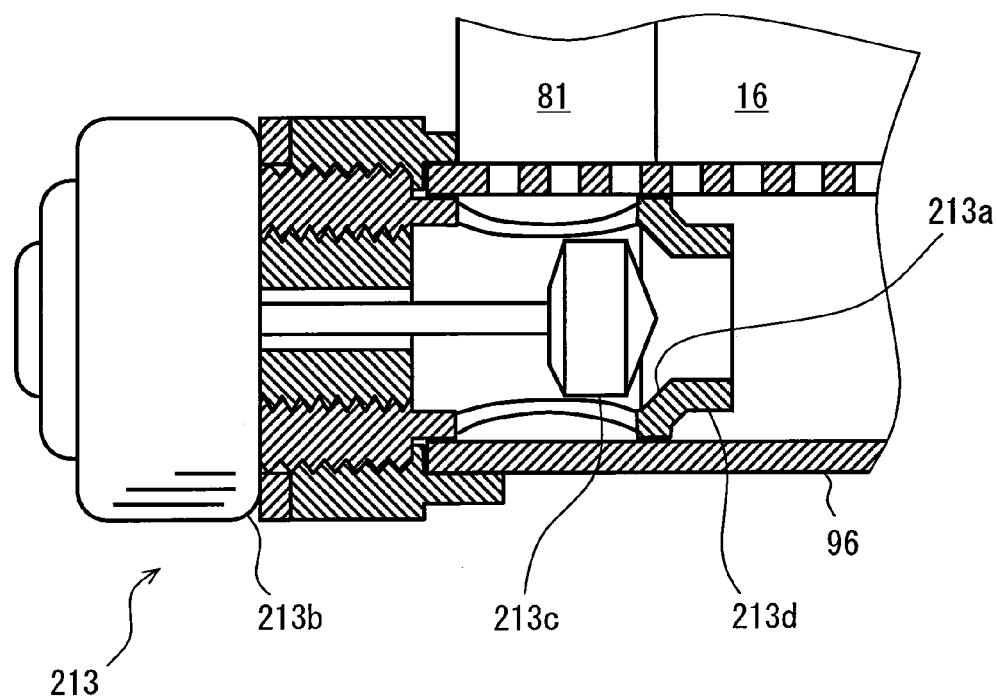
FIG. 41 is a cross-sectional view illustrating an expansion valve used in a second heat exchanger unit available in a heat pump cycle according to a thirty-first embodiment of the present disclosure.
Figure 42:
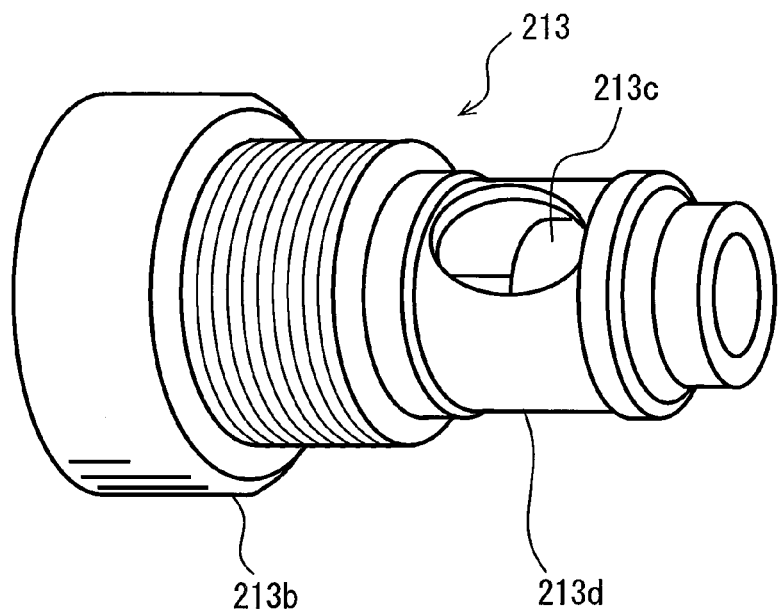
FIG. 42 is a perspective view illustrating the expansion valve according to the thirty-first embodiment.

In this embodiment, as illustrated in FIGS. 41 and 42, a cassette type expansion valve 213 is applied. The expansion valve 213 includes a cylindrical sleeve 213d extended from the drive portion 213b. The cylindrical sleeve 213d is arranged in close contact with an inner wall of the tank 96. A wall of a leading end of the sleeve 213d provides a partition wall that partitions the heat exchange portion 81 and the exterior heat exchanger 16 within the tank 96. The wall of the sleeve 213d is formed with the passage 213a. An opening for introducing the refrigerant is formed in a wall of an outer periphery of the sleeve 213d. The movable valving element 213c is supported within the sleeve 213d. According to this configuration, the expansion valve 213 can be simply assembled into the tank 96.

Thirty-Second Embodiment

Figure 43:
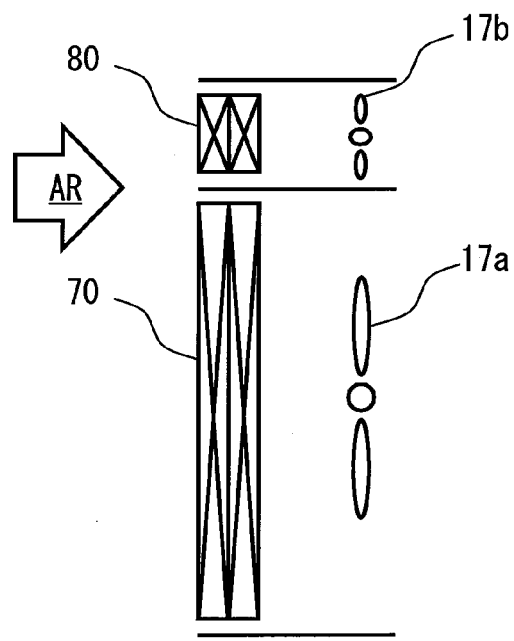
FIG. 43 is a top view illustrating a blower available in a heat pump cycle according to a thirty-second embodiment of the present disclosure.

In this embodiment, as illustrated in FIG. 43, a fan 17a for blowing air to the heat exchanger 70, and a fan 17b for blowing air to the heat exchanger 80 are disposed. An air volume of the fan 17a and an air volume of the fan 17b can be regulated, independently. The air volume of the fan 17a and the air volume of the fan 17b are regulated according to the operation mode of the heat pump cycle 2.

For example, when the heat exchanger 80 is used for conducting heat exchange between the refrigerant RF and the coolant WT, the air volume of the fan 17b is regulated to zero (0) or a small air volume. Also, when the heat exchanger 80 is used as the radiation heat exchanger, the fan 17b is regulated to a large air volume. For example, when the refrigerant circuit 10 conducts the cooling operation, the high-pressure refrigerant is supplied to the heat exchange portion 81 and the exterior heat exchanger 16. Hence, the air AR is transferred to the heat exchanger 80 so that the heat exchanger 80 can function as a condenser. As a result, the heat exchanger 80 can be used not only for the improvement in the frosting resistive performance, but also as a part of the condenser.

Also, the fan 17b may be regulated to the large air volume when the temperature of the coolant WT is excessively high. Since the coolant WT flows in the heat exchange portion 82, the heat radiation from the coolant WT can be facilitated by the air AR. As a result, the heat exchanger 80 can be used not only for the improvement in the frosting resistive performance, but also for the heat radiation from the coolant circuit 40.

Thirty-Third Embodiment

Figure 44:
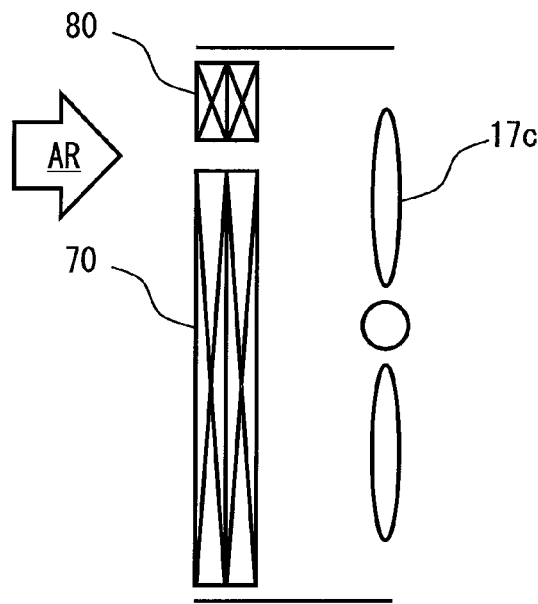
FIG. 44 is a top view illustrating a blower available in a heat pump cycle according to a thirty-third embodiment of the present disclosure.

In this embodiment, as illustrated in FIG. 44, a common fan 17c for blowing air to both of the heat exchanger 70 and the heat exchanger 80 is disposed. According to this configuration, the configuration of the heat pump cycle 2 can be simplified.

Thirty-Fourth Embodiment

Figure 45:
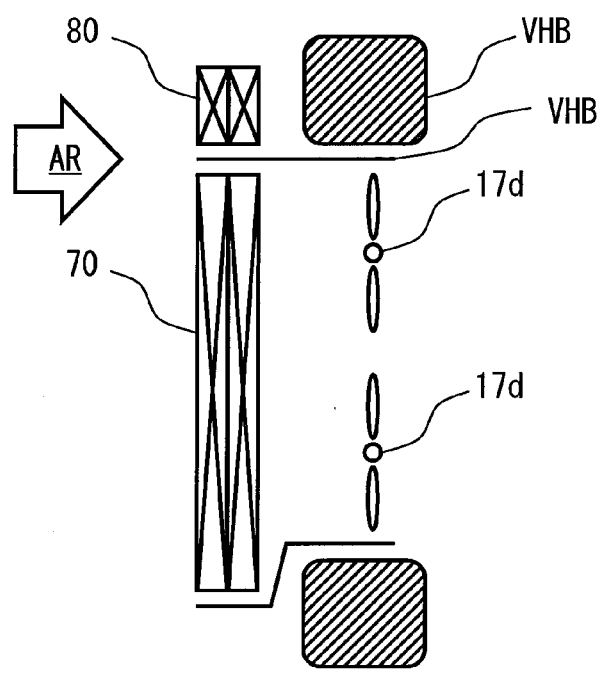
FIG. 45 is a top view illustrating a blower available in a heat pump cycle according to a thirty-fourth embodiment of the present disclosure.

In this embodiment, as illustrated in FIG. 45, fans 17d for blowing air to the heat exchanger 70 are disposed, but a device for positively blowing air to the heat exchanger 80 is not provided. In this configuration, the air AR is blown to the heat exchanger 70 by the multiple fan 17d. On the other hand, the heat exchanger 80 is disposed in a portion where the flow of the air AR is blocked by a constituent member VHB such as a chassis of a vehicle or a fan shroud. In other words, the heat exchanger 80 is located at a portion where a ventilation resistance of the air AR to be supplied to the heat exchanger 70 is large. A portion that limits arrival of the air AR at the heat exchanger 80 is provided by a member such as the constituent member VHB.

The heat exchanger 80 mainly provides the heat exchange between the refrigerant RF and the coolant WT to realize the provision of heat for improving the frosting resistive performance. Hence, the heat radiation from the heat exchanger 80 to the air AR is not essential. Therefore, a configuration in which the heat radiation from the heat exchanger 80 to the air AR is limited can be applied.

Thirty-Fifth Embodiment

In the multiple embodiments described above, multiple configurations for supplying the heat of the high-temperature refrigerant to the exterior heat exchanger 16 are described. In one of those configurations, the heat of the high-temperature refrigerant is indirectly transferred by the heat exchanger 80 and the radiator 43. In this case, the heat exchanger 80 can be called "heat receiving heat exchanger" that receives the heat of the high-temperature refrigerant, and supplies the heat to the coolant. Another of those configurations is a configuration in which the heat of the high-temperature refrigerant is directly transferred by the radiator 43e. Those heat exchangers 80, 43, and 43e may be used as an example of an auxiliary heat exchanger HEX for extracting heat of the high-temperature refrigerant to supply the heat to the exterior heat exchanger 16. Also, the interior condenser 12 may be used as an example of the use-side heat exchanger in the heating use. The interior condenser 12 can be called "interior heat exchanger" in the heating use. The interior evaporator 20 is used in the cooling use. Hence, the interior evaporator 20 can be called "use-side heat exchanger" in the cooling use, or "interior heat exchanger" in the cooling use. In the following description, a modified example of the auxiliary heat exchanger HEX will be described.

Figure 46:
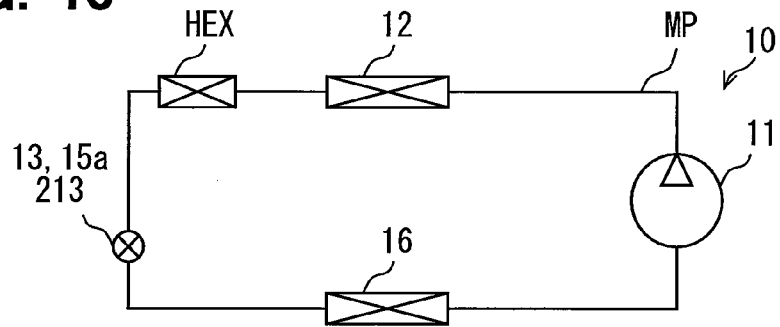
FIG. 46 is a simplified schematic diagram illustrating a refrigerant circuit corresponding to the heat pump cycle in FIGS. 1, 11, and 19.

As illustrated in FIG. 46, the refrigerant circuit 10 illustrated in FIGS. 1, 11, and 19 forms a mainstream circuit MP in the heating use. In an example of FIG. 1, a decompressor having an opening degree variable by the fixed aperture 13 and the on-off valve 15a is provided. In an example of FIG. 11, a decompressor having an opening degree variable by the expansion valve 213 is provided. In the heating use, the exterior heat exchanger 16 is used as the absorption heat exchanger. In this configuration, the auxiliary heat exchanger HEX is arranged in series with the mainstream circuit MP. The high-temperature refrigerant is a high-pressure refrigerant in the refrigerant circuit 10. The auxiliary heat exchanger HEX is arranged between the interior condenser 12 and the expansion valve 213. Hence, in the configuration shown in the figure, the heat of the high-temperature refrigerant is extracted from between the interior condenser 12 and the expansion valve 213, and supplied to the heat exchanger 70, that is, the exterior heat exchanger 16.

Figure 47:
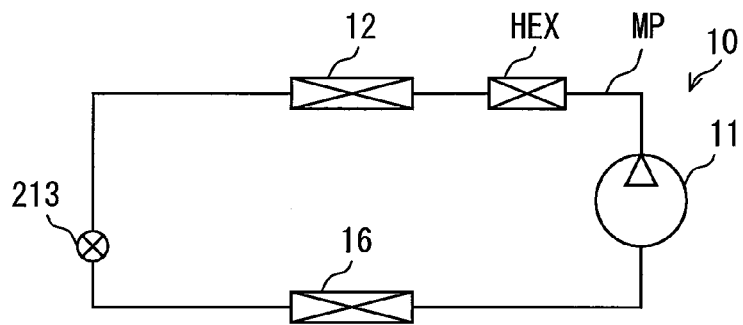
FIG. 47 is a simplified schematic diagram illustrating a refrigerant circuit corresponding to the heat pump cycle in FIG. 12.

As illustrated in FIG. 47, the refrigerant circuit 10 illustrated in FIG. 12 has the auxiliary heat exchanger HEX between the compressor 11 and the interior condenser 12. Hence, in the configuration shown in the figure, the heat of the high-temperature refrigerant is extracted from between the compressor 11 and the interior condenser 12, and supplied to the exterior heat exchanger 16.

Figure 48:
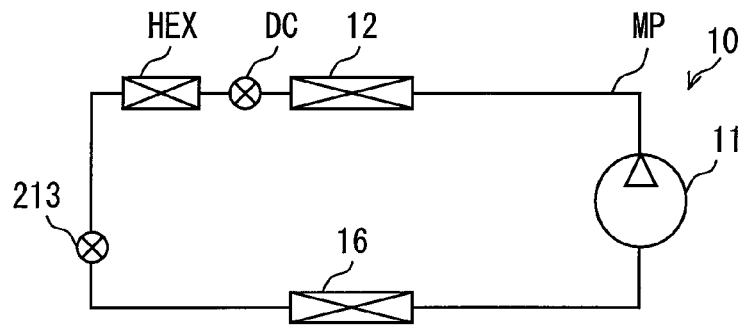
FIG. 48 is a simplified schematic diagram illustrating a refrigerant circuit of a heat pump cycle according to a thirty-fifth embodiment of the present disclosure.

As illustrated in FIG. 48, in this embodiment, the auxiliary heat exchanger HEX is arranged between the interior condenser 12 and the expansion valve 213. A decompressor DC having a variable opening degree is arranged between the interior condenser 12 and the auxiliary heat exchanger HEX. The interior condenser 12, the decompressor DC, the auxiliary heat exchanger HEX, and the exterior heat exchanger 16 are arranged in the mainstream circuit MP in the stated order so that the refrigerant flows therein in the stated order in the heating use. The decompressor DC is used for maintaining a high pressure in the interior condenser 12. Further, the decompressor DC is used for regulating the temperature of a high-temperature refrigerant in the auxiliary heat exchanger HEX. The decompressor DC can be also called "pressure regulator" that maintains the high pressure in the interior condenser 12 for the heating use, and regulates the temperature of the auxiliary heat exchanger HEX. The decompressor DC can be provided by an expansion valve or an aperture.

According to the configuration illustrated in FIGS. 46 to 48, after the refrigerant that has passed through the auxiliary heat exchanger HEX has been decompressed by the expansion valve 213, the refrigerant can be supplied to the compressor 11, and absorbed therein, in the heating use. The exterior heat exchanger 16 is used as the radiation heat exchanger in the cooling use. The expansion valve 213 is controlled so that the high-temperature refrigerant discharged from the compressor 11 arrives at the auxiliary heat exchanger HEX, to thereby enable the high-temperature refrigerant to be supplied to the auxiliary heat exchanger HEX in the cooling use. Hence, even if the exterior heat exchanger 16 is switched between a heat absorption application and a heat radiation application by a cycle switching mechanism, the high-temperature refrigerant is supplied to the auxiliary heat exchanger HEX in both of those applications so that the auxiliary heat exchanger HEX can be used.

According to the configuration illustrated in FIGS. 46 to 48, the compressor 11, the interior condenser 12, the expansion valve 213, and the exterior heat exchanger 16 configure the mainstream circuit MP in the heating use. The auxiliary heat exchanger HEX supplies the heat obtained from the high-temperature refrigerant upstream or downstream of the interior condenser 12 to the exterior heat exchanger 16. According to this configuration, the heat can be obtained from the high-temperature refrigerant with the simple configuration.

Thirty-Sixth Embodiment

Figure 49:
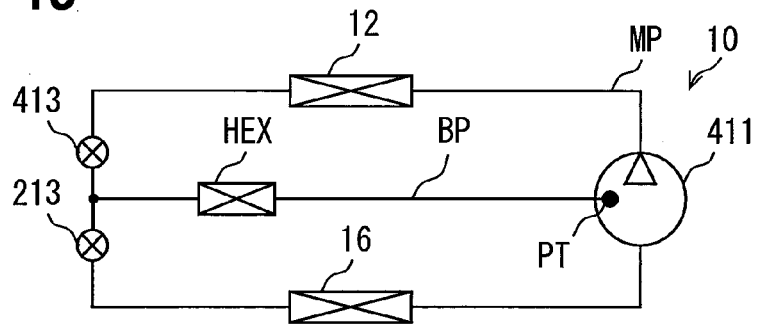
FIG. 49 is a simplified schematic diagram illustrating a refrigerant circuit corresponding to the heat pump cycle in FIG. 13.

As illustrated in FIG. 49, the refrigerant circuit 10 illustrated in FIG. 13 includes the compressor 411. The compressor 411 has two-stage compression mechanisms. A gas injection port PT is an intake port of a second compression mechanism, that is, an intake port of an intermediate pressure. In this configuration, a branch circuit BP is formed between a joint between the decompressor 413 and the expansion valve 213, and a gas injection port PT. The auxiliary heat exchanger HEX is arranged in series on the branch circuit BP. The refrigerant of the intermediate pressure between the high-pressure refrigerant and the low-pressure refrigerant in the refrigerant circuit 10 flows in the branch circuit BP. Hence, in the configuration shown in the figure, the heat of the high-temperature refrigerant is extracted from the branch circuit BP, and supplied to the exterior heat exchanger 16.

Figure 50:
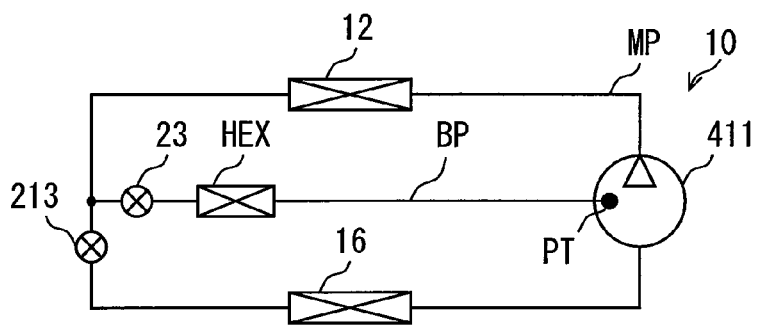
FIG. 50 is a simplified schematic diagram illustrating a refrigerant circuit corresponding to the heat pump cycle in FIG. 22.

As illustrated in FIG. 50, the refrigerant circuit 10 illustrated in FIG. 22 has a decompressor 23 in the branch circuit BP. The auxiliary heat exchanger HEX is arranged in series on the branch circuit BP.

Figure 51:
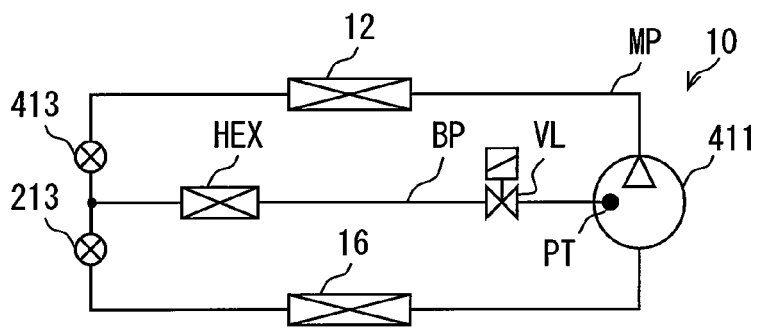
FIG. 51 is a simplified schematic diagram illustrating a refrigerant circuit of a heat pump cycle according to a thirty-sixth embodiment of the present disclosure.

As illustrated in FIG. 51, in this embodiment, an on-off valve VL that opens and closes the branch circuit BP is provided. The on-off valve VL is disposed downstream of the auxiliary heat exchanger HEX. The on-off valve VL can disconnect the supply of the high-temperature refrigerant to the auxiliary heat exchanger HEX. The on-off valve VL is controlled in an open state in the heating use, and controlled in a closed state in the cooling use. The on-off valve VL is controlled so that the temperature of the high-temperature refrigerant in the auxiliary heat exchanger HEX can be regulated. The on-off valve VL may be disposed upstream of the auxiliary heat exchanger HEX. Further, the on-off valve VL can be also employed in the configuration of FIG. 50.

Thirty-Seventh Embodiment

Figure 52:
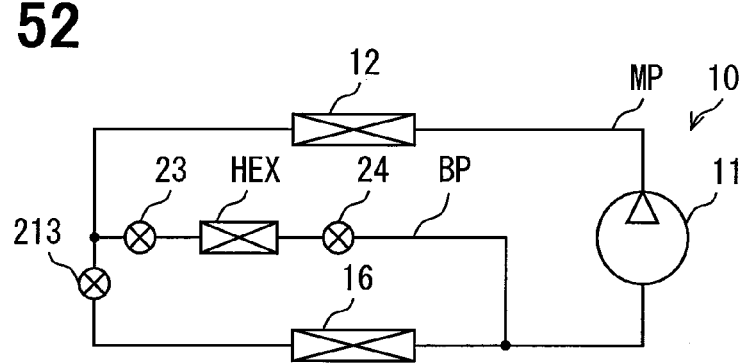
FIG. 52 is a simplified schematic diagram illustrating a refrigerant circuit corresponding to the heat pump cycle in FIG. 21.

As illustrated in FIG. 52, the refrigerant circuit 10 illustrated in FIG. 21 forms the branch circuit BP in the heating use. In the heating use, one end, that is, an inlet end of the branch circuit BP is communicated between the interior condenser 12 and the exterior heat exchanger 16. The other end, that is, an outlet end of the branch circuit BP is communicated between the exterior heat exchanger 16 and the compressor 11. The branch circuit BP is formed in parallel to the exterior heat exchanger 16 without the inclusion of the compressor 11. The auxiliary heat exchanger HEX is disposed in series on the branch circuit BP. Hence, the auxiliary heat exchanger HEX can be communicated between the exterior heat exchanger 16 and the compressor 11.

The decompressor 24 is disposed between the auxiliary heat exchanger HEX and the compressor 11. In the heating use, the decompressor 24 is regulated to a narrow opening degree for decompressing the refrigerant. In the cooling use, the decompressor 24 is adjusted to an opening degree for supplying the high-temperature refrigerant to the auxiliary heat exchanger HEX, for example, a full opening.

In the cooling use, one end of the branch circuit BP is communicated with a high pressure portion between the compressor 11 and the exterior heat exchanger 16. The other end of the branch circuit BP is communicated between the exterior heat exchanger 16, and an interior condenser in the cooling use, that is, the interior evaporator 20. Hence, in the cooling use, the high-temperature refrigerant can flow in parallel to the exterior heat exchanger 16 and the auxiliary heat exchanger HEX. Further, the refrigerant that has passed through the exterior heat exchanger 16 and the auxiliary heat exchanger HEX can be supplied to the use-side heat exchanger in the cooling use, that is, the interior evaporator 20. Hence, the high performance is obtained in the cooling use.

Figure 53:
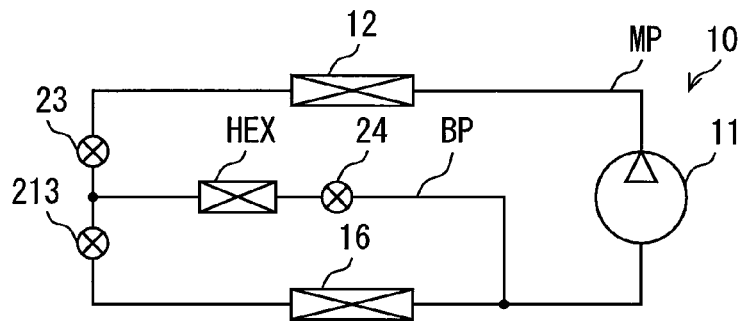
FIG. 53 is a simplified schematic diagram illustrating a refrigerant circuit of a heat pump cycle according to a thirty-seventh embodiment of the present disclosure.

As illustrated in FIG. 53, in this embodiment, the decompressor 23 is disposed on the mainstream circuit MP which is located upstream of the auxiliary heat exchanger HEX. In this configuration, the decompressor 23 decompresses the refrigerant so as to supply the high-temperature refrigerant to the auxiliary heat exchanger HEX. The refrigerant is decompressed by both of the decompressor 23 and the expansion valve 213 so that the exterior heat exchanger 16 functions as an absorption heat exchanger.

Thirty-Eighth Embodiment

Figure 54:
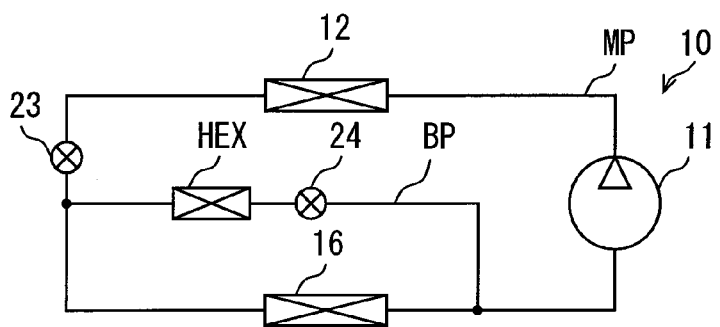
FIG. 54 is a simplified schematic diagram illustrating a refrigerant circuit of a heat pump cycle according to a thirty-eighth embodiment of the present disclosure.

As illustrated in FIG. 54, in this embodiment, the decompressor 23 is disposed on the mainstream circuit MP which is located upstream of the auxiliary heat exchanger HEX. In this configuration, the refrigerant is decompressed by only the decompressor 23 so that the exterior heat exchanger 16 functions as an absorption heat exchanger. The decompressor 24 is disposed downstream of the auxiliary heat exchanger HEX. The decompressor 24 generates a pressure loss so as to supply the high-temperature refrigerant to the auxiliary heat exchanger HEX.

According to the configuration illustrated in FIGS. 52 to 54, in the heating use, after the refrigerant that has passed through the auxiliary heat exchanger HEX has been decompressed by the decompressor 24, the refrigerant can be supplied to the compressor 11, and sucked therein. On the other hand, in the cooling use, the decompressor 24 is controlled so that the high-temperature refrigerant discharged from the compressor 11 arrives at the auxiliary heat exchanger HEX. As a result, the high-temperature refrigerant can be supplied to the auxiliary heat exchanger HEX. Hence, even if the exterior heat exchanger 16 is switched between the heat absorption application and the heat radiation application by the cycle switching mechanism, the high-temperature refrigerant can be supplied to the auxiliary heat exchanger HEX in both of those application, to use the auxiliary heat exchanger HEX.

Thirty-Ninth Embodiment

Figure 55:
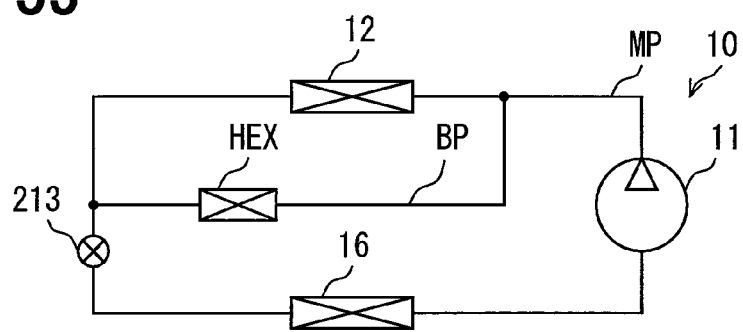
FIG. 55 is a simplified schematic diagram illustrating a refrigerant circuit of a heat pump cycle according to a thirty-ninth embodiment of the present disclosure.

As illustrated in FIG. 55, in this embodiment, the refrigerant circuit 10 forms the branch circuit BP in the heating use. One end, that is, an inlet end of the branch circuit BP is communicated between the compressor 11 and the interior condenser 12. The other end, that is, an outlet end of the branch circuit BP is communicated between the interior condenser 12 and the exterior heat exchanger 16. The branch circuit BP is formed in parallel to the interior condenser 12 without the inclusion of the compressor 11. The auxiliary heat exchanger HEX is disposed in series on the branch circuit BP. Hence, the auxiliary heat exchanger HEX can be communicated between the compressor 11 and the interior condenser 12.

The branch circuit BP provides a hot gas bypass circuit. According to this configuration, the high-temperature refrigerant before passing through the interior condenser 12 can be introduced into the auxiliary heat exchanger HEX.

Fortieth Embodiment

Figure 56:
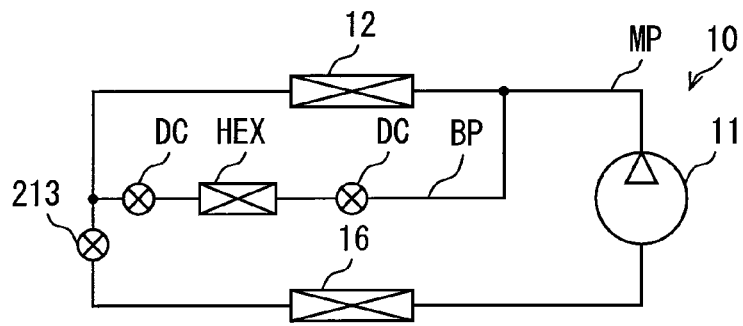
FIG. 56 is a simplified schematic diagram illustrating a refrigerant circuit of a heat pump cycle according to a fortieth embodiment of the present disclosure.

As illustrated in FIG. 56, in this embodiment, decompressors DC are each disposed in front of and at the rear of the auxiliary heat exchanger HEX. The decompressors DC generate the pressure loss so as to supply the high-temperature refrigerant to the auxiliary heat exchanger HEX. According to this configuration, the pressure control in the auxiliary heat exchanger HEX can be executed, completely independently from the pressure control in the interior condenser 12.

According to the configuration illustrated in FIGS. 55 and 56, in the heating use, after the refrigerant that has passed through the auxiliary heat exchanger HEX has been decompressed by the expansion valve 213, the refrigerant can be supplied to the compressor 11, and sucked therein. On the other hand, in the cooling use, the expansion valve 213 and the decompressor DC are controlled so that the high-temperature refrigerant discharged from the compressor 11 arrives at the auxiliary heat exchanger HEX. As a result, the high-temperature refrigerant can be supplied to the auxiliary heat exchanger HEX. Hence, even if the exterior heat exchanger 16 is switched between the heat absorption application and the heat radiation application by the cycle switching mechanism, the high-temperature refrigerant can be supplied to the auxiliary heat exchanger HEX in both of those application, to use the auxiliary heat exchanger HEX.

Forty-First Embodiment

Figure 57:
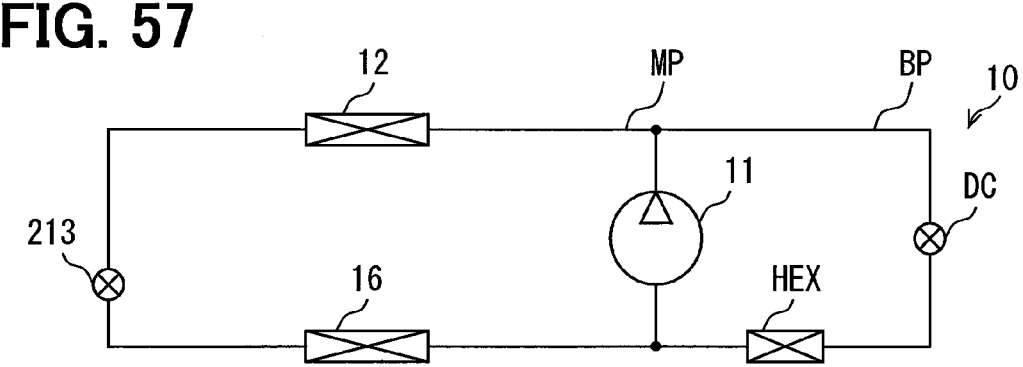
FIG. 57 is a simplified schematic diagram illustrating a refrigerant circuit of a heat pump cycle according to a forty-first embodiment of the present disclosure.

As illustrated in FIG. 57, in this embodiment, the refrigerant circuit 10 forms the branch circuit BP in the heating use. One end, that is, an inlet end of the branch circuit BP is communicated between the compressor 11 and the interior condenser 12. The other end, that is, an outlet end of the branch circuit BP is communicated between the exterior heat exchanger 16 and the compressor 11. The branch circuit BP is formed in parallel to only the compressor 11. The auxiliary heat exchanger HEX is disposed in series on the branch circuit BP. Hence, the auxiliary heat exchanger HEX can be communicated between the compressor 11 and the exterior heat exchanger 16. The decompressor DC is disposed in series with the auxiliary heat exchanger HEX. The decompressor DC is located upstream of the auxiliary heat exchanger HEX in the heating use.

Forty-Second Embodiment

Figure 58:
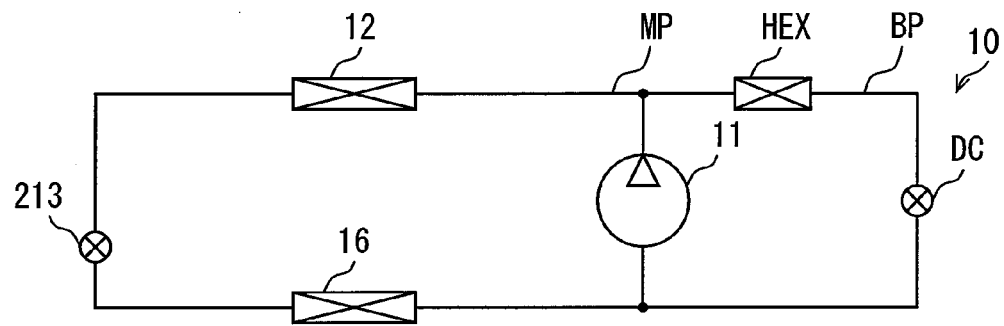
FIG. 58 is a simplified schematic diagram illustrating a refrigerant circuit of a heat pump cycle according to a forty-second embodiment of the present disclosure.

As illustrated in FIG. 58, in this embodiment, the decompressor DC is located downstream of the auxiliary heat exchanger HEX in the heating use.

According to the configuration illustrated in FIGS. 57 and 58, even if the exterior heat exchanger 16 is switched between the heat absorption application and the heat radiation application by the cycle switching mechanism, the high-temperature refrigerant can be supplied to the auxiliary heat exchanger HEX in both of those application, to use the auxiliary heat exchanger HEX.

According to the configuration illustrated in FIGS. 49 to 58, in the heating use, the compressor 11, the interior condenser 12, the expansion valve 213, and the exterior heat exchanger 16 configure the mainstream circuit MP. Further, the refrigerant circuit 10 includes the branch circuit BP branched from the upstream or downstream of the interior condenser 12. The auxiliary heat exchanger HEX supplies the heat obtained from the high-temperature refrigerant in the branch circuit BP to the exterior heat exchanger 16. According to this configuration, the heat can be obtained from the high-temperature refrigerant with the simple configuration. Further, the flow rate of the high-temperature refrigerant can be regulated while limiting an influence on the mainstream circuit MP. For example, the branch circuit BP is closed to block the high-temperature refrigerant.

According to the configuration illustrated in FIGS. 46 to 58, at least one of the expansion valve 213, the decompressors 23, 24, the DC, and the on-off valve VL is located upstream or downstream of the auxiliary heat exchanger HEX. The expansion valve 213, the decompressors 23, 24, the DC, and the on-off valve VL may be used as an example of a flow rate regulator. The flow rate regulator is located upstream or downstream of the auxiliary heat exchanger HEX in both of the heating use and the cooling use. The flow rate regulator regulates the flow rate of the high-temperature refrigerant so that the flow rate of the high-temperature refrigerant in the cooling use becomes higher than the flow rate of the high-temperature refrigerant in the heating use. According to this configuration, the flow rate of the high-temperature refrigerant in the cooling use is higher than the flow rate of the high-temperature refrigerant in the heating use. The heat obtained from the high-temperature refrigerant in the cooling use is larger than the heat obtained from the high-temperature refrigerant in the heating use. As a result, the auxiliary heat exchanger HEX can be sufficiently used in the cooling use.

Forty-Third Embodiment

Figure 59:
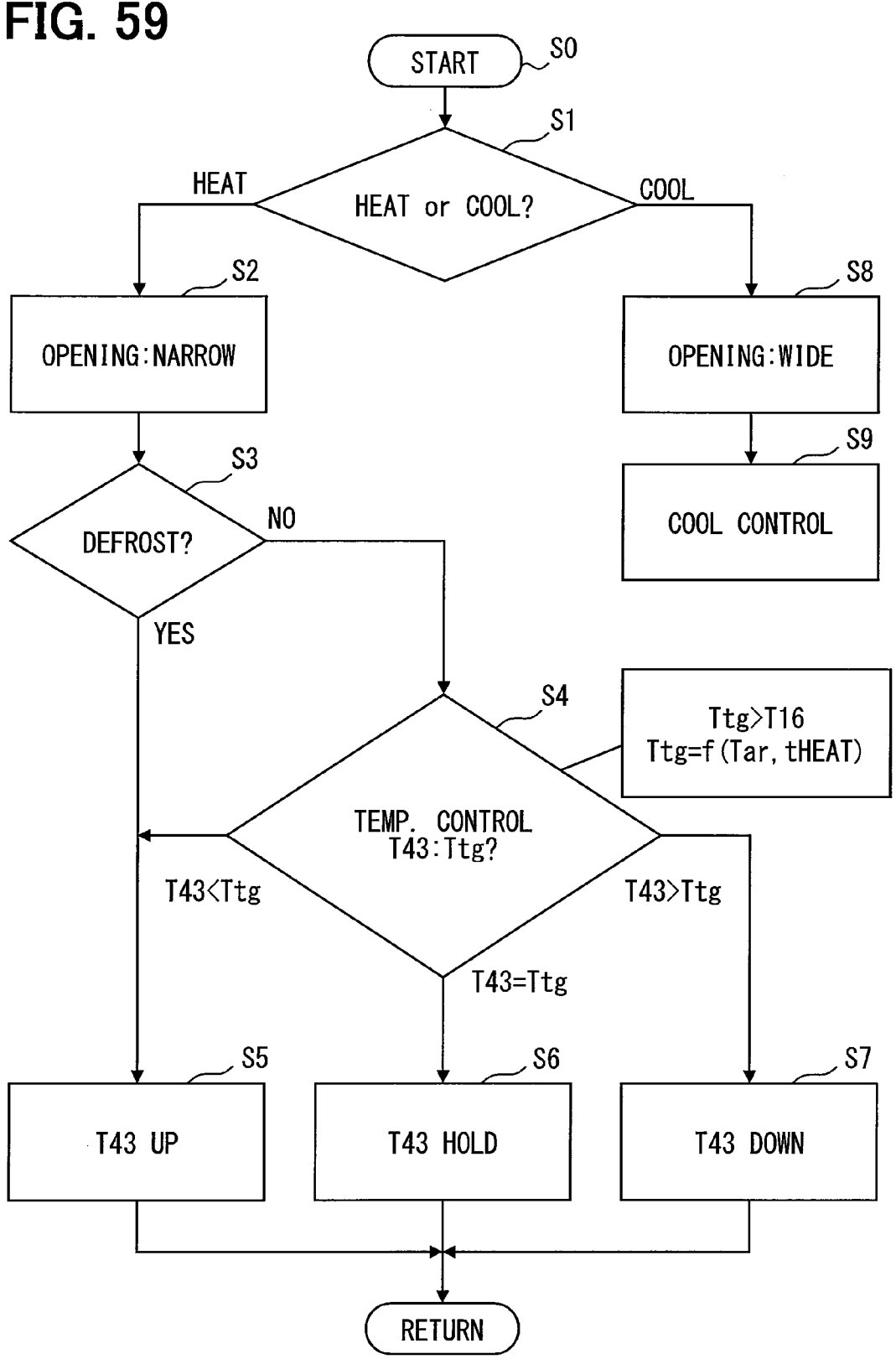
FIG. 59 is a flowchart for controlling a temperature of a heat pump cycle according to a forty-third embodiment of the present disclosure.

In a forty-third embodiment, details applicable to this embodiment will be described. FIG. 59 illustrates a control process S0 for temperature control applicable to any heat pump cycle in the above-mentioned embodiments. With the application of the control process S0, one novel embodiment is provided. The control process S0 provides a temperature control portion that controls a temperature supplied to the exterior heat exchanger 16 by the auxiliary heat exchanger HEX.

In Step S0, the control device 100 determines whether the heat pump cycle 2 operates as the heating use, or operates as the cooling use. This determination can be provided by the determination of whether heating is applied, or not. In the heating use, the control proceeds to Step S2. In the cooling use, the control proceeds to Step S8.

The control device 100 sets the opening degree of the flow rate regulator arranged in series to the auxiliary heat exchanger HEX, that is, the heat exchanger 80 or the radiator 43e to an opening degree for the heating operation at Step S2. The flow rate regulator regulates the flow rate of the high-temperature refrigerant to be supplied to the heat exchanger 80 or the radiator 43e. A parallel circuit of the on-off valve 15a and the fixed aperture 13, the expansion valve 213, the decompressors 23, 24, the DC, or the on-off valve VL may be used as an example of the flow rate regulator. The opening degree for the heating use is a relatively narrow opening degree. Hence, the flow rate of the high-temperature refrigerant in the heating use is a relatively low flow rate.

The control device 100 determines whether the exterior heat exchanger 16 needs to be defrosted, or not, at Step S3. If the defrosting is necessary, the control proceeds to Step S5 which will be described later. A process for increasing the temperature of the auxiliary heat exchanger HEX is executed at Step S5. If the defrosting is unnecessary, the control proceeds to Step S4. If multiple conditions are not satisfied, the need of defrosting can be affirmatively determined. That the temperature of the heat exchanger 70 is as low as frost is generated can be set as one of the conditions. That the coolant temperature Tw is as relatively high as defrosting can be conducted, that is, exceeds a predetermined defrosting determination value can be set as one of the conditions. That the vehicle is in a state where defrosting can be executed can be set as one of the conditions. That a travel speed of the vehicle falls below a predetermined determination value can be set as one of the conditions. That the vehicle does not run, for example, a power switch such as an ignition switch is at an off position can be set as one of the conditions.

The control device 100 executes a process for the temperature control of the auxiliary heat exchanger HEX at Step S4. In this example, a temperature T43 in the auxiliary heat exchanger HEX is compared with a target Ttg. If the temperature T43 falls below the target Ttg, that is, if T43<Ttg, the control proceeds to Step S4. If the temperature T43 is equal to the target Ttg, that is, if T43=Ttg, the control proceeds to Step S5. If a difference between the temperature T43 and the target Ttg falls within a predetermined range, it can be determined that T43=Ttg. If the temperature T43 exceeds the target Ttg, that is, if T43>Ttg, the control proceeds to Step S6.

The target Ttg is set to exceed a temperature T16 of the exterior heat exchanger 16. The target Ttg can be set to a fixed value or a variable value. The target Ttg can be set on the basis of a temperature Tar of the air AR, that is, a temperature of the external air. The target Ttg can be set on the basis of heat pump operation using a heat pump cycle 2, that is, a duration time tHEAT of the heating operation. For example, Ttg=f (Tar, tHEAT) can be set with the use of a function f (Tar, tHEAT) with the temperature Tar and the duration time tHEAT as variables.

For example, the target Ttg can be set to be higher than the temperature Tar by a predetermined value. When the exterior heat exchanger 16 is used as the absorption heat exchanger, since Tar>T16 is satisfied, a target Tth is set to satisfy Tth>Tar>T16. As a result, the temperature T43 of the auxiliary heat exchanger HEX is subjected to feedback control so as to satisfy T43>Tar>T16.

For example, the target Ttg can be set to be lower than the temperature Tar by a predetermined value. When the exterior heat exchanger 16 is used as the absorption heat exchanger, since Tar>T16 is satisfied, a target Tth is set to satisfy Tar>Tth>T16. As a result, the temperature T43 of the auxiliary heat exchanger HEX is subjected to feedback control so as to satisfy Tar>T43>T16.

The amount of frost adhering to the exterior heat exchanger 16 increases more as the duration time tHEAT is longer. As the amount of frost increases more, the heat exchange performance in the exterior heat exchanger 16 is degraded, and at the same time, the heat pump capacity, that is, the heating capacity is also degraded. In order to compensate the above capacity degradation, and/or suppress the growth of frost, it is desirable that the target Ttg increases more as the duration time tHEAT is longer. For example, the target Ttg is set to be proportional to the duration time tHEAT. As a result, the temperature T43 of the auxiliary heat exchanger HEX is subjected to the feedback control so as to gradually increase in proportion to the duration time tHEAT. In other word, the temperature T43 is subjected to the feedback control so that a difference between the temperature T43 and the temperature T16 becomes larger as the formation of frost on the exterior heat exchanger 16 is advanced.

The control device 100 executes a control for increasing the temperature T43 of the auxiliary heat exchanger HEX, at Step S5. For example, the refrigerant circuit 10, for example, the compressor 11 and/or the decompressor are controlled to increase the temperature of the high-temperature refrigerant in the heat exchanger 80 or the radiator 43e at Step S4. In the heat pump cycle 2 using the heat exchanger 80 and the radiator 43, instead of the above control, or in addition, a device of the coolant circuit 40 is controlled to increase the coolant temperature Tw of the coolant WT that flows in the radiator 43.

The control device 100 executes a control for maintaining the temperature T43 of the auxiliary heat exchanger HEX at Step S6.

In Step S7, the control device 100 executes a control for decreasing the temperature T43 of the auxiliary heat exchanger HEX. The refrigerant circuit 10, for example, the compressor 11, and/or the decompressor are controlled to decrease the temperature of the high-temperature refrigerant, for example, in the heat exchanger 80 or the radiator 43e, at Step S7. In the heat pump cycle 2 using the heat exchanger 80 and the radiator 43, instead of the above control, or in addition, the device of the coolant circuit 40 is controlled to decrease the coolant temperature Tw of the coolant WT that flows in the radiator 43.

If it is determined as the cooling use at Step S1, the control proceeds to Step S8. In Step S8, the control device 100 sets the opening degree of the flow rate regulator arranged in series with the auxiliary heat exchanger HEX, that is, the heat exchanger 80 or the radiator 43e to an opening degree for the cooling operation. The opening degree for the cooling use is a relatively large opening degree. Hence, the flow rate of the high-temperature refrigerant in the cooling use is a relatively high flow rate. The flow rate regulator sets the opening degree in the cooling use to be larger than the opening degree in the heating use at Steps S1, S2, and S8. In other words, the flow rate regulator sets the flow rate of the high-temperature refrigerant in the cooling use to be higher than the flow rate of the high-temperature refrigerant in the heating use.

The control device 100 executes the cooling operation for the cooling use at Step S9. In this step, the cycle switching device (15a, 15b) is controlled, and the interior evaporator 20 is set as the use-side heat exchanger.

According to the above configuration, since the temperature T43 is subjected to the feedback control so as to satisfy T43>T16, the suppression of the growth of frost, and/or the removal of frost can be conducted. Also, if the temperature T43 is subjected to the feedback control so as to satisfy Tar>T43>T16, the heat radiation from the auxiliary heat exchanger HEX to the air AR is avoided. For that reason, the suppression of the growth of frost in the exterior heat exchanger 16, and/or the removal of frost can be conducted while maintaining the high heating capacity. Moreover, a heat transfer route that goes through the radiator 43 between the air AR and the exterior heat exchanger 16 is provided. For that reason, the heat absorption in the exterior heat exchanger 16 can be facilitated.

Also, the temperature T43 is subjected to the feedback control to increase more as the duration time tHEAT becomes longer, as a result of which the capacity reduction of the exterior heat exchanger 16 due to an increase in the frost can be suppressed, or avoided. As a result, the high-efficient operation is provided in an initial stage of the heating operation, and thereafter can be shifted to operation that can resist against frost. Also, if defrosting is necessary, the defrosting can be conducted.

Other Embodiments

The preferred embodiments of the present disclosure have been described above. However, the present disclosure is not limited to the above-mentioned embodiments, and can be variously modified without departing from the spirit of the present disclosure. The structures of the above respective embodiments are consistently exemplified, and the present disclosure is not limited to a scope of those description.

For example, the portions and the functions provided by the control device can be provided by only software, only hardware, or the combination thereof. For example, the control device may be configured by an analog circuit.

In the above embodiments, the coolant or the refrigerant are used as the auxiliary medium. Instead, a fluid that is excellent in heat carrying property, and can store the heat, for example, oil or gas may be used.

In the above embodiments, the radiator 43 is disposed in the coolant circuit 40. In addition, a heat exchanger for radiating heat from the coolant WT by heat exchange between the coolant WT and the air AR may be provided. For example, a radiation heat exchanger can be provided in parallel to the radiator 43 and the external heat source HS.

Also, when the exterior heat exchanger 16 absorbs the heat, the heat obtained from the high-temperature refrigerant may be used for the purpose of only suppressing the adhesion of frost to the heat exchanger 70. Also, the heat obtained from the high-temperature refrigerant may be used for the purpose of only defrosting the frost that has adhered to the heat exchanger 70 after the external heat exchanger has absorbed the heat.

Also, in the above embodiments, the air passages 16b and 43b are disposed in both of the exterior heat exchanger 16 and the radiator 43. Alternatively, a configuration in which no air passage is formed in the radiator 43 may be applied. Also, the refrigerant tubes 16a and the water tubes 43a can be alternately arranged in the entirety or a part of the heat exchanger 70. Also, the refrigerant tubes 16a and the water tubes 43a can be alternately arranged in the entirety or a part of the heat exchanger 70 in the upstream row. Also, the refrigerant tubes 16a and the water tubes 43a may be arranged to configure three or more rows with respect to the flow direction of the air AR.

What is claimed is:

1. A heat pump cycle, comprising:
   a compressor that sucks and compresses a low-pressure refrigerant to supply a high-pressure refrigerant;
   a use-side heat exchanger to which the high-pressure refrigerant is supplied and a heat is supplied from the high-pressure refrigerant in a heating use;
   a decompressor that decompresses the high-pressure refrigerant to supply the low-pressure refrigerant in the heating use;
   an exterior heat exchanger including an air passage to allow an air to flow therein, and low-temperature medium tubes that conduct a heat exchange between the air and the low-pressure refrigerant and allow the low-pressure refrigerant to absorb a heat in the heating use;
   a heat source heat exchanger that supplies a heat obtained from the high-pressure refrigerant to an auxiliary medium, the high-pressure refrigerant being higher in temperature than the low-pressure refrigerant, and
   an auxiliary heat exchanger that is arranged adjacent to the exterior heat exchanger, the auxiliary heat exchanger including an air passage to allow the air to flow therein, and high-temperature medium tubes through which the auxiliary medium flows to supply the obtained heat to the exterior heat exchanger in the heating use, wherein
   the exterior heat exchanger and the auxiliary heat exchanger configure a first heat exchanger unit that is usable as an integrated unit,
   the low-temperature medium tubes and the high-temperature medium tubes are arranged to be thermally coupled with each other in at least a part of the first heat exchanger unit,
   the first heat exchanger unit includes an upstream row in which tubes are arranged in a line, and a downstream row in which tubes are arranged in a line on a downstream side of the upstream row in a flow direction of the air,
   the upstream row includes a group of the high-temperature medium tubes, and a group of the low-temperature medium tubes,
   tubes of the group of the low-temperature medium tubes and tubes of the group of the high-temperature medium tubes are alternately arranged in at least a part of the upstream row, and
   the exterior heat exchanger and the heat source heat exchanger are integrated as a second heat exchanger unit that is usable as an integrated unit.

2. The heat pump cycle according to claim 1, further comprising a cycle switching device that switches a flow channel between the heating use in which the exterior heat exchanger functions as an absorption heat exchanger that allows the low-pressure refrigerant to absorb the heat and a cooling use in which the exterior heat exchanger functions as a radiation heat exchanger that allows the high-temperature refrigerant to radiate heat to the air, wherein
   the auxiliary heat exchanger radiates the heat obtained from the high-temperature refrigerant to the air in the cooling use.

3. The heat pump cycle according to claim 2, further comprising a flow rate regulator that makes a flow rate of the high-temperature refrigerant in the cooling use larger than a flow rate of the high-temperature refrigerant in the heating use.

4. The heat pump cycle according to claim 1, wherein the low-temperature medium tubes and the high-temperature medium tubes are thermally coupled with each other through a fin arranged in the air passage.

5. The heat pump cycle according to claim 1, wherein the compressor, the use-side heat exchanger, the decompressor, and the exterior heat exchanger configure a mainstream circuit in the heating use, and the auxiliary heat exchanger supplies heat to the exterior heat exchanger, and the heat supplied from the auxiliary heat exchanger to the exterior heat exchanger is obtained from the high-temperature refrigerant upstream or downstream of the use-side heat exchanger.

6. The heat pump cycle according to claim 1, wherein the compressor, the use-side heat exchanger, the decompressor, and the exterior heat exchanger configure a mainstream circuit in the heating use, the heat pump cycle further comprises a branching circuit that is branched from upstream or downstream of the use-side heat exchanger, and the auxiliary heat exchanger supplies the heat to the exterior heat exchanger, and the heat supplied from the auxiliary heat exchanger to the exterior heat exchanger is obtained from the high-temperature refrigerant in the branching circuit.

7. The heat pump cycle according to claim 1, wherein the auxiliary heat exchanger supplies the heat to the exterior heat exchanger in order to limit frosting of the exterior heat exchanger when the exterior heat exchanger absorbs heat.

8. The heat pump cycle according to claim 1, wherein the auxiliary heat exchanger supplies the heat from the auxiliary medium to the exterior heat exchanger in order to remove a frost adhered on the exterior heat exchanger after the exterior heat exchanger has absorbed heat.

9. The heat pump cycle according to claim 1, wherein the second heat exchanger unit includes the decompressor, and the decompressor is disposed between the heat source heat exchanger and the exterior heat exchanger.

10. The heat pump cycle according to claim 1, further comprising:

an auxiliary medium circuit in which the auxiliary medium circulates through the auxiliary heat exchanger and the heat source heat exchanger; and an external heat source that is disposed in the auxiliary medium circuit and supplies the heat to the auxiliary medium.

11. The heat pump cycle according to claim 1, wherein the auxiliary heat exchanger allows the high-temperature refrigerant to flow therein and receives the heat directly from the high-temperature refrigerant.

12. The heat pump cycle according to claim 1, wherein the exterior heat exchanger is in direct contact with the heat source heat exchanger.

13. The heat pump cycle according to claim 12, wherein the decompressor is provided between the exterior heat exchanger and the heat source heat exchanger and includes a hole extending through a partition wall that divides the exterior heat exchanger and the heat source heat exchanger.

14. The heat pump cycle according to claim 13, wherein the decompressor includes a nozzle extending from the partition wall into the exterior heat exchanger and defining the hole.

15. The heat pump cycle according to claim 13, wherein the decompressor includes a valving element movable to change an opening degree of the hole, and a drive portion supporting and moving the valving element.

16. The heat pump cycle according to claim 15, wherein the decompressor is disposed in a tank of the second heat exchanger unit that extends along a side of the second heat exchanger unit, the tank communicates with both the exterior heat exchanger and the heat source heat exchanger, the drive portion is liquid-tightly fixed onto an end surface of the tank of the second heat exchanger unit, and the valving element is movable along the extending direction of the tank.

17. The heat pump cycle according to claim 16, wherein the decompressor further includes a cylindrical sleeve having a cylindrical hollow shape and extending from the drive portion in the tank, an outer circumferential surface of an end of the cylindrical sleeve contacts an inner wall of the tank to provide the partition wall and define the hole, and the cylindrical sleeve includes a side hole through which the refrigerant flows into the cylindrical sleeve from the heat source heat exchanger.

* * * * *